(12) United States Patent
Talagala et al.

(10) Patent No.: US 9,767,032 B2
(45) Date of Patent: Sep. 19, 2017

(54) SYSTEMS AND METHODS FOR CACHE ENDURANCE

(71) Applicant: SanDisk Technologies LLC, Salt Lake City, UT (US)

(72) Inventors: Nisha Talagala, Livermore, CA (US); Ned D. Plasson, Park City, UT (US); Jingpei Yang, San Jose, CA (US); Robert Wood, Niwot, CO (US); Swaminathan Sundararaman, San Jose, CA (US); Gregory N. Gillis, Riverton, UT (US)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/098,281

(22) Filed: Dec. 5, 2013

(65) Prior Publication Data

US 2014/0095775 A1    Apr. 3, 2014

Related U.S. Application Data

(63) Continuation-in-part of application No. 13/774,874, filed on Feb. 22, 2013, now Pat. No. 9,251,052, which
(Continued)

(51) Int. Cl.
*G06F 12/08* (2016.01)
*G06F 12/0891* (2016.01)
(Continued)

(52) U.S. Cl.
CPC ...... *G06F 12/0891* (2013.01); *G06F 12/0246* (2013.01); *G06F 12/0866* (2013.01); *G06F 2212/7205* (2013.01)

(58) Field of Classification Search
None
See application file for complete search history.

(56) References Cited

U.S. PATENT DOCUMENTS 4,571,674 A    2/1986 Hartung
4,980,861 A    12/1990 Herdt et al.
(Continued)

FOREIGN PATENT DOCUMENTS

EP    1100001    5/2001
EP    1418502    5/2004
(Continued)

OTHER PUBLICATIONS

Anonymous, "Method to Improve Reliability to SSD Arrays", http://ip.com, IP.com No. IPCOM000189338D, Nov. 5, 2009.
(Continued)

*Primary Examiner* — Duc Doan
(74) *Attorney, Agent, or Firm* — Stoel Rives LLP

(57) ABSTRACT

A cache and/or storage module may be configured to reduce write amplification in a cache storage. Cache layer write amplification (CLWA) may occur due to an over-permissive admission policy. The cache module may be configured to reduce CLWA by configuring admission policies to avoid unnecessary writes. Admission policies may be predicated on access and/or sequentiality metrics. Flash layer write amplification (FLWA) may arise due to the write-once properties of the storage medium. FLWA may be reduced by delegating cache eviction functionality to the underlying storage layer. The cache and storage layers may be configured to communicate coordination information, which may be leveraged to improve the performance of cache and/or storage operations.

22 Claims, 16 Drawing Sheets

Related U.S. Application Data is a continuation-in-part of application No. 13/349,417, filed on Jan. 12, 2012, now Pat. No. 8,782,344.

(60) Provisional application No. 61/733,540, filed on Dec. 5, 2012.

(51) Int. Cl.
*G06F 12/02* (2006.01)
*G06F 12/0866* (2016.01)

(56) References Cited

U.S. PATENT DOCUMENTS

| | | |
|---|---|---|
| 5,193,184 A | 3/1993 | Belsan et al. |
| 5,261,068 A | 11/1993 | Gaskins et al. |
| 5,291,496 A | 3/1994 | Andaleon et al. |
| 5,307,497 A | 4/1994 | Feigenbaum et al. |
| 5,313,475 A | 5/1994 | Cromer et al. |
| 5,325,509 A | 6/1994 | Lautzenhaiser |
| 5,392,427 A | 2/1995 | Barrett et al. |
| 5,404,485 A | 4/1995 | Ban |
| 5,438,671 A | 8/1995 | Miles |
| 5,469,555 A | 11/1995 | Ghosh et al. |
| 5,488,701 A | 1/1996 | Brady et al. |
| 5,499,354 A | 3/1996 | Aschoff et al. |
| 5,504,882 A | 4/1996 | Chai |
| 5,551,003 A | 8/1996 | Mattson et al. |
| 5,553,261 A | 9/1996 | Hasbun et al. |
| 5,559,988 A | 9/1996 | Durante et al. |
| 5,594,883 A | 1/1997 | Pricer |
| 5,596,736 A | 1/1997 | Kerns |
| 5,598,370 A | 1/1997 | Nijima et al. |
| 5,603,001 A | 2/1997 | Sukegawa et al. |
| 5,651,133 A | 7/1997 | Burkes |
| 5,680,579 A | 10/1997 | Young et al. |
| 5,701,434 A | 12/1997 | Nakagawa |
| 5,745,671 A | 4/1998 | Hodges |
| 5,745,792 A | 4/1998 | Jost |
| 5,754,563 A | 5/1998 | White |
| 5,754,567 A | 5/1998 | Norman |
| 5,787,486 A | 7/1998 | Chin et al. |
| 5,797,022 A | 8/1998 | Shimotono et al. |
| 5,798,968 A | 8/1998 | Lee et al. |
| 5,809,527 A | 9/1998 | Cooper et al. |
| 5,809,543 A | 9/1998 | Byers et al. |
| 5,822,759 A | 10/1998 | Treynor |
| 5,831,989 A | 11/1998 | Fujisaki |
| 5,835,935 A | 11/1998 | Estakhri et al. |
| 5,845,313 A | 12/1998 | Estakhri et al. |
| 5,845,329 A | 12/1998 | Onishi et al. |
| 5,854,796 A | 12/1998 | Sato |
| 5,860,083 A | 1/1999 | Sukegawa |
| 5,890,192 A | 3/1999 | Lee et al. |
| 5,893,138 A | 4/1999 | Judd et al. |
| 5,907,856 A | 5/1999 | Estakhri et al. |
| 5,924,113 A | 7/1999 | Estakhri et al. |
| 5,930,815 A | 7/1999 | Estakhri et al. |
| 5,960,462 A | 9/1999 | Solomon et al. |
| 5,961,660 A | 10/1999 | Capps, Jr. et al. |
| 6,000,006 A | 12/1999 | Bruce et al. |
| 6,000,019 A | 12/1999 | Dykstal et al. |
| 6,014,724 A | 1/2000 | Jenett |
| 6,014,755 A | 1/2000 | Wells et al. |
| 6,034,831 A | 3/2000 | Dobbek et al. |
| 6,061,511 A | 5/2000 | Marantz et al. |
| 6,073,232 A | 6/2000 | Kroeker et al. |
| 6,101,601 A | 8/2000 | Matthews et al. |
| 6,105,076 A | 8/2000 | Beardsley et al. |
| 6,128,695 A | 10/2000 | Estakhri et al. |
| 6,141,249 A | 10/2000 | Estakhri et al. |
| 6,145,051 A | 11/2000 | Estakhri et al. |
| 6,170,039 B1 | 1/2001 | Kishida |
| 6,170,047 B1 | 1/2001 | Dye |
| 6,172,906 B1 | 1/2001 | Estakhri et al. |
| 6,173,381 B1 | 1/2001 | Dye |
| 6,185,654 B1 | 2/2001 | Van Doren |
| 6,188,619 B1 | 2/2001 | Jung |
| 6,209,088 B1 | 3/2001 | Reneris |
| 6,223,308 B1 | 4/2001 | Estakhri et al. |
| 6,230,234 B1 | 5/2001 | Estakhri et al. |
| 6,236,593 B1 | 5/2001 | Hong et al. |
| 6,240,040 B1 | 5/2001 | Akaogi et al. |
| 6,278,633 B1 | 8/2001 | Wong et al. |
| 6,279,069 B1 | 8/2001 | Robinson et al. |
| 6,289,413 B1 | 9/2001 | Rogers et al. |
| 6,330,688 B1 | 12/2001 | Brown |
| 6,334,173 B1 | 12/2001 | Won et al. |
| 6,356,986 B1 | 3/2002 | Solomon et al. |
| 6,370,631 B1 | 4/2002 | Dye |
| 6,385,710 B1 | 5/2002 | Goldman et al. |
| 6,393,513 B2 | 5/2002 | Estakhri et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,418,509 B1 | 7/2002 | Yanai et al. |
| 6,424,872 B1 | 7/2002 | Glanzer et al. |
| 6,477,617 B1 | 11/2002 | Golding |
| 6,515,928 B2 | 2/2003 | Sato et al. |
| 6,516,380 B2 | 2/2003 | Kenchammana-Hoskote et al. |
| 6,519,185 B2 | 2/2003 | Harari et al. |
| 6,523,102 B1 | 2/2003 | Dye et al. |
| 6,552,955 B1 | 4/2003 | Miki |
| 6,567,889 B1 | 5/2003 | DeKoning et al. |
| 6,587,915 B1 | 7/2003 | Kim |
| 6,601,211 B1 | 7/2003 | Norman |
| 6,608,793 B2 | 8/2003 | Park et al. |
| 6,625,685 B1 | 9/2003 | Cho et al. |
| 6,633,956 B1 | 10/2003 | Milani |
| 6,658,438 B1 | 12/2003 | Moore et al. |
| 6,671,757 B1 | 12/2003 | Multer et al. |
| 6,675,349 B1 | 1/2004 | Chen |
| 6,710,901 B2 | 3/2004 | Pastor |
| 6,715,027 B2 | 3/2004 | Kim et al. |
| 6,715,046 B1 | 3/2004 | Shoham et al. |
| 6,728,851 B1 | 4/2004 | Estakhri et al. |
| 6,735,546 B2 | 5/2004 | Scheuerlein |
| 6,745,292 B1 | 6/2004 | Stevens |
| 6,751,155 B2 | 6/2004 | Gorobets |
| 6,754,774 B2 | 6/2004 | Gruner et al. |
| 6,754,800 B2 | 6/2004 | Wong et al. |
| 6,757,800 B1 | 6/2004 | Estakhri et al. |
| 6,760,806 B2 | 7/2004 | Jeon |
| 6,775,185 B2 | 8/2004 | Fujisawa et al. |
| 6,779,088 B1 | 8/2004 | Benveniste et al. |
| 6,779,094 B2 | 8/2004 | Selkirk et al. |
| 6,785,785 B2 | 8/2004 | Piccirillo et al. |
| 6,801,979 B1 | 10/2004 | Estakhri |
| 6,804,755 B2 | 10/2004 | Selkirk et al. |
| 6,816,917 B2 | 11/2004 | Dicorpo et al. |
| 6,839,819 B2 | 1/2005 | Martin |
| 6,845,053 B2 | 1/2005 | Chevalier |
| 6,845,428 B1 | 1/2005 | Kedem |
| 6,850,443 B2 | 2/2005 | Lofgren et al. |
| 6,871,257 B2 | 3/2005 | Conley |
| 6,877,076 B1 | 4/2005 | Cho et al. |
| 6,880,049 B2 | 4/2005 | Gruner et al. |
| 6,883,068 B2 | 4/2005 | Tsirgotis et al. |
| 6,883,069 B2 | 4/2005 | Yoshida |
| 6,883,079 B1 | 4/2005 | Priborsky |
| 6,910,170 B2 | 6/2005 | Choi et al. |
| 6,912,537 B2 | 6/2005 | Selkirk et al. |
| 6,912,618 B2 | 6/2005 | Estakhri et al. |
| 6,914,853 B2 | 7/2005 | Coulson |
| 6,922,754 B2 | 7/2005 | Liu et al. |
| 6,928,505 B1 | 8/2005 | Klingman |
| 6,938,133 B2 | 8/2005 | Johnson et al. |
| 6,977,599 B2 | 12/2005 | Windmer |
| 6,978,342 B1 | 12/2005 | Estakhri et al. |
| 6,981,070 B1 | 12/2005 | Luk et al. |
| 6,985,992 B1 | 1/2006 | Chang et al. |
| 6,996,676 B2 | 2/2006 | Megiddo |
| 7,010,652 B2 | 3/2006 | Piccirillo et al. |
| 7,010,662 B2 | 3/2006 | Aasheim et al. |
| 7,010,663 B2 | 3/2006 | George et al. |

(56) References Cited

U.S. PATENT DOCUMENTS

| | | |
|---|---|---|
| 7,013,376 B2 | 3/2006 | Hooper, III |
| 7,013,379 B1 | 3/2006 | Testardi |
| 7,043,599 B1 | 5/2006 | Ware et al. |
| 7,047,366 B1 | 5/2006 | Ezra |
| 7,050,337 B2 | 5/2006 | Iwase et al. |
| 7,057,936 B2 | 6/2006 | Yaegashi et al. |
| 7,058,769 B1 | 6/2006 | Danilak |
| 7,069,380 B2 | 6/2006 | Ogawa et al. |
| 7,076,599 B2 | 7/2006 | Aasheim et al. |
| 7,076,606 B2 | 7/2006 | Orsley |
| 7,076,723 B2 | 7/2006 | Saliba |
| 7,082,495 B2 | 7/2006 | DeWhitt et al. |
| 7,082,512 B2 | 7/2006 | Aasheim et al. |
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,111,140 B2 | 9/2006 | Estakhri et al. |
| 7,130,956 B2 | 10/2006 | Rao |
| 7,130,957 B2 | 10/2006 | Rao |
| 7,143,228 B2 | 11/2006 | Lida et al. |
| 7,149,947 B1 | 12/2006 | MacLellan et al. |
| 7,162,571 B2 | 1/2007 | Kilian et al. |
| 7,167,944 B1 | 1/2007 | Eslakhri |
| 7,167,953 B2 | 1/2007 | Megiddo et al. |
| 7,177,197 B2 | 2/2007 | Cernea |
| 7,178,081 B2 | 2/2007 | Lee et al. |
| 7,181,572 B2 | 2/2007 | Walmsley |
| 7,194,577 B2 | 3/2007 | Johnson et al. |
| 7,197,657 B1 | 3/2007 | Tobias |
| 7,203,815 B2 | 4/2007 | Haswell |
| 7,215,580 B2 | 5/2007 | Gorobets |
| 7,219,197 B2 | 5/2007 | Halakeyama |
| 7,219,238 B2 | 5/2007 | Saito et al. |
| 7,224,604 B2 | 5/2007 | Lasser |
| 7,227,777 B2 | 6/2007 | Roohparvar |
| 7,234,082 B2 | 6/2007 | Lai et al. |
| 7,237,141 B2 | 6/2007 | Fredin |
| 7,243,203 B2 | 7/2007 | Scheuerlein |
| 7,246,179 B2 | 7/2007 | Camara et al. |
| 7,248,691 B1 | 7/2007 | Pandil et al. |
| 7,257,129 B2 | 8/2007 | Lee et al. |
| 7,263,591 B2 | 8/2007 | Estakhri et al. |
| 7,280,536 B2 | 10/2007 | Testardi |
| 7,305,520 B2 | 12/2007 | Voight et al. |
| 7,337,201 B1 | 2/2008 | Yellin et al. |
| 7,340,558 B2 | 3/2008 | Lee et al. |
| 7,340,566 B2 | 3/2008 | Voth et al. |
| 7,340,581 B2 | 3/2008 | Gorobets et al. |
| 7,356,651 B2 | 4/2008 | Liu et al. |
| 7,360,015 B2 | 4/2008 | Matthews et al. |
| 7,360,037 B2 | 4/2008 | Higaki et al. |
| 7,366,808 B2 | 4/2008 | Kano et al. |
| 7,370,163 B2 | 5/2008 | Yang et al. |
| 7,392,365 B2 | 6/2008 | Selkirk et al. |
| 7,395,384 B2 | 7/2008 | Sinclair et al. |
| 7,409,492 B2 | 8/2008 | Tanaka et al. |
| 7,424,593 B2 | 9/2008 | Estakhri et al. |
| 7,437,510 B2 | 10/2008 | Rosenbluth et al. |
| 7,440,455 B2 | 10/2008 | Malas et al. |
| 7,441,067 B2 | 10/2008 | Gorobets et al. |
| 7,441,081 B2 | 10/2008 | Humlicek |
| 7,441,090 B2 | 10/2008 | Estakhri et al. |
| 7,447,847 B2 | 11/2008 | Louie et al. |
| 7,450,420 B2 | 11/2008 | Sinclair et al. |
| 7,451,264 B2 | 11/2008 | Yero |
| 7,451,266 B2 | 11/2008 | Shinagawa et al. |
| 7,460,432 B2 | 12/2008 | Warner |
| 7,463,521 B2 | 12/2008 | Li |
| 7,480,766 B2 | 1/2009 | Gorobets |
| 7,487,235 B2 | 2/2009 | Andrews et al. |
| 7,487,320 B2 | 2/2009 | Bansai et al. |
| 7,500,000 B2 | 3/2009 | Groves et al. |
| 7,516,267 B2 | 4/2009 | Coulson et al. |
| 7,523,249 B1 | 4/2009 | Estakhri et al. |
| 7,529,905 B2 | 5/2009 | Sinclair |
| 7,536,491 B2 | 5/2009 | Kano et al. |
| 7,549,013 B2 | 6/2009 | Estakhri et al. |
| 7,552,271 B2 | 6/2009 | Sinclair et al. |
| 7,552,272 B2 | 6/2009 | Gonzalez et al. |
| 7,580,287 B2 | 8/2009 | Aritome |
| 7,631,138 B2 | 12/2009 | Gonzalez et al. |
| 7,640,390 B2 | 12/2009 | Iwamura et al. |
| 7,644,239 B2 | 1/2010 | Cenk-Ergan et al. |
| 7,660,911 B2 | 2/2010 | McDaniel |
| 7,676,628 B1 | 3/2010 | Compton et al. |
| 7,680,977 B2 | 3/2010 | Luo et al. |
| 7,689,803 B2 | 3/2010 | Karr et al. |
| 7,725,628 B1 | 5/2010 | Phan et al. |
| 7,725,661 B2 | 5/2010 | Liu et al. |
| 7,734,865 B2 | 6/2010 | Tanaka et al. |
| 7,765,426 B2 | 7/2010 | Li |
| 7,852,582 B2 | 12/2010 | Ermolov et al. |
| 7,856,528 B1 | 12/2010 | Frost |
| 7,861,122 B2 | 12/2010 | Cornwell et al. |
| 7,873,803 B2 | 1/2011 | Cheng |
| 7,908,501 B2 | 3/2011 | Kim et al. |
| 7,944,762 B2 | 5/2011 | Gorobets |
| 7,970,986 B2 | 6/2011 | Tanaka et al. |
| 7,984,084 B2 | 7/2011 | Sinclair |
| 8,004,895 B2 | 8/2011 | Gonzalez et al. |
| 8,015,346 B2 | 9/2011 | Chen et al. |
| 8,019,938 B2 | 9/2011 | Flynn et al. |
| 8,032,708 B2 | 10/2011 | Gregg et al. |
| 8,156,392 B2 | 4/2012 | Flynn et al. |
| 8,195,978 B2 | 6/2012 | Flynn et al. |
| 8,291,151 B2 | 10/2012 | Sinclair |
| 8,301,826 B2 | 10/2012 | Gonzalez et al. |
| 8,429,340 B2 | 4/2013 | Tanaka et al. |
| 8,452,929 B2 | 5/2013 | Bennett |
| 8,788,745 B2 | 7/2014 | Tanaka et al. |
| 2002/0053009 A1 | 5/2002 | Selkirk et al. |
| 2002/0069318 A1 | 6/2002 | Chow et al. |
| 2002/0194451 A1 | 12/2002 | Mukaida et al. |
| 2003/0046493 A1 | 3/2003 | Coulson |
| 2003/0061296 A1 | 3/2003 | Craddock et al. |
| 2003/0070034 A1 | 4/2003 | Friedmann et al. |
| 2003/0093741 A1 | 5/2003 | Argon et al. |
| 2003/0131182 A1 | 7/2003 | Kumar et al. |
| 2003/0163630 A1 | 8/2003 | Aasheim et al. |
| 2003/0163663 A1 | 8/2003 | Aasheim et al. |
| 2003/0165076 A1 | 9/2003 | Gorobels et al. |
| 2003/0198084 A1 | 10/2003 | Fujisawa et al. |
| 2003/0204788 A1 | 10/2003 | Smith |
| 2004/0059870 A1 | 3/2004 | Ash et al. |
| 2004/0064647 A1 | 4/2004 | DeWhitt et al. |
| 2004/0093463 A1 | 5/2004 | Shang |
| 2004/0107424 A1 | 6/2004 | Wang |
| 2004/0128470 A1 | 7/2004 | Hetzler et al. |
| 2004/0186946 A1 | 9/2004 | Lee |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0018527 A1 | 1/2005 | Gorobels |
| 2005/0027951 A1 | 2/2005 | Piccirillo et al. |
| 2005/0055497 A1 | 3/2005 | Estakhri et al. |
| 2005/0076107 A1 | 4/2005 | Goud et al. |
| 2005/0132259 A1 | 6/2005 | Emmot et al. |
| 2005/0144361 A1 | 6/2005 | Gonzalez et al. |
| 2005/0149618 A1 | 7/2005 | Cheng |
| 2005/0149819 A1 | 7/2005 | Hwang |
| 2005/0177672 A1 | 8/2005 | Rao |
| 2005/0177687 A1 | 8/2005 | Rao |
| 2005/0193166 A1 | 9/2005 | Johnson et al. |
| 2005/0229090 A1 | 10/2005 | Shen et al. |
| 2005/0235132 A1 | 10/2005 | Karr et al. |
| 2005/0240713 A1 | 10/2005 | Wu et al. |
| 2005/0246510 A1 | 11/2005 | Retnammana et al. |
| 2005/0257213 A1 | 11/2005 | Chu et al. |
| 2005/0276092 A1 | 12/2005 | Hansen et al. |
| 2006/0004951 A1 | 1/2006 | Rudelic et al. |
| 2006/0004955 A1 | 1/2006 | Ware et al. |

(56) References Cited

U.S. PATENT DOCUMENTS

| | | | |
|---|---|---|---|
| 2006/0015688 A1* | 1/2006 | Schnapp et al. | 711/142 |
| 2006/0026339 A1 | 2/2006 | Rostampour | |
| 2006/0059326 A1 | 3/2006 | Aasheim et al. | |
| 2006/0064556 A1 | 3/2006 | Aasheim et al. | |
| 2006/0075057 A1 | 4/2006 | Gildea et al. | |
| 2006/0090048 A1 | 4/2006 | Okumoto et al. | |
| 2006/0106891 A1 | 5/2006 | Mahar et al. | |
| 2006/0106968 A1 | 5/2006 | Wooi Teoh | |
| 2006/0106990 A1 | 5/2006 | Benhase et al. | |
| 2006/0143396 A1 | 6/2006 | Cabot | |
| 2006/0149902 A1 | 7/2006 | Yun et al. | |
| 2006/0152981 A1 | 7/2006 | Ryu | |
| 2006/0184722 A1 | 8/2006 | Sinclair | |
| 2006/0184736 A1 | 8/2006 | Benhase et al. | |
| 2006/0224849 A1 | 10/2006 | Islam et al. | |
| 2006/0248387 A1 | 11/2006 | Nicholson et al. | |
| 2007/0016699 A1 | 1/2007 | Minami | |
| 2007/0033326 A1 | 2/2007 | Sinclair | |
| 2007/0033362 A1 | 2/2007 | Sinclair | |
| 2007/0043900 A1 | 2/2007 | Yun | |
| 2007/0050571 A1 | 3/2007 | Nakamura et al. | |
| 2007/0061511 A1 | 3/2007 | Faber | |
| 2007/0073975 A1 | 3/2007 | Lee et al. | |
| 2007/0086260 A1 | 4/2007 | Sinclair | |
| 2007/0118676 A1 | 5/2007 | Kano et al. | |
| 2007/0124474 A1 | 5/2007 | Margulis | |
| 2007/0124540 A1 | 5/2007 | van Riel | |
| 2007/0143560 A1 | 6/2007 | Gorobets | |
| 2007/0150689 A1 | 6/2007 | Pandit et al. | |
| 2007/0156998 A1 | 7/2007 | Gorobets | |
| 2007/0162830 A1 | 7/2007 | Stek et al. | |
| 2007/0198770 A1 | 8/2007 | Horii et al. | |
| 2007/0204128 A1 | 8/2007 | Lee et al. | |
| 2007/0204197 A1 | 8/2007 | Yokokawa | |
| 2007/0230253 A1 | 10/2007 | Kim | |
| 2007/0233455 A1 | 10/2007 | Zimmer et al. | |
| 2007/0233937 A1 | 10/2007 | Coulson et al. | |
| 2007/0233938 A1 | 10/2007 | Cho et al. | |
| 2007/0234021 A1 | 10/2007 | Ruberg et al. | |
| 2007/0245094 A1 | 10/2007 | Lee et al. | |
| 2007/0245217 A1 | 10/2007 | Valle | |
| 2007/0250660 A1 | 10/2007 | Gill et al. | |
| 2007/0255889 A1 | 11/2007 | Yogev et al. | |
| 2007/0266276 A1 | 11/2007 | Gatzemeier et al. | |
| 2007/0271468 A1 | 11/2007 | McKenney et al. | |
| 2007/0271572 A1 | 11/2007 | Gupta et al. | |
| 2007/0274150 A1 | 11/2007 | Gorobets | |
| 2007/0276897 A1 | 11/2007 | Tameshige et al. | |
| 2007/0300008 A1 | 12/2007 | Rogers et al. | |
| 2008/0005748 A1 | 1/2008 | Mathew et al. | |
| 2008/0010395 A1* | 1/2008 | Mylly | G06F 12/0246 711/100 |
| 2008/0016301 A1 | 1/2008 | Chen | |
| 2008/0043769 A1 | 2/2008 | Hirai | |
| 2008/0052483 A1 | 2/2008 | Rangarajan et al. | |
| 2008/0059693 A1 | 3/2008 | Yang et al. | |
| 2008/0059752 A1 | 3/2008 | Serizawa | |
| 2008/0059820 A1 | 3/2008 | Vaden et al. | |
| 2008/0080243 A1 | 4/2008 | Edahiro et al. | |
| 2008/0082812 A1 | 4/2008 | Kirshenbaum | |
| 2008/0091876 A1 | 4/2008 | Fujibayashi et al. | |
| 2008/0098159 A1 | 4/2008 | Song et al. | |
| 2008/0104344 A1 | 5/2008 | Shimozono et al. | |
| 2008/0109090 A1 | 5/2008 | Esmaili et al. | |
| 2008/0117686 A1 | 5/2008 | Yamada | |
| 2008/0120303 A1 | 5/2008 | Selkirk et al. | |
| 2008/0120469 A1 | 5/2008 | Kornegay | |
| 2008/0123211 A1 | 5/2008 | Chang et al. | |
| 2008/0126700 A1 | 5/2008 | El-Batal et al. | |
| 2008/0126852 A1 | 5/2008 | Brandyberry et al. | |
| 2008/0133963 A1 | 6/2008 | Katano et al. | |
| 2008/0137658 A1 | 6/2008 | Wang | |
| 2008/0140819 A1 | 6/2008 | Bailey et al. | |
| 2008/0183965 A1 | 7/2008 | Shiga et al. | |
| 2008/0195801 A1 | 8/2008 | Cheon et al. | |
| 2008/0201535 A1 | 8/2008 | Hara | |
| 2008/0205286 A1 | 8/2008 | Li et al. | |
| 2008/0209090 A1 | 8/2008 | Kana et al. | |
| 2008/0229046 A1 | 9/2008 | Raciborski | |
| 2008/0235443 A1 | 9/2008 | Chow et al. | |
| 2008/0266973 A1 | 10/2008 | Sekar et al. | |
| 2008/0276040 A1 | 11/2008 | Moritoki | |
| 2008/0294814 A1 | 11/2008 | Gorobets | |
| 2008/0294847 A1 | 11/2008 | Maruyama et al. | |
| 2008/0313364 A1 | 12/2008 | Flynn et al. | |
| 2009/0043952 A1 | 2/2009 | Estakhri et al. | |
| 2009/0070541 A1 | 3/2009 | Yochai | |
| 2009/0083478 A1 | 3/2009 | Kunimatsu et al. | |
| 2009/0083485 A1 | 3/2009 | Cheng | |
| 2009/0089485 A1 | 4/2009 | Yeh | |
| 2009/0089518 A1 | 4/2009 | Hobbet et al. | |
| 2009/0091996 A1 | 4/2009 | Chen et al. | |
| 2009/0125650 A1 | 5/2009 | Sebire | |
| 2009/0144496 A1 | 6/2009 | Kawaguchi | |
| 2009/0150605 A1 | 6/2009 | Flynn et al. | |
| 2009/0150621 A1 | 6/2009 | Lee | |
| 2009/0157956 A1 | 6/2009 | Kano | |
| 2009/0204750 A1 | 8/2009 | Estakhri et al. | |
| 2009/0216944 A1 | 8/2009 | Gill et al. | |
| 2009/0228637 A1 | 9/2009 | Moon | |
| 2009/0235017 A1 | 9/2009 | Estakhri et al. | |
| 2009/0276654 A1 | 11/2009 | Butterworth | |
| 2009/0300277 A1 | 12/2009 | Jeddeloh | |
| 2009/0313453 A1 | 12/2009 | Stefanus et al. | |
| 2009/0327602 A1 | 12/2009 | Moore et al. | |
| 2009/0327804 A1 | 12/2009 | Moshayedi | |
| 2010/0017556 A1 | 1/2010 | Chin | |
| 2010/0023674 A1 | 1/2010 | Aviles | |
| 2010/0023676 A1 | 1/2010 | Moon | |
| 2010/0023682 A1 | 1/2010 | Lee et al. | |
| 2010/0030946 A1 | 2/2010 | Kano et al. | |
| 2010/0077194 A1 | 3/2010 | Zhao et al. | |
| 2010/0102999 A1 | 4/2010 | Lee et al. | |
| 2010/0106917 A1 | 4/2010 | Ruberg et al. | |
| 2010/0115178 A1 | 5/2010 | Sauber | |
| 2010/0250834 A1 | 9/2010 | Trika et al. | |
| 2010/0281216 A1 | 11/2010 | Patel et al. | |
| 2011/0066808 A1 | 3/2011 | Flynn et al. | |
| 2011/0161597 A1 | 6/2011 | Tremaine | |
| 2011/0246709 A1 | 10/2011 | Chen et al. | |
| 2011/0258391 A1 | 10/2011 | Atkisson et al. | |
| 2011/0258512 A1 | 10/2011 | Flynn et al. | |
| 2012/0198174 A1* | 8/2012 | Nellans et al. | 711/133 |
| 2013/0097367 A1 | 4/2013 | Flynn et al. | |
| 2013/0111146 A1 | 5/2013 | Ash et al. | |
| 2013/0232289 A1 | 9/2013 | Zhong et al. | |
| 2013/0326161 A1* | 12/2013 | Cohen | G06F 3/061 711/154 |
| 2013/0326269 A1 | 12/2013 | Losh et al. | |
| 2013/0326284 A1 | 12/2013 | Losh et al. | |

FOREIGN PATENT DOCUMENTS

| | | |
|---|---|---|
| EP | 1522927 A3 | 12/2007 |
| EP | 1814039 | 3/2009 |
| GB | 0123416 | 9/2001 |
| JP | 4242848 | 8/1992 |
| JP | 200259525 | 9/2000 |
| JP | 2009122850 | 6/2009 |
| WO | WO94/19746 | 9/1994 |
| WO | WO95/18407 | 7/1995 |
| WO | WO96/12225 | 4/1996 |
| WO | WO01/31512 | 5/2001 |
| WO | WO01/01365 | 1/2002 |
| WO | WO02/01365 A2 | 1/2002 |
| WO | WO2008000088 | 1/2008 |
| WO | WO2008/073421 | 6/2008 |
| WO | WO2008070173 | 6/2008 |
| WO | WO2008/147752 A1 | 12/2008 |

(56) References Cited

FOREIGN PATENT DOCUMENTS

| WO | WO2009/140700 A1 | 11/2009 |
|---|---|---|
| WO | WO2010/054410 A2 | 5/2010 |

OTHER PUBLICATIONS

Cambridge Computer Services, Inc., 2008©, http://www.clusteredstorage.com/clustered_storage_solutions.html, visited Feb. 16, 2010.
Chen, "Hystor: Making SSDs the Survival of the Fittest in High Performance Storage Systems", Proceedings of 25th ACM International Conference on Supercomputing (ICS 2011), Tucson, Arizona, May 31-Jun. 4, 2011.
Coburn, "NV-Heaps: Making Persistent Objects Fast and Safe with Next-Generation, Non-Volatile Memories", ACM 978-1-4503-0266-1/11/0, published Mar. 5, 2011.
EEEL 6892, "Virtual Computers, Lecture 18", http://www.acis.ufl.edu/~ming/lectures/eel6892lec18.pdf, visited Mar. 1, 2010.
Hynix, "64GB—Flash MCP—Slashdot: the Nuts and Volts of News for Nerds," http://hardware.slashdot.org/article.pl?sid-07-09-06/146218&from=rss, Sep. 6, 2007.
Intel, "Intel Turbo Memory with User Pinning," Jan. 2008, http://download.intel.com/design/flash/nd/turbomemory/320288.pdf, visited May 20, 2011.
Stokes, Intel's New Flash Tech to Bring Back Turbo Memory, for Real, Sep. 2009, http://arstechnica.com/hardware/news/2009/09/intels-new-flash-tech-to-bring-back-turbo-memory-for-real.ars.
STOW: Spatially and Temporally Optimized Write Caching Algorithm, Gill, Ko, Debnath, Belluomini, http://www.usenix.org/event/usenix09/tech/slides/gill.pdf. Presented Usenix Nov. 2009. Accessed Apr. 2010.
Volos, "Mnemosyne: Lightweight Persistent Memory", ACM 978-1-4503-0266-1/11/03, published Mar. 5, 2011.
Wikipedia, "Adaptive Replacement Cache", last modified Jun. 25, 2012, http://en.wikipedia.org/wiki/Adaptive_replacement_cache.
WIPO, International Search Report and Written Opinion for PCT/US2012/021094, mailed Sep. 24, 2012.
USPTO, Office Action for U.S. Appl. No. 13/349,417 mailed Oct. 10, 2013.
Notice of Allowance for U.S. Appl. No. 13/774,874, filed Feb. 22, 2013, and mailed from the USPTO on Sep. 25, 2015, 9 pgs.
Non-Final Office Action for U.S. Appl. No. 13/774,874, filed Feb. 22, 2013, and mailed from the USPTO Feb. 9, 2015, 12 pgs.
Non-Final Office Action for U.S. Appl. No. 13/774,881, filed Feb. 22, 2013, and mailed from the USPTO on Jan. 9, 2015, 12 pgs.
Rong Xu; Zhiyuan Li, "Using cache mapping to improve memory performance handheld devices," Performance Analysis of Systems and Software, 2004 IEEE International Symposium on—IS PASS, vol., No., pp. 106, 114, 2004, doi: 10.11 09/ISPASS.2004.1291362 URL: http://ieeexplore.ieee.org/stamp/stamp.jsp?tp=&arnumber=1291362&isnumber=28758, 9 pgs.
Non-Final Office Action in U.S. Appl. No. 14/794,483 dated Sep. 28, 2015.
Notice of Allowance in U.S. Appl. No. 13/362,973 dated Mar. 31, 2015.
Final Office Action in U.S. Appl. No. 13/362,973 dated Dec. 1, 2014.
Non-Final Office Action in U.S. Appl. No. 13/362,973 dated Jan. 29, 2014.
Agigatech, Bulletproof Memory for RAID Servers, Part 1, http://agigatech.com/blog/bulletproof-memory-for-raid-servers-part-1/, last visited Feb. 16, 2010.
Anonymous, "Method for Fault Tolerance in Nonvolatile Storage", http://ip.com, IP.com number: IPCOM000042269D, 2005.
Ari, "Performance Boosting and Workload Isolation in Storage Area Networks with SanCache," Hewlett Packard Laboratories, Proceedings of the 23rd IEEE / 14th SA Goddard Conference on Mass Storage Systems and Technologies (MSST 2006), May 2006, pp. 263-27.
Bandulet "Object-Based Storage Devices," Jul. 2007 http://developers.sun.com/solaris/articles/osd.htme, visited Dec. 1, 2011.
Bitmicro, "BiTMICRO Introduces E-Disk PMC Flash Disk Module at Military & Aerospace Electronics East 2004," http://www.bitmicro.com/press.sub, published May 18, 2004, visited Mar. 8, 2011.
Casey, "Disk I/O Performance Scaling: the File Cashing Solution," Solid Data Systems, Inc., Paper #528, Mar. 2011, pp. 1-8.
Casey, "San Cache: SSD in the San, "Storage Inc., http://www.solidata.com/resourses/pdf/storageing.pdf, 2000, visited May 20, 2011.
Casey, "Solid State File-Caching for Performance and Scalability," SolidData Quarter 1 2000, http://www//storagesearch. com/3dram.html, visited May 20, 2011.
Data Direct Networks, "White Paper: S2A9550 Overview," www.//datadirectnet. com, 2007.
Feresten, "Netapp Thin Provisioning: Better for Business, Netapp White Paper," WP-7017-0307, http://media.netapp.com/documents/wp-thin-provisioning.pdf, Mar. 2007, visited Jun. 19, 2012.
Gill, "WOW: Wise Ordering for Writes—Combining Spatial and Temporal Locality in Non-Volatile Caches," IBM, Fast 05: 4th USENIX Conference on File and Storage Technologies, 2005.
Intel, "Non-Volatile Memory Host Controller Interface (NVMHCI) 1.0," Apr. 14, 2008.
Johnson, "An Introduction to Block Device Drivers," Jan. 1, 1995.
Kawaguchi, "A Flash-Memory Based File System," TCON'95 Proceedings of the USENIX 1995 Technical Conference Proceedings, p. 13.
Leventhal, "Flash Storage Memory," Communications of the ACM, vol. 51, No. 7, pp. 47-51, Jul. 2008.
Mesnier, "Object-Based Storage," IEEE Communications Magazine, Aug. 2003, pp. 84-90.
Micron Technology, Inc., "NAND Flash 101: An Introduction to ND Flash and How to Design it in to Your Next Product (TN-29-19)," http://www.micron.com/~/media/Documents/Products/Technical %20Note/ND%20Flash/145tn2919_nd_101.pdf, 2006, visited May 10, 2010.
Micron, "TN-29-08: Technical Note, Hamming Codes for ND Flash Memory Devices," Mar. 10, 2010.
Micron, "TN-29-17: NAND Flash Design and Use Considerations," Mar. 10, 2010.
Microsoft, "How NTFS Works," Apr. 9, 2010.
Morgenstern, David, "Is There a Flash Memory RAID in your Future?", http://www.eweek.com—eWeek, Ziff Davis Enterprise Holdings Inc., Nov. 8, 2006, visited Mar. 18, 2010.
Novell, "File System Primer", http://wiki.novell.com/index.php/File_System_Primer, 2006, visited Oct. 18, 2006.
PIVOT3, "RAIGE Cluster: Technology Overview," White Paper, www.pivot3.com, Jun. 2007.
Plank, "A Tutorial on Reed-Solomon Coding for Fault Tolerance in RAID-like System," Department of Computer Science, University of Tennessee, pp. 995-1012, Sep. 1997.
Rosenblum, "The Design and Implementation of a Log-Structured File System," ACM Transactions on Computer Systems, vol. 10 Issue 1, Feb. 1992.
Samsung Electronics, "Introduction to Samsung's Linux Flash File System—RFS Application Note", Version 1.0, Nov. 2006.
Seagate Research, "The Advantages of Object-Based Storage-Secure, Scalable, Dynamic Storage Devices," Technology Paper TP-536, Apr. 2005.
Singer, Dan, "Implementing MLC ND Flash for Cost-Effective, High Capacity Memory," M-Systems, White Paper, 91-SR014-02-8L, Rev. 1.1, Sep. 2003.
Solidata, "Best Practices Guide, Sybase: Maximizing Performance through Solid State File-Caching," http://soliddate.com/resources/pdf/bp-sybase.pdf. May 2000, cited May 18, 2011.
Spansion, "Data Management Software (DMS) for AMD Simultaneous Read/Write Flash Memory Devices", published Jul. 7, 2003.
Van Hensbergen, "Dynamic Policy Disk Caching for Storage Networking," IBM Research Division, RC24123 (W0611-189), Nov. 2006.

(56) References Cited

OTHER PUBLICATIONS

Wang, "OBFS: A File System for Object-based Storage Devices", 21st IEE/12th SA Goddard Conference on Mass Storage Systems and Technologies, Apr. 2004.
Woodhouse, "JFFS: The Journaling Flash File System," Ottawa Linux Symposium, http://sources.redhat.com/jffs2/jffs2.pdf, Jul. 2001.
Wu, "eNVy: A Non-Volatile, Main Memory Storage System," ACM 0-89791-660-3/94/0010, ASPLOS-VI Proceedings of the sixth international conference on Architectural support for programming languages and operating systems, pp. 86-97, 1994.
Yerrick, "Block Device," http://www.pineight.com/ds/block, last visited Mar. 1, 2010.
USPTO, Office Action, U.S. Appl. No. 13/349,417, mailed Oct. 10, 2013.

\* cited by examiner

SYSTEMS AND METHODS FOR CACHE ENDURANCE

CROSS REFERENCE TO RELATED APPLICATIONS

This application claims priority to U.S. Provisional Patent Application No. 61/733,540 entitled, "Systems and Methods for a High Endurance Cache," filed Dec. 5, 2012 for Nisha Talagala et al., and is a continuation-in-part of U.S. patent application Ser. No. 13/774,874 entitled, "Systems and Methods for Cache Profiling," filed Feb. 22, 2013 for Nisha Talagala et al., which is a continuation-in-part of U.S. patent application Ser. No. 13/349,417 entitled, "Systems and Methods for Managing Cache Admission," filed on Jan. 12, 2012 for Nisha Talagala et al., each of which is hereby incorporated by reference.

TECHNICAL FIELD

This disclosure relates to storage systems and, in particular, to systems and methods for managing reserve storage capacity of a non-volatile storage device.

DETAILED DESCRIPTION

Figure 1A:
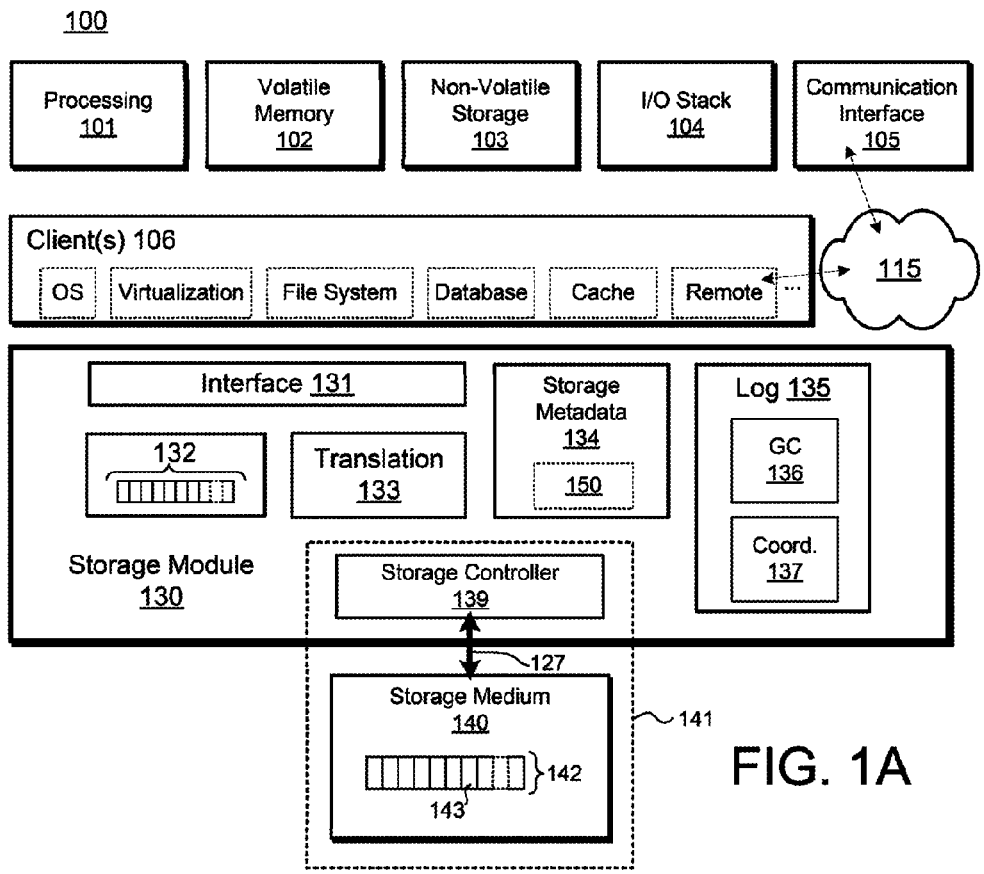
FIG. 1A is a block diagram of one embodiment of a storage module.

Disclosed herein are amendments of an apparatus for managing a high-endurance cache. Embodiments of the disclosed apparatus may comprise a cache module configured to admit data associated with a backing store into a cache corresponding to a non-volatile, solid-state storage medium in response to a storage request, and a storage module configured to store data admitted into the cache on the non-volatile, solid-state storage medium. The storage module may comprise a garbage collector configured to recover storage divisions of the non-volatile storage medium, and the garbage collector may be configured to remove data associated with the backing store from the cache during recovery of a storage division. Recovery of a storage division comprises preparing the storage division for re-use without preserving data stored on the storage division. Preparing the storage division for re-use may include erasing all data that was stored in the storage division. The disclosed apparatus may further comprise a translation module configured to maintain a forward map that binds identifiers of data admitted into the cache to storage addresses on the non-volatile, solid-state storage medium. The garbage collector may be configured to remove a binding from the forward map corresponding to the data removed from the cache In some embodiments, the garbage collector is configured to relocate a data segment admitted into the cache in response to recovering a storage division comprising the data segment. The data segment may comprise data that has not been destaged to the backing store. Alternatively, or in addition, the data segment may be relocated in response to a coordination information indicating that the data segment should be retained in the cache.

The cache module may be configured to provide coordination information to the storage module. The coordination information may be configured to identify data evicted from the cache by the cache module. Alternatively, or in addition, the coordination information may be configured to identify data to retain in the cache.

The cache module may comprise an admission module configured to select data for admission into the cache based on one or more of an access threshold, a non-sequentiality threshold, and an adaptive threshold corresponding to an access metric and a sequentiality metric.

Disclosed herein are embodiments of a method for managing cache storage subject to write amplification. The disclosed method may include, maintaining input/output request characteristics of identifiers corresponding to an address space of a backing store, determining a cache admission metric for one or more identifiers of the backing store b use of the determined I/O characteristics, and/or restricting admission of data corresponding to the identifiers into cache storage in response to determining that the cache storage is subject to write amplification. Determining that the cache storage is subject to write amplification may comprise determining that the cache storage comprises a write-once storage medium and/or determining that the cache storage is configured to store data in a log on a persistent storage medium. The determination may be based on coordination information pertaining to the cache storage. The coordination information may indicate a wear level of a storage medium of the cache storage, a wear rate of the storage medium, and an available storage capacity on the storage medium.

In some embodiments, the method further includes delegating cache eviction to a storage reclamation process of the cache storage in response to determining that the cache storage is subject to write amplification and/or identifying cache data that can be evicted from the cache storage during a storage recovery operation on the cache storage.

Disclosed herein are further embodiments of a method for reducing write amplification in cache storage. The method may include appending data corresponding to a backing store to a storage log on a storage medium in response to a request from a cache module, selecting a segment of the storage log for a recovery operation, wherein the selected segment comprises data corresponding to the backing store, and/or determining whether to erase data of the selected segment from the storage medium by use of coordination information provided by a cache module. Determining whether to erase data of the segment may comprise issuing a query to the cache module to obtain coordination information.

In some embodiments, the method further comprises maintaining storage metadata configured to bind data identifiers to segments of the storage log, and identifying data of the backing store on the selected segment by use of the storage metadata. The query may comprise an identifier of the data of the backing store stored on the selected segment. The method may further include relocating the data of the backing store within the storage log in response to determining that the data of the backing store cannot be erased.

FIG. 1A is a block diagram of one embodiment of a computing system 100 comprising a storage module 130 configured to provide I/O and/or storage services to one or more clients 106. The computing system 100 may comprise a computing device, including, but not limited to, a server, a desktop, a laptop, an embedded system, a mobile device, and/or the like. In some embodiments, the computing system 100 may include multiple computing devices, such as a cluster of server computing devices. The computing system 100 may comprise processing resources 101, volatile memory resources 102 (e.g., random access memory (RAM)), non-volatile storage resources 103, an I/O stack 104, a communication interface 105, and the like. The processing resources 101 may include, but are not limited to, general purpose central processing units (CPUs), application-specific integrated circuits (ASICs), and programmable logic elements, such as field programmable gate arrays (FPGAs), programmable logic arrays (PLAs), and the like. The non-volatile storage resources 103 may comprise a non-transitory machine-readable storage medium, such as a magnetic hard disk, a solid-state storage medium, an optical storage medium, and/or the like.

The I/O stack 104 may define a storage architecture in which storage services, such as file system drivers, volume drivers, disk drivers, and the like, are deployed. Storage services may be configured to interoperate by issuing and/or consuming I/O requests within various layers I/O stack 104, which may include, but are not limited to: a file layer, a volume layer, a disk layer, a SCSI layer, and so on. The communication interface 105 may be configured to communicatively couple the computing system 100 to a network 115. The network 115 may comprise any suitable communication network, including, but not limited to, a Transmission Control Protocol/Internet Protocol (TCP/IP) network, a Local Area Network (LAN), a Wide Area Network (WAN), a Virtual Private Network (VPN), a Storage Area Network (SAN), a Public Switched Telephone Network (PSTN), the Internet, and/or the like.

Portions of the storage module 130, and the other modules, components, and/or elements disclosed herein, may be implemented as program code stored on a non-transitory computer-readable storage medium. Accordingly, the storage module 130 may comprise one or more drivers, kernel modules, I/O filters (operating within the I/O stack 104 of the computing system 100), user-space applications, libraries, interfaces, and/or the like. The storage module 130 may be embodied as, and/or tied to, particular hardware components, such as the processing resources 101 and/or volatile memory resources 102 of the computing system 100, the communication interface, the interconnect 127 (e.g., one or more communication buses), and/or the like. Alternatively, or in addition, portions of the storage module 130 may be implemented by use of hardware components, which may include, but are limited to: dedicated hardware components, general purpose processors, ASICs, programmable logical elements, communication interface components, bus interface hardware, human-machine interface elements, and/or the like.

The storage module 130 may be configured to provide I/O services to clients 106, which may include, but are not limited to, operating systems (including bare metal operating systems, guest operating systems, virtual machines, and the like), virtualization systems (virtualization kernels, hypervisors, virtual machines, and/or the like), file systems, database systems, cache management systems (e.g., cache controllers), remote clients (e.g., clients 106 communicatively coupled to the computing system 100 and/or storage module 130 through the network 115), and/or the like.

The storage module 130 (and/or modules thereof) may be implemented in software, hardware, or a combination thereof. In some embodiments, portions of the storage module 130 are embodied as executable instructions, such as computer program code, which may be stored on a persistent, non-transitory storage medium, such as the non-volatile storage resources 103, storage medium 140, firmware, and/or the like. The instructions and/or computer program code may be configured for execution by the processing resources 101 of the computing system 100 and/or processing resources of other components and/or modules, such as the storage controller 139. Alternatively, or in addition, portions of the storage module 130 and/or other modules disclosed herein may be embodied as machine components, such as general and/or application-specific components, programmable hardware, FPGAs, ASICs, hardware controllers, storage controllers, and/or the like.

The storage module 130 may be configured to perform storage operations on the storage medium 140. The storage medium 140 may comprise any storage medium capable of storing data persistently. As used herein, "persistent" data storage refers to storing information on a persistent, non-volatile storage medium. The storage medium 140 may include non-volatile storage media, such as solid-state storage media in one or more solid-state storage devices or drives (SSD), hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writeable optical drives (e.g., CD drives, DVD drives, Blu-ray drives, etc.), and/or the like.

In some embodiments, the storage medium 140 comprises non-volatile, solid-state memory, which may include, but is not limited to, NAND flash memory, NOR flash memory, nano RAM (NRAM), magneto-resistive RAM (MRAM), phase change RAM (PRAM), Racetrack memory, Memristor memory, nanocrystal wire-based memory, silicon-oxide based sub-10 nanometer process memory, graphene memory, Silicon-Oxide-Nitride-Oxide-Silicon (SONOS), resistive random-access memory (RRAM), programmable metallization cell (PMC), conductive-bridging RAM (CBRAM), and/or the like. Although particular embodiments of the storage medium 140 are disclosed herein, the teachings of this disclosure could be applied to any suitable form of memory, including both non-volatile and volatile forms. Accordingly, although particular embodiments of the storage module 130 are disclosed in the context of non-volatile, solid-state storage devices, the storage module 130 may be used with other storage devices and/or storage media.

In some embodiments, the storage medium 140 includes volatile memory, which may include, but is not limited to, RAM, dynamic RAM (DRAM), static RAM (SRAM), synchronous dynamic RAM (SDRAM), etc. The storage medium 140 may correspond to the memory of the processing resources 101, such as a CPU cache (e.g., L1, L2, L3 cache, etc.), graphics memory, and/or the like. In some embodiments, the storage medium 140 is communicatively coupled to the storage module 130 by use of an interconnect 127. The interconnect 127 may include, but is not limited to, peripheral component interconnect (PCI), PCI express (PCI-e), serial advanced technology attachment (serial ATA or SATA), parallel ATA (PATA), SCSI, IEEE 1394 (FireWire), Fiber Channel, universal serial bus (USB), and/or the like. Alternatively, the storage medium 140 may be a remote storage device that is communicatively coupled to the storage module 130 through the network 115 (and/or other communication interface, such as a SAN, a Virtual Storage Area Network (VSAN), and/or the like). The interconnect 127 may, therefore, comprise a remote bus, such as a PCE-e bus, a network connection (e.g., Infiniband), a storage network, Fibre Channel Protocol (FCP) network, HyperSCSI, and/or the like.

The storage module 130 may be configured to manage storage operations on the storage medium 140 by use of, inter alia, the storage controller 139. The storage controller 139 may comprise software and/or hardware components, including, but not limited to, one or more drivers and/or other software modules operating on the computing system 100, such as storage drivers, I/O drivers, filter drivers, and/or the like; hardware components, such as hardware controllers, communication interfaces, and/or the like; and so on. The storage medium 140 may be embodied on a storage device 141. Portions of the storage module 130 (e.g., storage controller 139) may be implemented as hardware and/or software components (e.g., firmware) of the storage device 141.

The storage controller 139 may be configured to implement storage operations at particular storage locations of the storage medium 140. As used herein, a storage location refers to a unit of storage of a storage resource (e.g., a storage medium and/or device) that is capable of storing data persistently; storage locations may include, but are not limited to, pages, groups of pages (e.g., logical pages and/or offsets within a logical page), storage divisions (e.g., physical erase blocks, logical erase blocks, etc.), sectors, locations on a magnetic disk, battery-backed memory locations, and/or the like. The storage locations may be addressable within a storage address space 142 of the storage medium 140. Storage addresses may correspond to physical addresses, media addresses, back-end addresses, address offsets, and/or the like. Storage addresses may correspond to any suitable storage address space 142, storage addressing scheme, and/or arrangement of storage locations.

The storage module 130 may comprise an interface 131 through which clients 106 may access storage services provided by the storage module 130. The storage interface 131 may include one or more of a block device interface, an object storage interface, a file storage interface, a key-value storage interface, a virtualized storage interface, one or more virtual storage units (VSUs), an object storage interface, a database storage interface, and/or other suitable interfaces and/or an Application Programming Interface (API), and the like.

The storage module 130 may provide for referencing storage resources through a front-end storage interface. As used herein, a "front-end storage interface" refers to an interface and/or namespace through which clients 106 may refer to storage resources of the storage module 130. A storage interface may correspond to a logical address space 132. The logical address space 132 may comprise a group, a set, a collection, a range, and/or an extent of identifiers. As used herein, an "identifier" or "logical identifier" (LID) refers to an identifier for referencing an I/O resource; LIDs may include, but are not limited to, names (e.g., file names, distinguished names, and/or the like), data identifiers, references, links, front-end identifiers, logical addresses, logical block addresses (LBAs), storage unit addresses, VSU addresses, logical unit number (LUN) addresses, virtual unit number (VUN) addresses, virtual logical unit number (VLUN) addresses, virtual storage addresses, storage addresses, physical addresses, media addresses, back-end addresses, unique identifiers, globally unique identifiers (GUIDs), and/or the like.

The logical capacity of the logical address space 132 may correspond to the number of LIDs in the logical address space 132 and/or the size and/or granularity of the storage resources referenced by the LIDs. In some embodiments, the logical address space 132 may be "thinly provisioned." As used herein, a thinly provisioned logical address space 132 refers to a logical address space 132 having a logical capacity that exceeds the physical storage capacity of the underlying storage resources (e.g., exceeds the storage capacity of the storage medium 140). In one embodiment, the storage module 130 is configured to provide a 64-bit logical address space 132 (e.g., a logical address space comprising $2^{26}$ unique LIDs), which may exceed the physical storage capacity of the storage medium 140. The storage module 130 may leverage the large, thinly provisioned logical address space 132 to efficiently allocate and/or reference contiguous ranges of LIDs for the clients 106, while reducing the chance of naming conflicts.

The translation module 133 of the storage module 130 may be configured to map LIDs of the logical address space 132 to storage resources (e.g., data stored within the storage address space 142 of the storage medium 140). The logical address space 132 may be independent of the back-end storage resources (e.g., the storage medium 140); accordingly, there may be no set or pre-determined mappings between LIDs of the logical address space 132 and the storage addresses of the storage address space 142. In some embodiments, the logical address space 132 is sparse, thinly provisioned, and/or over-provisioned, such that the size of the logical address space 132 differs from the storage address space 142 of the storage medium 140.

The storage module 130 may be configured to maintain storage metadata 134 pertaining to storage operations performed on the storage medium 140. The storage metadata 134 may include, but is not limited to, a forward map comprising any-to-any mappings between LIDs of the logical address space 132 and storage addresses within the storage address space 142, a reverse map pertaining to the contents of storage locations of the storage medium 140, validity bitmaps, reliability testing and/or status metadata, status information (e.g., error rate, retirement status, and so on), cache metadata, and/or the like. Portions of the storage metadata 134 may be maintained within the volatile memory resources 102 of the computing system 100. Alternatively, or in addition, portions of the storage metadata 134 may be stored on non-volatile storage resources 103 and/or the storage medium 140.

Figure 1B:
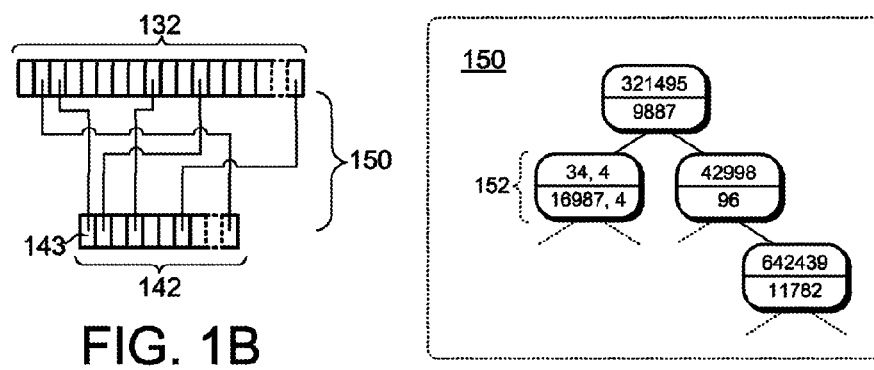
FIG. 1B depicts embodiments of storage metadata pertaining to the storage module.

FIG. 1B depicts one embodiment of any-to-any mappings between LIDs of the logical address space 132 and back-end identifiers (e.g., storage addresses) within the storage address space 142. The any-to-any mappings may be maintained in one or more data structures of the storage metadata 134. As illustrated in FIG. 1B, the translation module 133 may be configured to map any storage resource identifier (any LID of the logical address space 132) to any storage unit 143 in the storage address space 142. As further illustrated, the logical address space 132 may be sized differently than the underlying storage address space 142. In the FIG. 1B embodiment, the logical address space 132 may be thinly provisioned, and, as such, may comprise a larger range of LIDs than the range of storage addresses in the storage address space 142 (e.g., the logical address space 132 may comprise more LIDs than storage units 143).

As disclosed above, clients 106 may reference storage resources of the storage module 130 by use of, inter alia, LIDs of the logical address space 132. Accordingly, the logical address space 132 may correspond to a logical or front-end interface of the storage resources, and the mappings to particular storage addresses within the storage address space 142 may correspond to a back-end interface of the storage resources.

The storage module 130 may be configured to maintain the any-to-any mappings between the logical interface and back-end interface in a forward map 150 (FIG. 1B). The forward map 150 may comprise any suitable data structure, including, but not limited to, an index, a map, a hash map, a hash table, a tree, a range-encoded tree, a b-tree, and/or the like. The forward map 150 may comprise entries 152 corresponding to LIDs that have been allocated for use to reference data stored on the storage medium 140. The entries 152 of the forward map 150 may associate LIDs with respective media storage addresses (e.g., particular media storage units 143) within the storage address space 142. The forward map 150 may be sparsely populated and, as such, may omit entries corresponding to LIDs that are not currently allocated to clients 106 and/or are not currently in use to reference valid data stored on the storage medium 140. In some embodiments, the forward map 150 comprises a range-encoded data structure, such that one or more of the entries 152 correspond to a plurality of LIDs (e.g., range, extent, and/or set of LIDs). In the FIG. 1B embodiment, the forward map 150 includes an entry 152 corresponding to a range of LIDs (LID range 34 of length 4, comprising LIDs 34-37) mapped to a corresponding range of storage addresses 16987-16990). The entries 152 of the forward map 150 may be indexed by LID in, inter alia, a tree data structure. The disclosure is not limited in this regard, however, and could be adapted to use any suitable data structure and/or indexing mechanism.

Referring back to FIG. 1A, the storage module 130 may further comprise a log storage module 135 configured to store data on the storage medium 140 in a log structured storage configuration (e.g., in a storage log). As used herein, a "storage log" or "log structure" refers to an ordered arrangement of data within the storage address space 142 of the storage medium 140. Data in the storage log may comprise and/or be associated with persistent metadata. Accordingly, the storage module 130 may be configured to store data in a contextual, self-describing format. As used herein, a contextual or self-describing format refers to a data format in which data is stored in association with persistent metadata. In some embodiments, the persistent metadata may be configured to identify the data and, as such, may comprise and/or reference the logical interface of the data (e.g., may comprise the LID(s) associated with the data). The persistent metadata may include other information, including, but not limited to, information pertaining to the owner of the data, access controls, data type, relative position or offset of the data, information pertaining to storage operation(s) associated with the data (e.g., atomic storage operations, transactions, and/or the like), log sequence information, data storage parameters (e.g., compression algorithm, encryption, etc.), and/or the like.

The storage module 130 may further comprise a garbage collector 136 configured to manage portions of the log (log segments). The garbage collector 136 may be configured to reclaim and/or reinitialize log storage resources, such as log segments, media storage units, media storage divisions (e.g., erase blocks), VSUs, virtual storage divisions (e.g., groups of erase blocks), and the like. The garbage collector 136 may, therefore, be configured to prepare log storage resources for use (and/or reuse). As disclosed in further detail herein, the storage layer 130 may further include a coordination module 137 configured to coordinate storage operations with one or more storage clients 106.

Figure 1C:
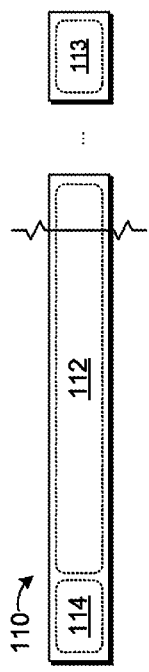
FIG. 1C is a block diagram depicting one embodiment of a solid-state storage array.

FIG. 1C illustrates one embodiment of a contextual data format. The contextual data format (data packet 110) of FIG. 1C comprises a data segment 112 and persistent metadata 114. The data segment 112 may be of any arbitrary length and/or size. The persistent metadata 114 may be embodied as one or more header fields of the data packet 110. The persistent metadata 114 may be configured to define the logical interface of the data segment 112 and, as such, may include and/or reference the LID(s) associated with the data segment 112. The persistent metadata 114 may be further configured to associate the data segment 112 with a particular application, user, client 106, backing store, and/or the like. Although FIG. 1C depicts a particular embodiment of a data packet format 110, the disclosure is not limited in this regard and could associate data (e.g., data segment 112) with persistent, contextual metadata in other ways, including, but not limited to, an index on the storage medium 140, a separate metadata channel, and/or the like.

In some embodiments, the log storage module 135 is further configured to associate data packets 110 with sequence information 113. The sequence information 113 may be used to determine the relative order of the data packets 110 stored on the storage medium 140. In some embodiments, the log storage module 135 and/or storage controller 139 are configured to assign sequence information 113 to sections of the storage medium 140. The sections may correspond to storage divisions, erase blocks, logical erase blocks, and/or the like. Each section may be capable of storing a plurality of data packets 110. The log storage module 135 may be configured to append data packets 110 sequentially within the physical address space of the respective sections of the storage medium 140 (by use of the storage controller 139). The relative position of data packets 110 within a section may determine the relative order of the data packets 110 within the section. The order of the sections of the storage medium 140 may be determined by use of, inter alia, sequence information 113 of the sections. The sequence information 113 may be assigned to respective sections of the storage medium 140 when the sections are initialized for use (e.g., erased), programmed, closed, and/or the like, such that the sequence information 113 defines an ordered sequence of sections within the storage address space 142. Accordingly, the order of a data packet 110 within the storage log may be determined by: a) the relative position of the data packet 110 within a particular storage division and b) the order of the storage division relative to other storage divisions in the storage address space 142.

Figure 1D:
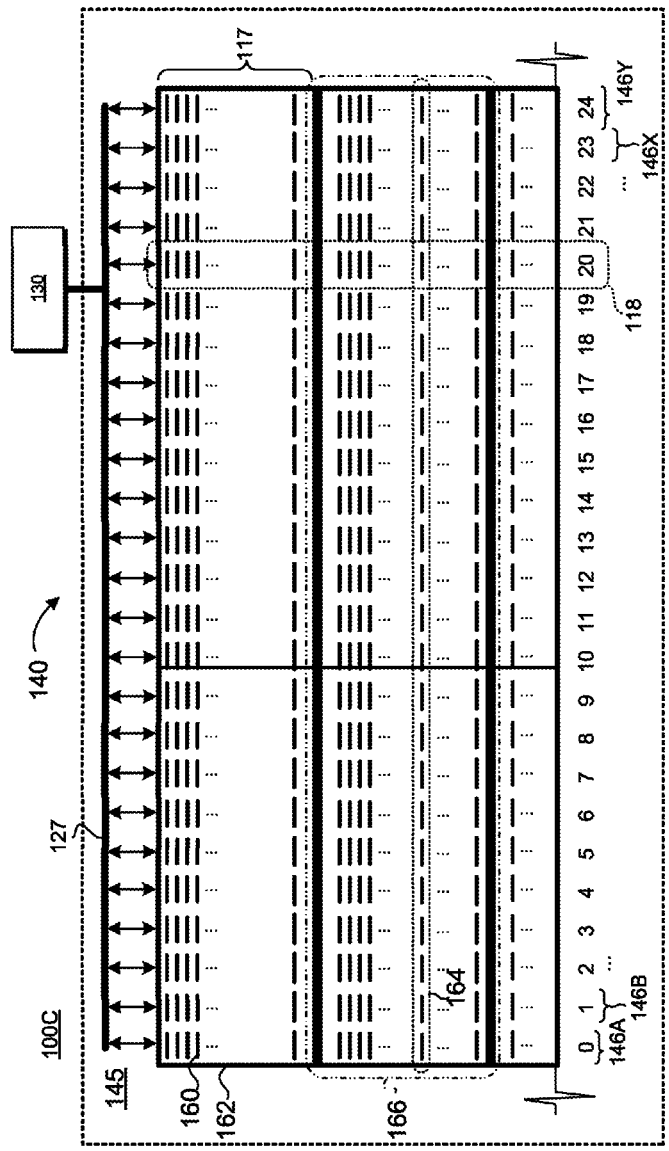
FIG. 1D is a block diagram depicting one embodiment of a plurality of independent storage banks.

Referring to FIG. 1D, in some embodiments, the storage medium 140 may comprise a solid-state storage array 145. As used herein, a solid-state storage array (or storage array 145) refers to a plurality of solid-state storage elements 146A-Y that are managed in parallel by, inter alia, the storage module 130. The solid-state storage elements 146A-Y may comprise solid-state storage resources embodied as a package, a chip, a die, a plane, a printed circuit board, and/or the like. The solid-state storage elements 146A-Y comprising the array 145 may be communicatively coupled to the storage module 130 in parallel by the interconnect 127 (through the storage controller 139). The interconnect 127 may be capable of communicating data, address, and/or control information to each of the solid-state storage elements 146A-Y. The storage module 130 may be configured to leverage the parallel connection of the interconnect 127 to manage the solid-state storage elements 146A-Y as a single, logical storage element (array 145). In some embodiments, the interconnect 127 comprises a separate, independent communication channel to/from each solid-state storage element 146A-Y. Alternatively, or in addition, signals on the interconnect 127, such as command and/or addressing information, may be shared between a plurality of the solid-state storage elements 146A-Y.

The solid-state storage elements 146A-Y may comprise media storage units 160. As used herein, a media storage unit 160 refers to any unit of storage on a solid-state storage element 146A-Y including, but not limited to: a page, a sector, a block, and/or the like. The storage medium 140 may be a "write-once" storage medium, comprising media storage units 160 that can only be reliably programmed once after initialization, such that the media storage units 160 must be reinitialized each time new data is written or programmed thereto. Accordingly, the media storage units 160 may have a "writeable" or "initialized," state in which the media storage units 160 are capable of having data programmed thereon, and a "written" state in which the media storage units 160 have been programmed with data and, as such, must be reinitialized or reset before being used to store new data.

In some embodiments, the storage medium 140 may be "asymmetric," such that different storage operations have different time latencies. In some embodiments, for example, read operations may be faster than write/program operations, and write/program operations may be faster than initialization operations (e.g., reading the media may be hundreds of times faster than erasing, and tens of times faster than programming the storage medium). The solid-state storage elements 146A-Y may be partitioned into respective media storage divisions 162. As used herein, a media storage division 162 refers to a section, sector, segment, block and/or division of a solid-state storage element 146A-Y including, but not limited to: a block, an erase block, an erase sector, and/or the like. The media storage divisions 162 may comprise a plurality of media storage units 160. The media storage units 160 of a media storage division 162 may be initialized as a group, such that a single erase operation on a media storage division 162 is configured to initialize a plurality of media storage units 160. The solid-state storage array 145 may comprise columns 118 and rows 117. The columns 118 may correspond to respective solid-state storage elements 146A-Y, and the rows may correspond to media storage units 160 and/or divisions 162 within the array 145. Although FIG. 1D depicts one embodiment of a solid-state storage array 145 comprising solid-state storage elements 146A-Y having a particular configuration, the disclosure is not limited in this regard and could be adapted to arrange solid-state storage elements 146A-Y partitioned in any suitable manner and/or in any suitable configuration.

The storage module 130 may be configured to perform storage operations on groups of media storage units 160 and/or media storage divisions 162. As disclosed above, it may take longer to program data onto the solid-state storage elements 146A-Y than it takes to read data therefrom (e.g., 10 times as long). Moreover, in some embodiments, data may only be programmed media storage units 160 that have been initialized (e.g., are in a writeable state). Initialization operations may take longer than program and/or read operations. Managing groups of solid-state storage elements 146A-Y in the storage array 145 (and/or independent banks, as disclosed below) may allow the storage module 130 to address these asymmetric properties.

In some embodiments, the storage module 130 is configured to perform data write and/or read operations within virtual storage units 164 (e.g., virtual pages) of the solid-state storage array 145. As illustrated in FIG. 1D, a virtual storage unit 164 may comprise media storage units 160 within a particular row 117 of the array 145 (e.g., a media storage unit 160 on each of a plurality of solid-state storage elements 146A-Y). The storage module 130 may be further configured to manage storage recovery and/or initialization operations using virtual storage divisions 166, which may comprise media storage divisions 162 within respective rows 117 of the array 145 (e.g., a media storage division 162 (physical erase block) on each of a plurality of the solid-state storage elements 146A-Y). An operation to read or write data to a virtual storage unit 164 may comprise programming data to each of 25 media storage units 160 (e.g., one media storage unit 160 per solid-state storage element 146A-Y); an operation to initialize (e.g., erase) a virtual storage division 166 may comprise initializing 25 media storage divisions 162 (e.g., erase blocks); and so on. Since the columns 118 of the array 145 are independent, storage operations may be performed across different sets and/or portions of the array 145. For example, a read operation on the array 145 may comprise reading data from media storage unit 160 at a first address of solid-state storage element 146A and reading data from a media storage unit 160 at a different address within one or more other solid-state storage elements 146B-N.

In some embodiments, portions of the solid-state storage array 145 may be configured to store data, and other portions of the array 145 may be configured to store error detection and/or recovery information. A column 118 used for data storage may be referred to as a "data column," and a column 118 used to store error detection and/or recovery information may be referred to as a "parity column" or "recovery column." In the FIG. 1D embodiment, the array 145 may be configured in an operational mode in which the solid-state storage element 146Y is used to store parity data, and the other solid-state storage elements 146A-X are used to store data. In this operational mode, the effective storage capacity of the virtual storage units 164 (e.g., rows 117) may be reduced (e.g., reduced from 25 pages to 24 pages). As used herein, the "effective storage capacity" of a storage unit refers to the number of storage units or divisions that are available to store data and/or the total amount of data that can be stored within a particular virtual storage unit 164. The operational mode described above may be referred to as a "24+1" configuration, denoting that 24 media storage units 160 are available to store data, and one of the physical storage units 160 is used for parity information. The disclosed embodiments are not limited to any particular operational mode and/or configuration, however, and could be adapted to use any number of the solid-state storage elements 146A-Y to store error detection and/or recovery data.

Figure 2:
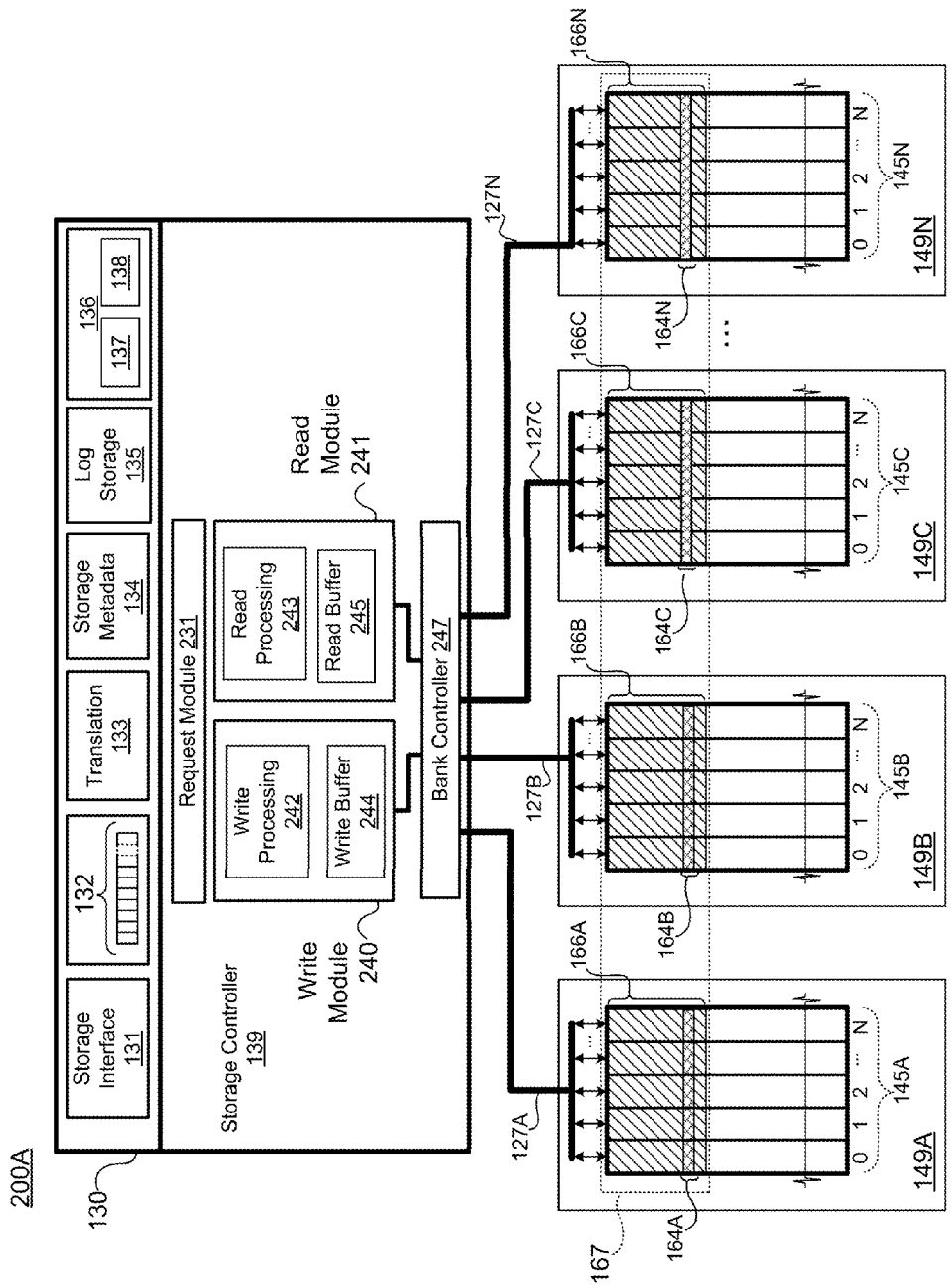
FIG. 2 is a block diagram of another embodiment of a storage module.

FIG. 2 depicts one embodiment of a storage system 200A comprising a storage module 130 configured to manage a storage medium 140. In the FIG. 2 embodiment, the storage medium 140 comprises a plurality of independent banks 149A-N, each of which may comprise one or more storage arrays 145A-N, as disclosed above.

The storage controller 139 may comprise a storage request module 231 configured to receive storage requests from the storage module 130. The storage request module 231 may be further configured to transfer data to/from the storage module 130 and/or I/O clients 106. Accordingly, the storage request module 231 may comprise one or more direct memory access (DMA) modules, remote DMA modules, bus controllers, bridges, buffers, and the like.

The storage controller 139 may comprise a write module 240 configured to store data on the storage medium 140 in response to requests received via the request module 231. The requests may comprise and/or reference a logical interface of the data to be written to the storage medium 140. The write module 240 may be configured to store the data in a self-describing storage log, which, as disclosed above, may comprise appending data packets 110 sequentially within the storage address space 142 of the storage medium 140. The data packets 110 may comprise and/or reference the logical interface of the data (e.g., may comprise the LID(s) associated with the data), as disclosed herein. The write module 240 may comprise a write processing module 242 configured to process data for storage on the storage medium 140, which may include, but is not limited to: a) compression processing, b) encryption processing, c) encapsulating data into respective data packets 110 (and/or other containers), d) performing error-correcting code (ECC) processing, and so on. The write module 240 may further comprise a write buffer 244 configured to buffer data for storage on media storage units 160 of the storage medium 140. In some embodiments, the write buffer 244 may comprise one or more synchronization buffers configured to synchronize a clock domain of the storage controller 139 with a clock domain of the storage medium 140 (and/or interconnect 127A-N).

The log storage module 135 may be configured to select storage unit(s) for data storage operations and may provide addressing and/or control information to the storage arrays 145A-N of the independent banks 149A-N. The log storage module 135 may be configured to append data sequentially in a log format within the storage address space 142 of the storage medium 140, as disclosed herein.

Storage operations to write data on the storage medium 140 may comprise: a) appending one or more data packets to the storage log on the storage medium 140 and b) updating storage metadata 134 (forward map 150) to associate LID(s) of the data with the storage addresses of the one or more data packets on the storage medium 140. In some embodiments, the storage metadata 134 may be maintained by use of memory resources of the storage controller 139 (e.g., volatile memory resources of the storage device 141 comprising the storage medium 140). Alternatively, or in addition, portions of the storage metadata 134 may be maintained within the storage module 130 (e.g., on a volatile memory resources 102 of the computing system 100 of FIG. 1A). In some embodiments, the storage metadata 134 may be maintained in a volatile memory by the storage module 130, and may be periodically stored on the storage medium 140 (or other persistent storage resource).

The storage controller 139 may further comprise a data read module 241 configured to read data from the storage log on the storage medium 140 in response to requests received via the request module 231. The read requests may comprise LID(s) of the requested data, a storage address of the requested data, and/or the like. The read module 241 may be configured to: a) determine the storage address(es) of the data packet(s) 110 comprising the requested data by use of, inter alia, the forward map 150, b) read the data packet(s) 110 from the determined storage address(es) on the storage medium 140, and c) process data for use by the requesting entity. Data read from the storage medium 140 may stream into the read module 241 via a read buffer 245. The read buffer 245 may comprise one or more read synchronization buffers for clock domain synchronization, as described above. A read processing module 243 may be configured to process data read from the storage medium 140, which may include, but is not limited to, one or more of: a) decompression processing, b) decryption processing, c) extracting data from one or more data packet(s) 110 (and/or other containers), d) performing ECC processing, and so on.

The storage controller 139 may further comprise a bank controller 247 configured to selectively route data and/or commands of the write module 240 and/or read module 241 to/from particular independent banks 149A-N. In some embodiments, the storage controller 139 is configured to interleave storage operations between the independent banks 149A-N. The storage controller 139 may, for example, read from a virtual storage unit 164A of array 145A in bank 149A by use of the read module 241 while data from the write module 240 is being programmed to another virtual storage unit 164B-N of another bank 149B-N. Further embodiments of multi-bank storage operations are disclosed in U.S. patent application Ser. No. 11/952,095, entitled, "Apparatus, System, and Method for Managing Commands for Solid-State Storage Using Bank Interleave," filed Dec. 12, 2006 for David Flynn et al., which is hereby incorporated by reference in its entirety.

The write processing module 242 may be configured to encode data packets 110 into ECC codewords. As used herein, an ECC codeword refers to data and corresponding error detection and/or correction information. The write processing module 242 may be configured to implement any suitable ECC algorithm and/or generate ECC codewords of any suitable type, which may include, but are not limited to, data segments and corresponding ECC syndromes, ECC symbols, ECC chunks, and/or other structured and/or unstructured ECC information. ECC codewords may comprise any suitable error-correcting encoding, including, but not limited to, block ECC encoding, convolutional ECC encoding, Low-Density Parity-Check (LDPC) encoding, Gallager encoding, Reed-Solomon encoding, Hamming codes, Multidimensional parity encoding, cyclic ECCs, BCH codes, and/or the like. The write processing module 242 may be configured to generate ECC codewords of a pre-determined size. Accordingly, a single packet may be encoded into a plurality of different ECC codewords and/or a single ECC codeword may comprise portions of two or more packets. Alternatively, the write processing module 242 may be configured to generate arbitrarily sized ECC codewords. Further embodiments of ECC processing are disclosed in U.S. patent application Ser. No. 13/830,652, entitled, "Systems and Methods for Adaptive Error-Correction Coding," filed Mar. 14, 2013 for Jeremy Fillingim et al., which is hereby incorporated by reference in its entirety.

As disclosed above, the storage module 130 may be configured to interleave storage operations between independent banks 149A-N of solid-state storage arrays 145A-N, which may further ameliorate performance issues caused by asymmetry between erase, program, and read operations. The banks 149A-N may comprise one or more solid-state storage arrays 145A-N, which, as disclosed herein, may comprise a plurality of solid-state storage elements 146A-Y coupled in parallel to the storage module 130 through respective interconnects 127A-N. The banks 149A-N may be capable of independent operation. Data may be read from virtual storage unit 164A within the array 145A of bank 149A while data is being programmed to virtual storage unit 164B of bank 149B, and/or as virtual storage division 166N is being initialized.

The storage module 130 may be further configured to manage groups of virtual storage divisions 166A-N. As depicted in FIG. 2, a virtual storage division group (VSDG) 167 may comprise virtual storage units 164A-N of banks 149A-N. In some embodiments, the VSDG 167 comprises a virtual storage division 166 within each array 145A-N. Accordingly, the VSDG 167 may comprise N virtual storage divisions 166. The virtual storage units 164A-N of the VSDG 167 may be initialized together (e.g., erased in response to a single erase command and/or in response to a plurality of separate erase commands and/or signals on the interconnects 127A-N). Performing storage recovery and/or initialization operations on groups of virtual storage divisions (e.g., VSDGs 167) that comprise a large number of media storage divisions 162 may further mask the asymmetric properties of the solid-state storage medium 140.

In some embodiments, the storage module 130 is configured to perform storage operations within boundaries of the arrays 145A-N and/or banks 149A-N. As disclosed above, write and/or program operations may be performed within rows 117 of the solid-state storage arrays 145A-N (e.g., on virtual storage units 164A-N of respective banks 149A-N).

As depicted in FIG. 2A, the virtual storage units 164A-N of the arrays 145A-N may not extend beyond the respective boundaries of the arrays 145A-N and/or banks 149A-N. The log storage module 135 and/or bank controller 247 may be configured to append data to the solid-state storage medium 140 by interleaving and/or scheduling storage operations sequentially between the arrays 145A-N of the banks 149A-N. Further embodiments of systems and methods for arranging data for storage within a solid-state storage array are disclosed in U.S. patent application Ser. No. 13/784,705, entitled "Systems and Methods for Adaptive Data Storage," filed on Mar. 4, 2013 for David Flynn et al., which is hereby incorporated by reference in its entirety.

As disclosed herein, the storage module 130 may be configured to perform media management operations on large numbers of media storage units 160 in parallel in order to address write-once, asymmetric properties of the storage medium 140. As disclosed above, a "write-once" storage medium refers to a storage medium that can only be reliably programmed once after being initialized, such that the storage medium must be reinitialized (e.g., erased or reset) each time new data is written or programmed thereon. A write-once storage medium may, therefore, have a "writeable" or "initialized" state in which the storage medium is capable of having data programmed thereon, and a "written state" in which the storage medium has had data programmed thereon and, as such, must be initialized before being used to store new data. Due to the asymmetric properties of the storage medium 140, initialization operations may take significantly longer than other storage operations. Accordingly, the storage module 130 may be configured to initialize groups, sets, and/or collections of media storage units 160 and/or media storage divisions 162 in parallel.

Due to the asymmetric, write-once properties of the storage medium 140, modifying a data segment "in-place" on a particular media storage unit 160 may require erasing the entire media storage division 162 comprising the data (and/or the corresponding virtual storage division 166 and/or VSDG 167) and rewriting the modified data along with the other data on the particular media storage division 162, virtual storage division 166, and/or VSDG 167, resulting in "write amplification," which may reduce performance and excessively wear the storage medium 140. In some embodiments, therefore, the storage module 130 may be configured to write data "out-of-place" on the storage medium 140. As used herein, writing data "out-of-place" refers to updating and/or overwriting data at different storage unit(s) rather than overwriting the data "in-place" (e.g., overwriting the original physical storage unit of the data). Updating and/or overwriting data out-of-place may avoid write amplification, since existing, valid data on the erase block with the data to be modified need not be erased and recopied. Moreover, writing data out-of-place may remove media initialization (erasure) from the latency path of many storage operations.

The storage module 130 may be configured to perform storage operations out-of-place by use of the log storage module 135. The log storage module 135 may be configured to append data at a current append point within the storage address space 142 in a manner that maintains the relative order of storage operations performed by the storage module 130, forming a "storage log" on the storage medium 140. As disclosed above, a "storage log" refers to an ordered arrangement of data within the storage address space 142 of the storage medium 140. The storage log may comprise a plurality of "storage log segments" or "log segments." As used herein, a "log segment" refers to a collection of storage units that are managed and/or initialized as a group (a set of log storage units). A log segment may include, but is not limited to: a media storage division 162 (e.g., an erase block), a virtual storage unit 164, a virtual storage division 166, a VSDG 167, and/or the like. As used herein, a "log storage unit" of a log segment can include, but is not limited to: a media storage unit 160 (e.g., a page, a sector, a block, and/or the like), a virtual storage unit 164, and/or the like. The size and/or storage capacity of a log segment may correspond to the number and/or configuration of log storage units included therein. For example, a log segment comprising 2,000 media storage units 160, each capable of storing 1 kb of data, may have a storage capacity of 2 MB.

The log storage module 135 may be configured to append data within respective log segments within storage address space 142 of the storage device 141. The garbage collector 136 may be configured to groom the log segments, which may comprise initializing log segments for use by the log storage module 135 by, inter alia: a) relocating valid data on the log segment (if any), and b) reinitializing the log segment (e.g., erasing or resetting the log segment). The storage medium 140 may be wear limited, such that the storage divisions of the storage medium 140 are rated to endure a particular number of program erase cycles. The garbage collector 136 may be configured to wear level the storage medium so the storage divisions (and/or log segments) are programmed and/or erased at similar rates.

Figure 3A:
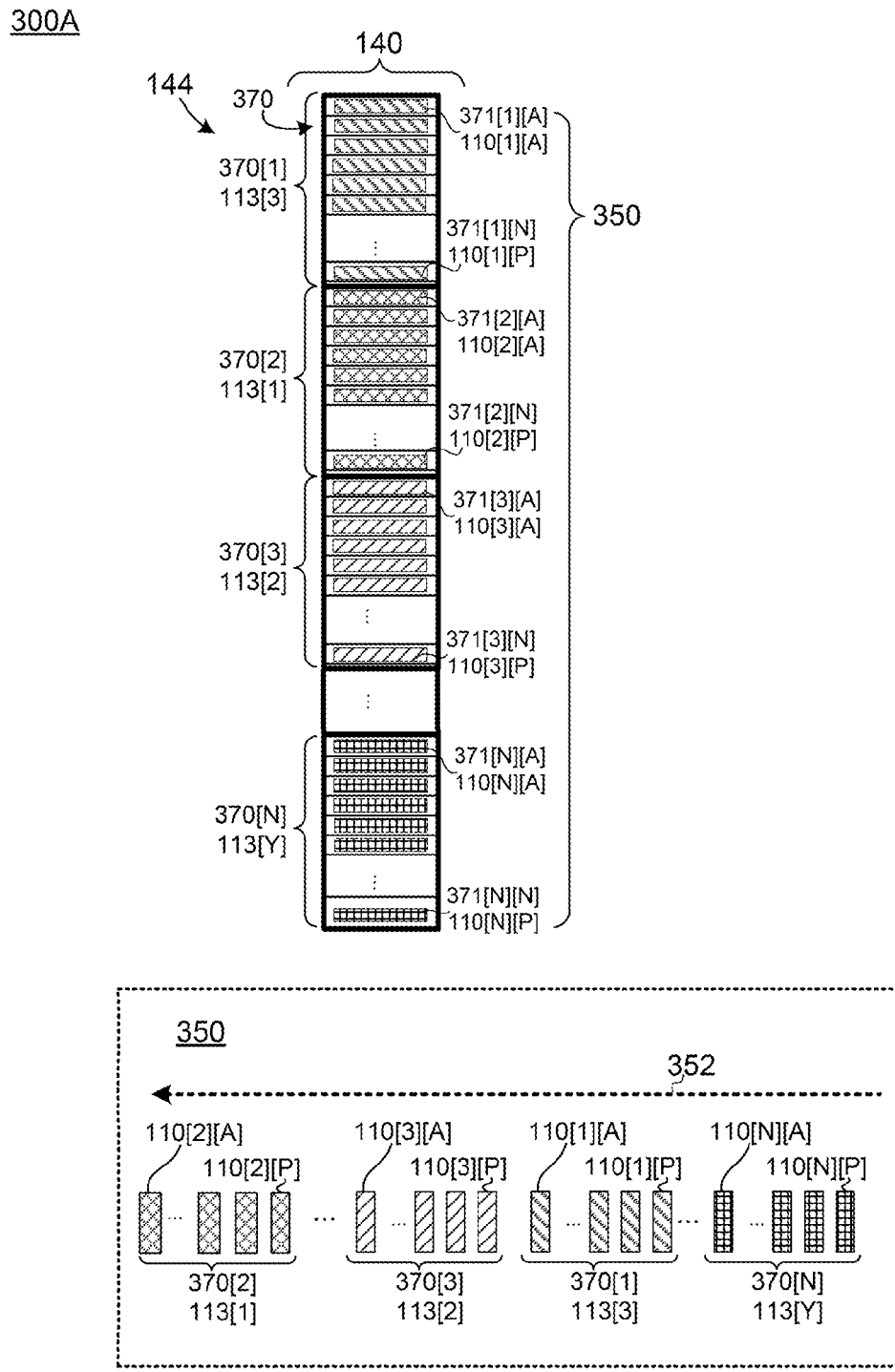
FIG. 3A depicts one embodiment of a storage log of a storage module.

FIG. 3A depicts one embodiment 300A of a storage log 350 comprising data stored sequentially within log segments 370 (e.g., log segments 370[1]-370[N]) by the storage module 130. As disclosed herein, a log segment 370 refers to a collection, group, and/or set of commonly managed log storage units 371. The log storage units 371 of the log segments 370 may comprise a plurality of log storage units 371A-N capable of storing data (e.g., data packets 110), as disclosed above. Accordingly, the log storage units 371 may comprise media storage units 160 (e.g., pages, sectors, blocks, and/or the like), virtual storage units (e.g., pages on a plurality of storage elements 146A-N in a particular bank 149A-N), and/or the like. A log segment 370 may correspond to a collection of log storage units 371 that are reclaimed, recovered, and/or reinitialized as a group. The log segments 370 may, therefore, correspond to sections of the storage medium 140, which may include, but are not limited to: media storage divisions 162 (erase blocks), virtual storage divisions 166 (virtual erase blocks), VSDG 167, and/or the like. Accordingly, the garbage collector 136 may be configured to perform grooming operations within respective log segments 370. The disclosure is not limited in this regard, however, and could use log segments 370 comprising any storage medium 140 including, but not limited to: a magnetic storage medium (e.g., a hard disk drive), a persistent random access memory (e.g., battery-backed RAM), an optical storage medium, and/or the like.

As disclosed above, a grooming operation to compact a log segment 370 may comprise: a) relocating valid data stored within the log segment 370 (if any), and b) reinitializing the log segment 370. In embodiments comprising log segments 370 corresponding to a solid-state storage array 145, reinitializing a log segment 370 may comprise erasing and/or resetting the physical erase blocks 162, virtual erase blocks 166, and/or VSDG 167 comprising the log segment 370. The garbage collector 136 may be configured to erase the log segment 370 in a simultaneous operation and/or by use of a single and/or common erase command transmitted to a plurality of storage elements 146 and/or banks 149, as disclosed herein. In other embodiments, the log segments 370 may comprise a different storage medium, such as a hard disk, a battery-backed RAM, and/or the like. In such embodiments, reinitializing the log segment 370 may comprise marking the log segment 370 as available for storage operations, writing a pre-determined pattern to the log segment 370 (e.g., zeros), and/or the like (after relocating valid data thereon).

The storage log 350 may comprise data stored with persistent metadata configured to determine a log order 352 of data stored within the respective log storage units 371 of the log segments 370 (e.g., log order 352 of data packets 110[A][0]-110[N][P]). The log storage module 135 may be configured to append data packets 110 sequentially within the storage address space 142 (e.g., within log segments 370[1]-370[N]), by use of the log storage module 135 and/or storage controller 139. The order in which data is appended within the respective log segments 370[1]-370[N] may be determined according to the availability of erased and/or initialized log segments 370[1]-370[N], as disclosed in further detail herein. The log storage module 135 may be configured to fill the respective log segments 370[1]-370[N] before appending data to other log segments 370[1]-370[N].

In the FIG. 3A embodiment, the log storage module 135 may have stored data packets 110[1][A]-110[1][P] sequentially in the storage address space of log segment 370[1] (e.g., within the log storage units 371[1][A]-371[1][N]), such that data packet 110[1][P] is later in the storage log (stored more recently) relative to data packet 110[1][A]. FIG. 3A further illustrates data packets 110 stored sequentially within the log storage units 371 of other log segments 370[2]-370[N]: data packets 110[2][A]-110[2][P] are stored sequentially within log storage units 371[2][A]-371[2][N] of log segment 370[2], data packets 110[3][A]-110[3][P] are stored sequentially within log storage units 371[3][A]-371[3][N] of log segment 370[3], data packets 110[N][A]-110[N][P] are stored sequentially within log storage units 371[N][A]-371[N][N] of log segment 370[N], and so on.

The storage module 130 may mark log segments 370[1]-370[N] with respective sequence information 113[1]-113[Y], configured to define the order in which the log segments 370[1]-370[N] were programmed. Accordingly, the order in which the data packets 110[1][A]-110[N][P] were stored within the respective log segments 370[1]-370[N] may be defined by, inter alia, sequence information 113[1]-113[Y] of the log segments 370[1]-370[N]. In some embodiments, the sequence information 113[1]-113[Y] may be stored at pre-determined locations within the log segments 370[1]-370[N] (e.g., in a header, at a pre-determined offset, and/or the like). The sequence information 113[1]-113[Y] may be stored when the log segments 370[1]-370[N] are: initialized (e.g., erased) by the log management module 136; when the segments 370[1]-370[N] are placed in a write queue by the log management module 136; when the 370[1]-370[N] are selected for use by the log storage module 135; when data is appended to the log segments 370[1]-370[N], when the log segments 370[1]-370[N] are closed (e.g., filled), and/or the like.

In the FIG. 3A embodiment, the sequence information 113[Y] may correspond to the most recently programmed (youngest) log segment 370[1]-370[N] in the storage log 350, and the sequence information 113[1] may correspond to the earliest programmed (oldest) log segment 370[1]-370[N]. Therefore, and as illustrated in FIG. 3A, the log order 352 of the log segments 370[1]-370[N] may be 370[N] (most recently programmed or youngest), 370[1], 370[3], to 370[2] (least recently programmed or oldest). The order of the individual data packets 110[1][A]-110[N][P] within the storage log 350 may be determined based on the sequence information 113[1]-113[Y] of the respective log segments 370[1]-370[N] and the relative storage unit(s) of the data packets 110[1][A]-110[N][P] within the log segments 370[1]-370[N]. In the FIG. 3A embodiment, the log order 352 from most recent to oldest is: 110[N][P]-110[N][A], 110[1][P]-110[1][A], 110[3][P]-110[3][A], and 110[2][P]-110[2][A].

Figure 3B:
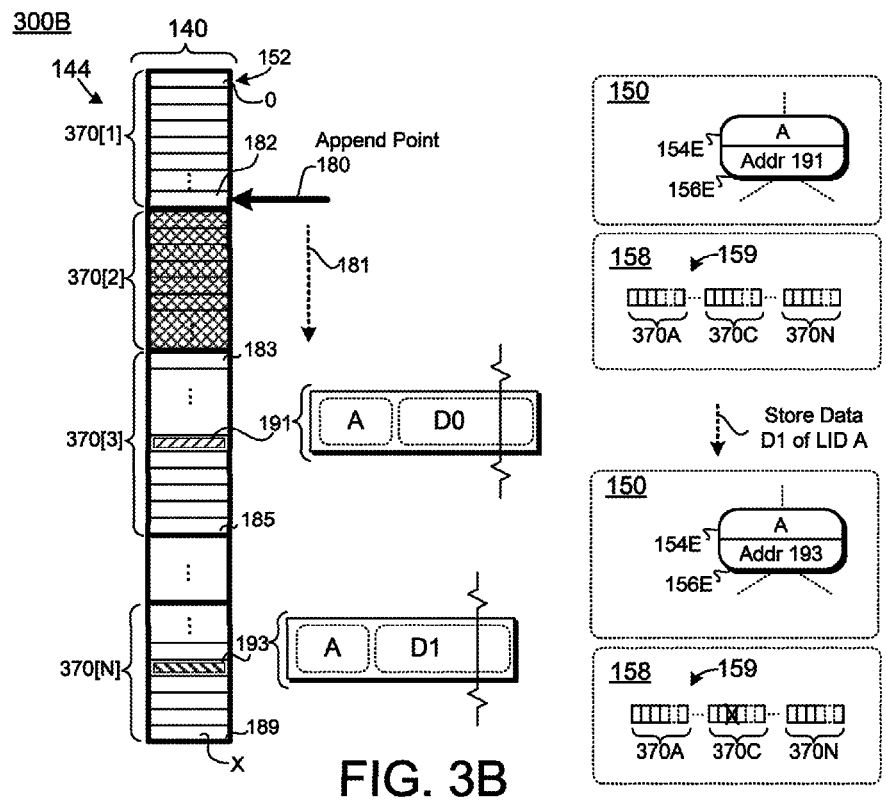
FIG. 3B depicts one embodiment of sequential storage operations of a storage module.

FIG. 3B depicts one embodiment 300B of storage operations, performed by the storage module 130, configured to append data to an ordered storage log 350. As disclosed herein, the storage module 130 may be configured to manage the storage address space 142 as a plurality of log segments 370[1]-370[N], which may comprise a set of commonly managed log storage units 371 (e.g., pages, sectors, blocks, virtual pages, and/or the like). The log storage units 371 may correspond to respective storage addresses within the storage address space 142 (e.g., storage address 0 of log segment 370[1] through storage address X of log segment 370[N]).

The log storage module 135 may be configured to store data sequentially within respective storage divisions 370[1]-370[N], by use of the storage controller 139. The log storage module 135 may be configured to sequentially append data packets 110 at a current append point 180 within the storage address space 142. In the FIG. 3B embodiment, the current append point 180 corresponds to storage unit 182 of log segment 370[1]. The log storage module 135 may be configured to sequentially increment the append point 180 within the log segment 370[1] until the storage division 370[1] is fully programmed (and/or filled within a threshold or boundary condition). The append point 180 may be incremented within the log segment 370[1] according to the sequential, interleaved pattern disclosed above.

In response to filling the log segment 370[1], the log storage module 135 may be configured to advance 181 the append point 180 to a next available log segment 370[2]-370[N]. As used herein, an "available" log segment 370 refers to a log segment 370 that is "writeable" and/or is in a "writeable state." A "writeable" log segment 370 refers to a log segment 370 comprising media storage units 160 that are writeable (e.g., have been initialized and have not yet been programmed). Conversely, log segments 370 that have been programmed and/or are not initialized are "unavailable," "un-writeable," and/or in an "un-writeable" state. Advancing 181 the append point 180 may comprise selecting a writeable log segment 370[2]-370[N]. As disclosed in further detail herein, in some embodiments, advancing 181 the append point 180 to the next available log storage unit may comprise selecting a log segment 370[1]-370[N] from a write queue.

In the FIG. 3B embodiment, the log segment 370[2] may be unavailable for use by the log storage module 135 (e.g., un-writeable) due to not being in an erased/initialized state, being out-of-service due to high error rates, and/or the like. Therefore, after filling the log segment 370[1], the log storage module 135 may skip the unavailable storage division 370[2] and advance 181 the append point 180 to the next available storage division 370[3]. The log storage module 135 may be configured to continue appending data to log storage units 183-185, after which the append point 180 is advanced to a next available log segment 370[1]-370[N], as disclosed herein.

Figure 3C:
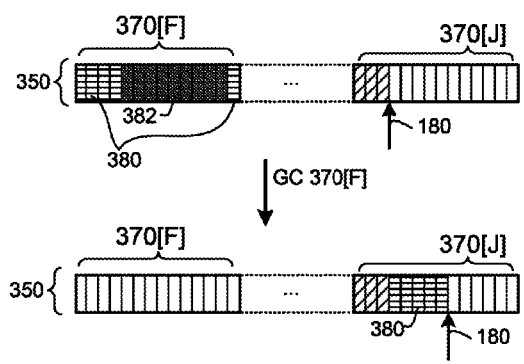
FIG. 3C depicts one embodiment of a recovery operation in a storage log.
Figure 3D:
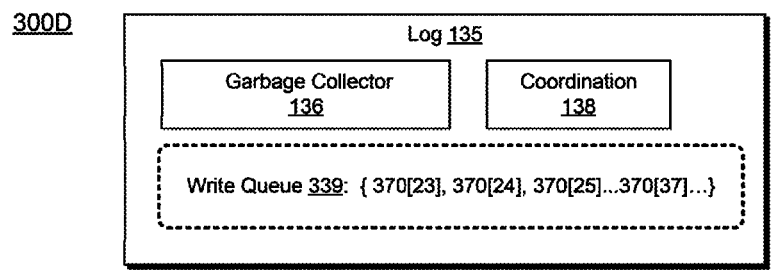
FIG. 3D depicts one embodiment of a media management module comprising a reserve module.
Figure 3D:
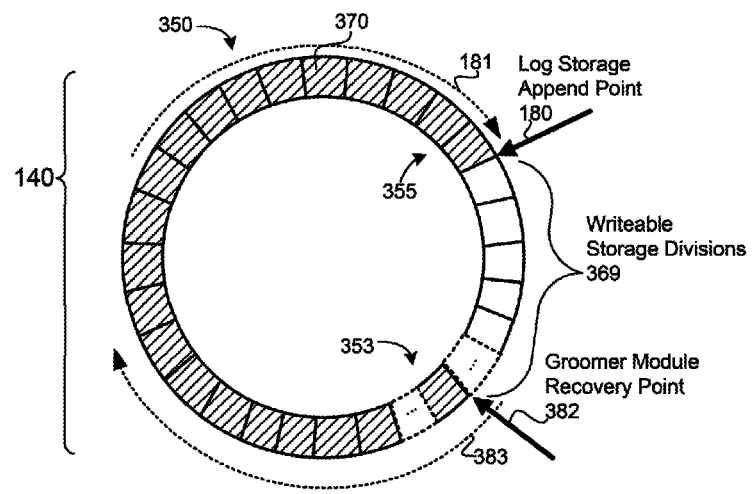

After storing data on the "last" log storage unit within the storage address space 142 (e.g., log storage unit 189 of log segment 370[N]), the log storage module 135 may advance 181 the append point 180 by wrapping back to the first log segment 370[1] (or the next available log segment 370[2]-370[N], if the log segment 370[1] is unavailable). Accordingly, the storage module 130 may be configured to manage the storage address space 142 as a loop or cycle (e.g., as illustrated in FIG. 3D).

The log storage format implemented by the storage module 130 may be used to modify and/or overwrite data out-of-place. As disclosed above, performing storage operations out-of-place may avoid performance and/or endurance issues, such as erase latency and/or write amplification. In the FIG. 3B embodiment, a data segment D0 corresponding to LID A may be stored at log storage unit 191 of log segment 370[3]. The data segment D0 may be stored in association with persistent metadata (e.g., in the packet format 110, disclosed above). The data segment 112 of the data packet 110 may comprise the data segment D0, and the persistent metadata 114 may comprise the LID(s) associated with the data segment (e.g., LID A). An I/O client 106 may request an operation to modify and/or overwrite the data associated with the LID A, which may comprise replacing the data segment D0 with data segment D 1. The storage module 130 may perform this operation out-of-place by appending a new data packet 110 comprising the data segment D1 at a different location on the storage medium 140, rather than modifying the existing data in place, at log storage unit 191. In the FIG. 3B embodiment, the data segment D1 is stored in a data packet at log storage unit 193 of log segment 370[N]. The storage operation may further comprise updating the storage metadata 134 to bind LID A to the log storage unit 193 and/or to invalidate the obsolete data D0 at log storage unit 191. As illustrated in FIG. 3B, updating the storage metadata 134 may comprise updating an entry of the forward map 150 to associate the LID A 154E with the storage address of the modified data segment D1. Updating the storage metadata 134 may further comprise updating one or more reverse indexes and/or validity bitmaps, as disclosed in further detail herein.

Performing storage operations out-of-place (e.g., appending data to the storage log) may result in obsolete and/or invalid data remaining on the storage medium 140 and/or within the storage log 350. As used herein, "invalid data" refers to data that does not need to be retained on the storage medium 140. Invalid data may refer to data that has been overwritten, modified, erased, deleted, deallocated, and/or the like. As illustrated in FIG. 3B, modifying the data of LID A by appending the data segment D1 to the storage log at log storage unit 193 rather than overwriting and/or replacing the data segment D0 in place at log storage unit 191 results in keeping the obsolete version of the data segment D0 on the storage medium 140. It may not be efficient to immediately remove the obsolete version of the data segment D0 since, as disclosed above, erasing the data segment D0 may involve reinitializing the log segment 370[1], which may comprise a) relocating valid data stored on the log segment 370[1], and b) erasing the log segment 370[1]. The log segments 370[1]-370[N] may comprise a large number of media storage units 160 (e.g., a log segment 370 corresponding to a VSDG 167 may comprise 100 erase blocks, each of which may comprise 256 pages, for a total of 2,560 media storage units 160); therefore, reinitializing the log segment 370[1] may result in significant write amplification. Similar write amplification may occur as a result of other client requests. For example, a client 106 may deallocate data stored on the storage medium 140 by use of, inter alia, a TRIM message, cache eviction notice, and/or the like. Further embodiments of systems and methods for coordinating deallocation between clients 106 and the storage module 130 are disclosed in U.S. Pat. No. 8,261,005, entitled, "Apparatus, System, and Method for Managing Data in a Storage Device with an Empty Data Token Directive," issued Sep. 4, 2012 to David Flynn et al., U.S. patent application Ser. No. 14/045,605, entitled "Systems and Methods for Persistent Address Space Management," filed Oct. 4, 2013 for David Atkisson et al., and U.S. patent application Ser. No. 14/075,951, entitled, "Systems and Methods for Log Coordination," filed Nov. 8, 2013 for Nisha Talagala et al., each of which is hereby incorporated by reference in its entirety.

As disclosed above, removing deallocated data may include relocating other valid data stored in the same log segment 370, which may require rewriting the data at the head of the storage log 350 (e.g., at the append point 180). The storage module 130 may be configured to remove invalid data (and/or reclaim log segments 370) in a background process. The log storage module 135 may comprise a garbage collector 136 configured to a) scan the log segments 370 to identify segments that should be reclaimed and b) identify log segments 370 to be reinitialized and/or prepared for reuse. The garbage collector 136 may be configured to select log segments 370 to be reinitialized and/or identify valid data on the selected log segments 370 by use of, inter alia, storage metadata 134. In some embodiments, the storage metadata 134 maintained by the storage module 130 comprises a reverse index 158. The reverse index 158 may be configured to identify invalid data within the log segments 370[1]-370[N]. The reverse index 158 may comprise one or more validity bitmaps that include entries 159 configured to identify log storage unit(s) 371 comprising invalid data. The reverse index 158 may be further configured to maintain information pertaining to the media storage units 160 and/or media storage divisions 162 comprising the log segments 370[1]-370[N], which may include, but is not limited to: wear level, reliability characteristics (e.g., error rate), performance characteristics (e.g., read time, write time, erase time, and so on), data age (e.g., time since last program operation, refresh, or the like), read disturb count, write disturb count, and so on. The garbage collector 136 may be further configured to perform other media management operations including, but not limited to, refreshing data stored on the storage medium 140 (to prevent error conditions due to data degradation, write disturb, read disturb, and/or the like), monitoring media reliability conditions, and/or the like.

In the FIG. 3B embodiment, storing the data segment D1 of LID A at log storage unit 193 renders data segment D0 at log storage unit 191 invalid (obsolete). In response, the storage module 130 may be configured to mark the entry 159 associated with log storage unit 191 to indicate that the log storage unit 191 comprises data that does not need to be retained on the storage medium 140. Although embodiments of a reverse index 158 and/or validity bitmaps are described herein, the disclosure is not limited in this regard and could be adapted to mark and/or identify invalid data using any suitable technique including, but not limited to: maintaining a separate validity index, storing validity information on the storage medium 140 (e.g., in the log segments 370[1]-370[N]), reference counts, a mark-and-sweep operation using the forward index 150, and/or the like.

In some embodiments, the storage module 130 is configured to reconstruct the storage metadata 134, including the forward map 150, by using the contents of the storage log 350 on the storage medium 140. In the FIG. 3B embodiment, the current version of the data associated with LID A may be determined based on the relative log order of the data packets 110 at log storage units 191 and 193. Since the data packet at log storage unit 193 is ordered after the data packet at log storage unit 191 in the storage log 350, the storage module 130 may determine that log storage unit 193 comprises the most recent, up-to-date version of the data corresponding to LID A. The storage module 130 may reconstruct the forward map 150 to associate the LID A with the data packet at log storage unit 193 (rather than the obsolete data at log storage unit 191). The storage module 130 may be further configured to mark the log storage unit 193 as comprising invalid data that does not need to be retained on the storage medium 140.

In some embodiments, the garbage collector 136 is configured to operate as a background process, outside of the critical path for servicing storage requests of the I/O clients 106. The garbage collector 136 may identify log segments 370[1]-370[N] to reclaim based on one or more factors, which may include, but are not limited to, the amount of invalid data stored on the log segment 370[1]-370[N], the amount of valid data in the log segment 370[1]-370[N], wear levels of the log segment 370[1]-370[N] (e.g., number of program/erase cycles), time since the storage division 370[1]-370[N] was programmed and/or refreshed, the relative order of the storage division 370[1]-370[N] within the storage log 350, and so on.

As used herein, an operation to reclaim a log segment 370 may comprise: a) identifying valid data stored on the log segment (by use of the storage metadata 134), b) relocating the identified data to other log storage units (e.g., at the current append point 180), and c) reinitializing the log segment 370 (e.g., erasing the media storage units 160 and/or media storage divisions 162 comprising the log segment 370). FIG. 3C depicts one embodiment of a garbage collection operation to compact a log segment 370[F]. In the FIG. 3C embodiment, the log segment 370[F] comprises valid data 380 and invalid data 382. The garbage collector 136 may select the log segment 370[F] for compaction based on one or more of the factors disclosed herein. Reclaiming the log segment 370[F] may comprise relocating the valid data 380 by appending the valid data 380 at the current append point 180 in the log (within log segment 370[J]). The invalid data 382 may be erased from the storage medium 140 (in the erasure of the log segment 370[F]). Compacting the log segment 370[F] may further comprise: marking the log segment 370[F] with sequence information 113 configured to identify an order of the log segment 370 within the storage log 350, placing the reinitialized log segment 370[F] in a write queue, updating the forward map 150 to indicate the new storage location of the relocated, valid data 380, and so on. Preparing a log segment 370 for reuse may, therefore, include resetting the log segment 370 and/or making the log segment 370 available to the log storage module 135. Further embodiments of systems and methods for reclaiming storage resources are disclosed in U.S. Pat. No. 8,402,201, entitled "Apparatus, System, and Method for Storage Space Recovery in Solid-State Storage," issued on Mar. 19, 2013 to David Flynn et al., which is hereby incorporated by reference in its entirety.

FIG. 3D is a block diagram of one embodiment 300D of a log storage module 135. The log storage module 135 includes a garbage collector 136 configured to reinitialize log segments 370, as disclosed herein. The log storage module 135 may be further configured to manage a write queue 339 that identifies log segments 370 that are in a writeable state (e.g., log segments 370 comprising media storage units 160 that have been erased and/or initialized). The garbage collector 136 may place log segments 370 into the write queue 339 in response to recovering and/or initializing the log segments 370[1]-370[N]. The log storage module 135 may access the write queue 339 to advance the append point 180 within the storage log 350, as disclosed herein. The write queue 339 may be maintained in the storage metadata 134 and/or in separate metadata storage.

The number of log segments 370 in the write queue 339 may determine the amount of write capacity currently available to the storage module 130. As used herein, "write capacity" refers to the amount of capacity that is currently available for storing data on the storage medium 140 (e.g., storage capacity that is in a writeable state). Accordingly, the write capacity may correspond to the number of log segments 370 that are currently in a writeable state. The write capacity may differ from the amount of "free" physical storage capacity on the storage medium 140. As used herein, "free" physical storage capacity refers to physical storage capacity that is not currently in use to store valid data. "Used" or "occupied" physical storage capacity refers to physical storage capacity that is currently being used to store valid data. As disclosed above, the storage module 130 may be configured to write data out-of-place due to the asymmetric, write-once properties of the storage medium 140. Accordingly, data that is invalid and/or obsolete may remain on the storage medium 140 until removed in a storage recovery operation. The media storage units 160 that are occupied by invalid data (and/or are in a non-writeable state) represent storage capacity that could be used to store other valid data, but is not available to do so until it is reinitialized by garbage collector 136.

The garbage collector 136 may be configured to iterate over the storage address space 142 to identify log segments 370 for recovery. As disclosed above, log segments 370 may be selected based on the amount of invalid data therein, the last program time of the log segments 370, reliability metrics, and the like. The garbage collector 136 may be configured to evaluate log segments 370 at a recovery point 382 within the storage address space 142. The recovery point 382 may correspond to a "tail" region 353 of the storage log 350. As used herein, the tail region 353 of the storage log 350 refers to a region of the log 350 comprising older log segments 370 (e.g., log segments 370 programmed earlier than other more recent log segments 370, such as the log segment 370[2] of FIG. 3A). Conversely, the "head" region 355 comprises log segments 370 that were programmed more recently to the storage log 350. The garbage collector 136 may be configured to evaluate and/or reclaim log segments 370 within the tail region 353 before evaluating and/or reclaiming log segments 370 in the head region 355. The garbage collector 136 may, therefore, be configured to traverse the storage log 350 in reverse log order 383 (e.g., from older log segments 370 to more recent log segments 370).

The log storage module 135 may be configured to schedule storage recovery operations at a rate configured to ensure that the log storage module 135 has sufficient write capacity to efficiently satisfy write requests of the clients 106. Reclamation operations may be scheduled to occur at a similar rate to which the log storage module 135 is appending data to the storage medium 140. The log storage module 135 may, therefore, increase and/or decrease the priority of the garbage collector 136 in accordance with the rate of write operations, the availability of write capacity, availability of reserve, and the like. Further embodiments of systems and methods for managing write capacity of a storage medium are disclosed in U.S. Provisional Patent Application No. 61/893,024 entitled, "Systems and Methods for Adaptive Reserve Storage," filed on Oct. 18, 2013 for Michael F. Brown et al., which is hereby incorporated by reference in its entirety.

Figure 4:
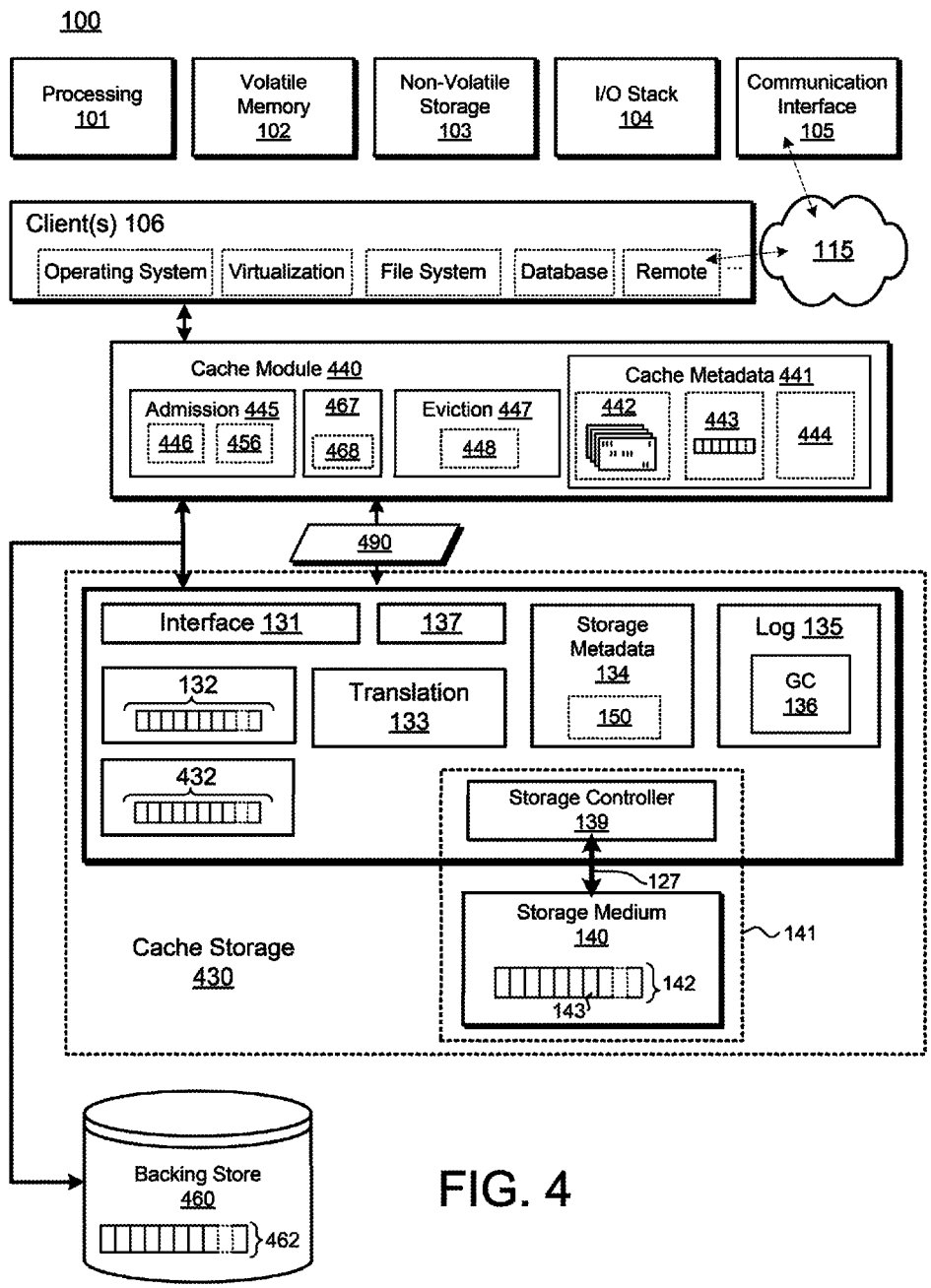
FIG. 4 is a block diagram depicting embodiments of a storage module and a cache module.

Referring to FIG. 4, the storage module 130 may be configured to service I/O requests of one or more clients including a cache module 440. The cache module 440 may be configured to cache data corresponding to a backing store 460 by use of the storage module 130 (e.g., cache data of the backing store 460 on the storage medium 140). Accordingly, the storage module 130 may be used as cache storage 430 for the cache module 440. In some embodiments, the storage module 130 may configured to provision physical storage capacity of the storage medium 140 to the cache module 440. The cache module 440 may be provisioned a portion of the available physical storage capacity for use as cache storage 430, and other portions of the available physical storage capacity may be available for use by other clients 106. Alternatively, the entire usable and/or available storage capacity of the storage module 130 may be designated for use as cache storage 430. The backing store 460 may be one or more storage resources including, but not limited to: one or more hard disks, network attached storage (NAS), a SAN, and/or the like. The backing store 460 may comprise a plurality of physical storage units capable of storing data. The backing store 460 may correspond to an address space (backing store address space 462), which may comprise a set, a range, and/or an extent of backing store identifiers (e.g., backing store LIDs). The backing store 460 may be communicatively coupled an I/O stack 104 of the computing system 100. Alternatively, or in addition, the backing store 460 may be communicatively coupled to the computing system 100 (and storage module 130) through the network 115.

In some embodiments, the cache module 440 is configured to monitor I/O requests in the I/O stack of the computing system 100 in order to, inter alia, identify I/O requests directed to the backing store 460. The cache module 440 may selectively service the identified I/O requests in the cache (e.g., by use of the storage module 130). Alternatively, or in addition, the cache module 440 may be configured to receive I/O requests for the backing store 460 directly. The cache module 440 may be configured to maintain cache metadata 441 corresponding to data that has been admitted into cache storage 430. The cache metadata 441 may include, but is not limited to: access metadata 442, sequentiality metadata 443, cache tags 444, and/or the like. As disclosed in further detail herein, the access metadata 442 may comprise information regarding I/O requests pertaining to the backing store 460. The access metadata 442 may correspond to data that has been admitted into cache storage 430 (e.g., is stored on the storage medium 140) and data that has not been admitted into the cache. The sequentiality metadata 443 may comprise information pertaining to data access sequentiality. As disclosed in further detail herein, the cache module 440 may be configured to identify data to admit into the cache (and/or evict) by use of the one or more of the access metadata 442 and/or sequentiality metadata 443.

The cache tags 444 may identify data of the backing store 460 that has been admitted into cache storage 430. The cache tags 444 may comprise fully associative, any-to-any mappings between LIDs corresponding to backing store data and identifiers of the storage module 130. The cache tags 444 may be implemented by use of a map, a tree, or another data structure (e.g., such as the forward map 150, disclosed herein). Although FIG. 4 depicts cache tags 444 managed by the cache module 440, the disclosure is not limited in this regard. In some embodiments, the cache module 440 delegates management of the cache tags 444 to the storage module 130. The storage module 130 may be configured to allocate LIDs of the logical address space 132 for use by the cache module 440. As depicted in FIG. 4, the allocated LIDs may be maintained in a separate virtual storage unit (VSU) 432. Alternatively, the LIDs may be allocated to the cache module 440 from within the logical address space 132 (e.g., as a portion, a range, and/or an extent within the logical address space 132). Accordingly, although the cache VSU 432 is depicted as a separate namespace, the disclosure is not limited in this regard and could implement the cache VSU 432 within the logical address space 132 and/or another suitable namespace. LIDs allocated to the cache module 440 (and/or other clients 106) may not be associated with and/or assigned to storage units 143 on the storage medium 140 until data is written to the LIDs. Therefore, LID allocations may not consume physical storage resources of the storage module 130.

The LIDs of the cache VSU 432 may correspond to an address space 462 of the backing store (e.g., may correspond to logical and/or physical storage units of the backing store 460). Accordingly, the identifiers of the cache VSU 432 may correspond to identifiers of the backing store address space 462. The translation module 133 of the storage module 130 may be configured to map identifiers of the cache VSU 432 to storage units 143 on the storage medium 140, as disclosed herein (e.g., by use of the forward map 150). Alternatively, the identifiers of the cache VSU 432 may correspond to a separate address space and may be mapped to identifiers of the backing store 460, as disclosed above. In some embodiments, the LIDs of the cache VSU 432 may be exposed to the clients 106 through one or more of the storage interface 131, an interface of the cache module 440, the I/O stack 104, and/or the like. Clients 106 may issue storage requests pertaining to the backing store 460 by use of identifiers of the cache VSU 432. In some embodiments, the cache VSU 432 may be thinly provisioned, such that the logical capacity of the cache VSU 432 exceeds a storage capacity of the backing store 460 and/or storage medium 140.

Cache management operations performed by the cache module 440 may have a significant impact on the performance of the storage module 130 and/or wear on the storage medium 140. Cache operations may introduce Cache Layer Write Amplification (CLWA). As used herein, CLWA refers to additional write operations stemming from upper-level cache operations. For example, evicting data from the cache may comprise invalidating data stored in one or more segments 370 of the storage log 350. As disclosed above, the garbage collector 136 may be configured to compact or reclaim log segments 370 for reuse by the storage log 350. Reclaiming a log segment 370, however, may increase CLWA, since valid data in the segment 370 comprising the evicted data must be relocated. Moreover, due to the any-to-any translation layer implemented by the storage module 130, proximity in the logical address space 132 and/or cache VSU 432 may not correspond to locality within segments 370 of the storage log 350. Accordingly, the cache module 440 may be incapable of reducing CLWA by evicting contiguous ranges and/or extends to LIDs from the cache. Flash layer write amplification (FLWA) may occur due to the asymmetric, write-once properties of the storage medium 140. As disclosed in further detail herein, FLWA may result from cache-driven eviction.

The inventors have observed that FLWA and/or CLWA can result in significantly increased wear on the storage medium 140. Table 1 comprises the results of a cache simulation. In the Table 1 simulation, the cache module 440 and storage module 130 were configured to operate independently. The cache module 440 was configured to admit all misses and to evict data based on a least recently written metric. The Table 1 simulation was generated using a TPC-E trace (e.g., a simulation of an On-Line Transaction Processing (OLTP) workload). As illustrated in Table 1, the write load on the storage module 130 (Total Writes) is significantly more intensive than the original workload (Original Writes). The write of the original workload, as well as cache misses, becomes writes at the storage module 130 (Cache Writes). The GC-Writes entry in Table 1 shows the extra writes performed by the storage module 130 to reclaim storage resources (extra writes to relocate data during garbage collection).

TABLE 1

| (Sizes in GiB) | | | | | | | | | |
|---|---|---|---|---|---|---|---|---|---|
| Original Reads | Original Writes | Cache Size | Cache Writes | GC Writes | Total Writes | CLWA | FLWA | TCWA | Hit Rate |
| 331.9 | 36.8 | 80 | 322.13 | 1553.98 | 1876.75 | 8.75 | 5.82 | 50.93 | 14.03 |
| | | 100 | 300.11 | 1459.13 | 1759.24 | 8.16 | 5.86 | 47.82 | 20.67 |
| | | 120 | 275.83 | 1352.01 | 1627.84 | 7.50 | 5.90 | 44.25 | 27.98 |

The storage medium 140 may be capable of enduring a limited number of program erase cycles. Therefore, the increased write workload may decrease the useful lifespan of the storage medium 140. Moreover, the storage medium 140 may be subject to asymmetric operational latencies, such that write and/or erase operations take significantly longer to complete than read operations, and as such, the increase write load may decrease the performance of the computing system 100.

In some embodiments, the cache module 440 and/or storage module 130 may be configured to reduce CLWA and/or FLWA. The cache module 440 may be configured to implement more restrictive cache admission policies in order to reduce low-value cache writes and/or cache thrashing. In particular, the cache admission policies may be configured to reduce the likelihood of poisoning the cache with data that is unlikely to be frequently accessed by the clients 106. Alternatively, or in addition, the storage module 130 and/or cache module 440 may be configured to coordinate cache management and/or storage operations. In some embodiments, the storage module 130 is configured to manage cache eviction for the cache module 440. The storage module 130 may implement a garbage collector eviction policy (GC policy) to coordinate cache eviction with storage recovery operations. The cache module 440 may be configured to delegate eviction and/or other cache management operations to the storage layer 130. Alternatively, or in addition, the coordination may comprise communicating eviction and/or deallocation messages between the storage module 130 and the cache module 440.

The cache module 440 may be configured to reduce CLWA and/or FLWA by use of an admission module 445. As illustrated in the Table 1 embodiment, CLWA may be due, in part, to a permissive cache admission policy (e.g., admit all misses), which may result in admitting low-value data into the cache and/or cause cache thrashing. The admission module 445 may be configured to selectively admit data into the cache based on an admission policy 446. The admission policy 446 may be configured to predicate cache admission on one or more admission criteria, which may include, but are not limited to: access metric criterion (e.g., touch count), sequential rejection criterion, a combination of access metric and sequential rejection, and/or the like. As used herein, "admitting" data into the cache refers to storing the data on the storage medium 140 and/or associating data stored on the storage medium 140 with a cache tag 444 and/or entry in the forward map 150. Admitting data into the cache may, therefore, include a) writing data to the storage device 141 and b) associating the data with an entry in the forward map 150 (and/or cache tag 444). Data may be admitted into the cache in response to a cache miss.

As disclosed above, in some embodiments, the cache module 440 is configured to monitor I/O requests within the I/O stack 104 of the computing system 100 (e.g., using, inter alia, a filter driver) to identify I/O requests pertaining to the backing store 460 (based on the identifier(s) of the I/O requests) and selectively service the identified I/O requests by use of the storage module 130. Alternatively, clients 106 may issue storage requests directly to the cache module 440 (and/or storage layer) through LIDs associated with the backing store 460 (e.g., a cache VSU 432 and/or the like). The cache module 440 may identify a cache miss in response to a) identifying an I/O request pertaining to the backing store 460, and b) determining that the requested data has not been admitted into the cache and/or pertains to data not in the cache (e.g., a cache write).

In response to a cache miss, the admission module 445 may determine whether to admit the corresponding data into the cache. The admission module 445 may implement an admission policy 446 configured to distinguish high-value data (data that is suitable for admission to the cache) from low-value data (data that is not suitable for cache admission). As used herein, "high-value" data that is suitable for admission to the cache refers to data that is likely to be subsequently accessed by one or more storage clients 106. By contrast, data that is "unsuitable for cache admission" refers to data that is unlikely to be subsequently requested by a client 106 (e.g., "single-use" data). Admitting unsuitable data may result in "poisoning" the cache by, inter alia, filling the available cache capacity with data that is unlikely to be frequently accessed. Moreover, admitting unsuitable data may result in increased CLWA, due to unnecessary write operations and/or cache thrashing, as illustrated above.

The cache module 440 may be configured to reduce CLWA by implementing one or more cache admission policies. The cache admission policies may be configured to reduce the amount of low-value data admitted into the cache (as opposed to the permissive, admit all policy of Table 1). In some embodiments, the cache admission policy 446 may be predicated on data access metrics (e.g., a history of accesses to a particular LID). In particular, the cache admission policy 446 may be configured to admit data into the cache after the data satisfies an access threshold (e.g., has been accessed by one or more clients 106 within a particular timeframe and/or window). Accordingly, initial accesses to the data may result in cache misses, which may reduce the initial hit rate of the cache, but reduce CLWA. The cache admission policy 446 may be based on access metadata 442 (touch count and/or touch metric). The access metadata 442 may comprise information pertaining to data access characteristics of LIDs corresponding to the backing store 460. The access metadata 442 may comprise information pertaining to access characteristics across the entire address space 462 of the backing store 460 (and/or the entire cache VSU 432). Accordingly, the access metadata 442 may comprise access metadata pertaining to data that has been admitted into the cache as well as access metadata pertaining to "non-cached" data. As used herein, "cached data" and/or a "cached LID" refers to a LID corresponding to data that has been cached on the storage medium 140. "Non-cached" data and/or a "non-cached" LID refers to a LID corresponding to data that is not cached on the storage medium 140. As disclosed herein, the access metadata 442 may be used to identify data suitable for caching regardless of whether the data is presently in the cache. The cache module 440 may be configured to update the access metadata 442 in response to data accesses. Updating the access metadata 442 may comprise including an indication of the data access in the access metadata 442. As used herein, a data access may include, but is not limited to: a read request, a write request, a modify request, an overwrite request, and/or the like.

The cache admission module 445 may admit data into the cache in response to determining that access metric corresponding to the data satisfies a threshold and/or another admission criterion. The "access metric" of a particular data segment and/or LID refers to a value for quantifying the access characteristics the data and/or LID, such as access frequency, touch count, and/or the like. An access metric may comprise, but is not limited to: a binary value indicating an access to a LID within a pre-determined interval, an ordered set of such binary values, one or more counter values, or the like. As used herein, an "access threshold" refers to one or more pre-determined and/or dynamic thresholds, and "admission criteria" refers to any pre-determined or dynamic criteria (e.g., thresholds) for selectively admitting data into the cache. Accordingly, data may not be admitted to the cache in response to the first miss (as in the Table 1 embodiment). Rather, the admission module 445 may admit data into the cache in response to the access metric of the data satisfying the admission criterion (e.g., in response to the data being accessed in a manner that satisfies the criterion). Although an admission policy 446 configured to delay cache admission until an access pattern is established may lower hit rates initially, the admission policy 446 may ameliorate CLWA by reducing the likelihood of admitting low-value data into the cache (and/or reducing the amount of low-value data admitted into the cache).

In some embodiments, data that does not satisfy the admission criterion (e.g., the access threshold) may be admitted into the cache as "low-value" data. As used herein, "low-value" refers to data that may be admitted into the cache despite failing to satisfy the cache admission criteria. Low-value data may be admitted into the cache in response to the access metric satisfying less stringent cache admission criteria (e.g., a lower access threshold). Admission of low-value data may be predicated on the availability of cache capacity or other performance factors. Low-value data may be evicted from the cache before other higher-value data (e.g., data that satisfied the admission criteria). Accordingly, low-value data may be marked within the cache; admitting low-value data into the cache may comprise identifying the data as "low-value" in cache metadata 441, storage metadata 134, and/or the like. The low-value indication may comprise persistent metadata as described above in conjunction with FIG. 1C. Alternatively, low-value data may not be admitted into the cache to reduce CLWA, as disclosed above.

In some embodiments, the access metadata 442 may comprise one or more data structures, such as bitmaps, configured to represent the address space of the backing store 460 and/or cache VSU 432. The access metadata may comprise entries for each physical storage location of the backing store 460, including both cached and non-cached data. The access data structure 946 may be sparsely provisioned, such that entries are created on an as-needed basis. In some embodiments, the access metadata data structure(s) may comprise one or more bitmaps (or bit arrays), wherein each entry comprises a single bit. The bit values may indicate whether one or more data accesses corresponding to the LID(s) of the entry occurred during a particular interval. The data structure may be "reset" at the expiration of an interval. As used herein, "resetting" an access data structure refers to clearing access indications from the access data structure (e.g., resetting the entries 948 to a "0" value). Accordingly, a "1" value may indicate that one (or more) data accesses occurred during the interval, and a "0" value may indicate that no data accesses occurred during the interval. Alternatively, entries of the access metadata may comprise multi-bit counters to quantify the number of access requests during the interval. The counters may be reset (or decremented) at the expiration of an interval (e.g., a clock sweep interval).

In some embodiments, the access metadata 442 may comprise an ordered set of access data structures, including a "current" access data structure and one or more "previous" access data structures. Each access data structure may comprise respective entries comprising access characteristics of one or more LIDs, as described above. The current access data structure may correspond to a current interval and may be actively updated in response to data accesses. The previous access data structures may comprise access characteristics of previous intervals and may not be actively updated. Upon expiration of the current interval, the access data structures may be rolled over, an empty "reset" data structure may replace the current data structure, the current access data structure may be designated as a previous data structure, and so on. A last data structure (data structure corresponding to the oldest interval) may be removed.

An access metric of a LID may be determined by combining entries of the current and one or more previous access data structures. In some embodiments, the combination may comprise an additive operation, such as a logical OR operation, such that the access metric reflects any access across the data structures. In some embodiments, the combination may comprise a bitwise combination of entries of two or more data structures, by one or more of a logical AND, OR, XOR, and/or the like. Similarly, the combination may comprise a summation or product of entries of two or more access data structures. In some embodiments, the combination may comprise weighting access characteristics according to their recency; recent access characteristic may be weighted more heavily than older access characteristics. Determining the access metric may comprise multiplying the access characteristics by a recency factor (e.g., by left shifting an access characteristic bit or counter value), as illustrated in Equation 1 below:

$$AM = \sum_{i=o}^{N-1} R_i \cdot AC_i \qquad \text{Eq. 1}$$

In Equation 1, the access metric (AM) is a weighted combination of the access characteristics ($AC_i$) of respective entries in the access data structures from current (i=0) to oldest (i=N-1). The recency factor ($R_0$) applied to the access characteristic of the current access data structure ($AC_0$) may be greater than the recency factor ($R_{N-1}$) applied to the access characteristic of the "older" access data structure. In another embodiment, the access metric (AM) of a LID may be determined by "bitwise shifting" one or more access characteristics ($AC_i$) of respective entries in the access data structures as follows:

$$AM = \sum_{i=0}^{N-1} AC_i << (N - 1 - i) \qquad \text{Eq. 2}$$

In Equation 2, the access metric (AM) is a weighted combination of the access characteristics ($AC_i$) of respective entries in the access data structures.

The cache module 440 may be configured to maintain access metadata 442 to track the access characteristics of each LID individually. Alternatively, the access metadata 442 may track access characteristics of groups, sets, and/or collections of LIDs, such that each entry in the access metadata corresponds to access characteristics of a plurality of LIDs. The cache module 440 may associate identifiers within entries of the access metadata 442 using any suitable mechanism including, but not limited to: a hash mapping, a range mapping, a hybrid mapping, and/or the like.

In some embodiments, the cache admission policy 446 implemented by the admission module 445 may comprise a sequentiality metric (e.g., sequential rejection). The sequentiality metric may be used in place of the access metric criterion disclosed above. Alternatively, the admission policy may be based on both access (touch count) and sequentiality metrics. As used herein, a "sequentiality metric" refers to a metric that quantifies the degree of sequentiality pertaining to a particular data access and/or set of data accesses. Sequential data accesses may be identified as low-value data and denied admission into the cache. As used herein, a "sequential access" refers to data accesses that are sequential (or proximate) within an address space (e.g., sequential with respect to the backing store address space 462, cache VSU 432, logical address space 132, and/or the like). Sequential data accesses are typically "single-use" accesses corresponding to a backup application, a virus scan, media streaming, and/or the like. The admission policy 446 may be configured to reject sequential data accesses from cache admission. The admission policy 446 may predicate cache admission on a sequentiality metric derived from sequentiality metadata 443. Rejecting data pertaining to sequential data accesses may reduce CLWA by avoiding unnecessary writes to the storage medium 140, as disclosed above.

The sequentiality metadata 443 may comprise a history of data accesses during a particular window (e.g., an ordered sequence of data accesses). The window may correspond to a particular time interval. The sequentiality metric of a particular data access may be determined by comparing the LID of the particular data access to LIDs of other data accesses that were proximate to the LID in time (other accesses in the same window). In some embodiments, the sequentiality metric may comprise a binary sequentiality indicator, which is asserted if the identifier of any of the data accesses in the window is within a proximity threshold to a LID of the particular data access. Alternatively, the sequentiality metric may comprise a multi-bit value quantifying the likelihood that the current data access is part of a sequential data access. The sequentiality metric may be incremented in response to identifying LIDs in the window that are within a proximity threshold to the particular LID and/or may be incremented in proportion to the degree of proximity between the LIDs (e.g., the more proximate the LIDs the more the sequentiality metric may be incremented). The sequentiality metric may remain unchanged (or be decremented) in response to LIDs within the window that are outside of the proximity threshold. In some embodiments, the contribution of data accesses to the sequentiality metric may be weighted by the relative ordering of the data accesses within the window (e.g., the temporal proximity of the data accesses to the current data access). Data accesses that are closer to the particular data access in time may be weighted more heavily than other data accesses.

In some embodiments, the size of the window (and/or the proximity threshold) maintained in the sequentiality metadata 443 may be adjusted in response to user preferences, performance monitoring, and/or the like. The window may be tuned according to data access characteristics of one or more clients 106, characteristics of the computing system 100 (e.g., number of processor cores, number of concurrent threads, etc.), and/or the like. The admission module 445 may be configured to admit data into the cache based on a sequentiality metric. Data may be admitted in response to a sequentiality metric that satisfies a "non-sequential" threshold (e.g., the sequentiality metric indicates that the data is unlikely to be part of a sequential data access pattern). As disclosed above, rejecting sequential data may reduce cache hit rate in certain circumstances, but may significantly reduce CLWA by, inter alia, avoiding write operations pertaining to lower-value, sequential data.

In some embodiments, the cache module 440 is configured to implement an admission policy 446 configured to incorporate both access metrics and sequential data rejection. The admission policy 446 may comprise one or more adaptive, inter-related thresholds. For example, the admission policy 446 may designate that data having a sequentiality metric indicating that it is part of a sequential data access is subject to a more stringent access metric threshold. Similarly, data having a low access metric (e.g., an access metric that fails to satisfy the access threshold) may be subject to a more stringent non-sequential threshold. In another embodiment, data having a sequentiality metric indicating that it is not part of a sequential data access may be subject to a less stringent access threshold, and data having a high access metric, which satisfies the access threshold, may be subject to a less stringent non-sequential threshold.

Figure 5A:
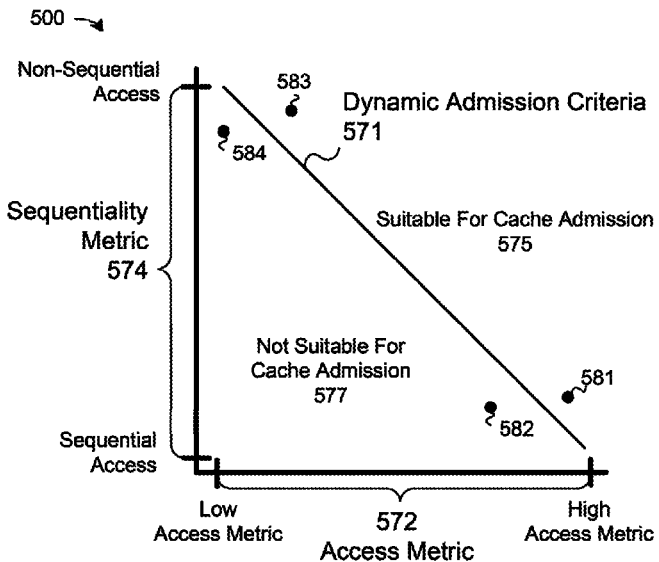
FIG. 5A depicts one embodiment of an adaptive cache admission criterion.

FIG. 5A is a plot 500 depicting one embodiment of a dynamic cache admission criteria 571 based upon sequentiality and access metrics. The plot 500 comprises an access metric axis 572 ranging from a low access metric to a high access metric and a sequentiality metric axis 574 ranging from a sequentiality metric indicating a sequential access to a metric indicating a non-sequential access. The sequentiality metric is considered because, as discussed above, data that is part of a sequential data access may pollute the cache, whereas data that is not part of a sequential access may be more suitable for cache admission. The dynamic admission criteria 571 distinguishes data suitable for admission to the cache (region 575) from data that is not suitable for admission to the cache (region 577). As illustrated in the plot 500, data having a high access metric may be admitted into the cache even through the sequentiality metric indicates a sequential data access (point 581). Since the sequentiality metric of point 581 indicates that the data is part of a sequential access, it may be subject to a higher access threshold for admission to the cache. For instance, data of point 582 may not be admitted into the cache despite having a relatively high access metric, since the access metric fails to satisfy the more stringent access threshold applied due to its sequentiality metric. In another example, data of point 583 may be admitted into the cache due to its sequentiality metric indicating that the data is not part of a sequential access, despite having a relatively low access metric. Data of point 584 may not be admitted into the cache despite its favorable sequentiality metric, due to the access metric failing to satisfy the less stringent access threshold.

Although the dynamic admission criteria 571 is depicted as linear, the disclosure is not limited in this regard and could be adapted to apply other types of dynamic admission criteria including parabolic, curved, exponential, or the like. Moreover, the disclosure is not limited to dynamic admission criteria in which the sequentiality and access metrics are equally rated.

Figure 5B:
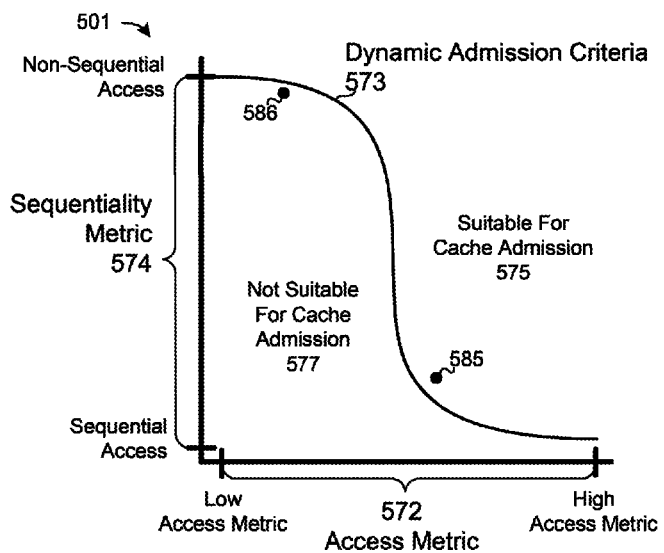
FIG. 5B depicts another embodiment of an adaptive cache admission criterion.

FIG. 5B is a plot 501 depicting another example of a dynamic admission criteria 573. The dynamic admission criteria 573 gives more weight to the access metric 572 than the sequentiality metric 574. As shown at point 585, data having a relatively high access metric may be admitted into the cache with little regard to the sequentiality metric. Conversely, and as shown at point 586, data having a relatively low access metric may be not admitted despite a sequentiality metric indicative of a non-sequential access.

Figure 5C:
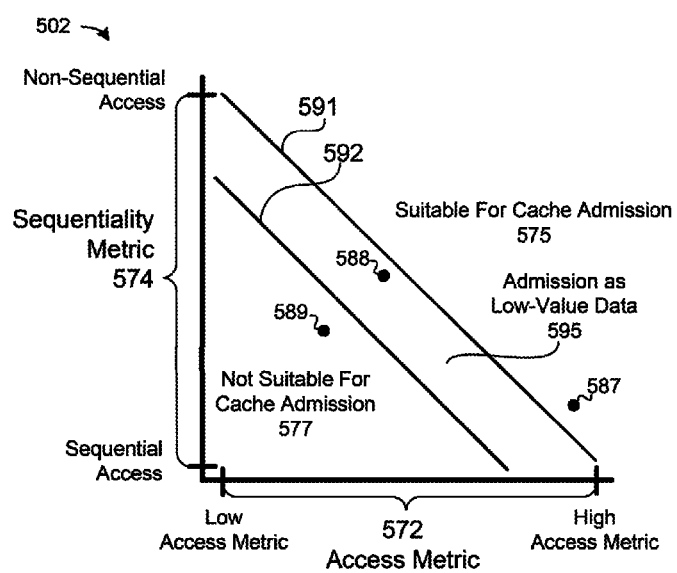
FIG. 5C depicts another embodiment of an adaptive cache admission criterion.

FIG. 5C is a plot 502 depicting another example of dynamic admission criteria comprising an admission criteria 591 and low-value admission criteria 592. The admission criteria 591 and 592 may define an admission region 575, a non-admission region 577, and a low-value admission region 595. Data having an access metric and/or sequentiality metric that falls into the admission region 575 may be admitted into the cache (e.g., data of point 587). Data that fails to satisfy the admission criteria 591, but satisfies the low-value admission criteria 592 may be admitted as low-value data, as described above (e.g., data of point 588). Data that fails to satisfy either criteria 591 or 592 may not be admitted into the cache (e.g., data of point 589).

The cache module 440 may further comprise an eviction module 447 configured to selectively evict data from cache storage 430 based on, inter alia, an eviction policy 448 (e.g., least recently written, least recently accessed, access metrics, sequentiality metrics, and/or the like). As used herein, cache eviction refers to removing data of the backing store 460 from the storage medium 140. In some embodiments, the eviction module 447 is configured to evict data when an access metric corresponding to the data satisfies an eviction threshold and/or another eviction criterion. As used herein, an "eviction threshold" refers to one or more pre-determined or dynamic thresholds and "eviction criteria" refers to any pre-determined or dynamic criteria (e.g., thresholds) for selectively removing data from cache storage 430.

The eviction policy 448 may be based on, inter alia, access metadata 442, sequentiality metadata 443, and/or the like, as disclosed herein. In some embodiments, the eviction criteria may be adapted in response to access metrics of other non-cached data, cache storage availability, write capacity, and/or the like. In one mode, as the access metrics of non-cached data increase, the eviction criteria may be modified to make eviction more likely (e.g., raise the bar for cache retention). Similarly, the eviction policy 448 may allow fewer evictions if the access metrics of non-cached LIDs indicate few accesses to any specific non-cached LIDs. The eviction policy 448 may be adjusted to be slightly lower or slightly higher than the access metrics of non-cached data to create a hysteresis loop that prevents undesired evictions and/or thrashing. The cache module 440 may be configured to coordinate the eviction policy 448 and the admission policy 446. When the eviction policy 448 is adjusted, a similar adjustment may be made to the admission policy 446 and/or vice versa.

The eviction policy 448 may be further configured to incorporate a sequentiality metric. Initial data accesses in a sequence of data accesses may not be initially recognized as being sequential. The cache eviction module 447 may be configured to evict previously admitted sequential data in response to recognizing a sequential access pattern (e.g., when a sequentiality metric satisfies a sequentiality threshold). The cache eviction module 447 may identify previously admitted sequential data by looking back at data accesses within a window (e.g., by use of the sequentiality metadata 443). Data accesses in the window that are associated with the sequence may be evicted. Alternatively, or in addition, the cache eviction module 447 may use a forward window and/or a history of access requests to identify previously admitted sequential data.

As disclosed herein, the cache module 440 and/or storage module 130 may be configured to reduce CLWA and/or FLWA by coordinating cache and/or storage operations. Referring to FIG. 4, the storage module 130 may comprise a coordination module 137 configured to coordinate storage operations with the cache module 440 (and/or other clients 106). The coordination module 137 may be configured to communicate coordination information pertaining to storage operations managed by the storage module 130 (by use of coordination message 490). As used herein, coordination information refers to information pertaining to the operation, configuration, and/or settings of a particular I/O module or service. The coordination module 137 may be configured to provide coordination information to clients 106 (e.g., the cache layer 440), which may use the coordination information to operate more efficiently. The cache module 440 may include a cache coordination module 467 configured to communicate coordination information pertaining to the cache layer. Coordination information may be communicated by use of coordination messages 490. In some embodiments, the coordination messages 490 are communicated through the interface 131 of the storage module 130 (and/or interface of the cache layer 440 and/or other client 106). Accordingly, coordination messages 490 may be communicated by use of existing storage APIs (e.g., fadvise, IO/CTL, and/or the like), the I/O stack 104 of the computing system, and/or the like. Alternatively, or in addition coordination messages 490 may be communicated by use of the network 115.

The coordination information provided by the storage module 130 may include, but is not limited to: information pertaining to the logical address space 132 and/or cache VSU 432, such as whether a particular LID exists in the forward map 150, information pertaining to the garbage collector 136, storage capacity, write capacity, media wear level, media wear rate, and so on. Coordination information provided by the cache module 440 may include, but is not limited to: deallocation information (e.g., eviction information), eviction information (e.g., whether a particular LID can be removed from the storage medium 140), eviction coordination information, and/or the like The coordination information provided by the cache module 440 may further include information pertaining to cache operations, such as cache performance, cache admission criteria, cache eviction criteria, and/or the like, which may include, but is not limited to: cache miss rate, cache hit rate, access and/or sequentiality metrics (e.g., access and/or sequentiality metrics pertaining to particular LIDs), the relative value of particular LIDs (e.g., whether the LID is hot or cold), cache admission policy 446, cache eviction policy 448 (e.g., whether the cache 440 has delegated eviction to the storage module 130), the discardability status of particular LIDs (e.g., whether the LID is dirty, has been destaged to the backing store 460, etc.), and/or the like. As used herein, destaging data to the backing store 460 refers to writing data that was modified and/or overwritten in the cache storage 430 to the backing store 460.

The cache module 440 may access coordination information provided by the storage layer 130 to efficiently manage cache operations and/or delegate functionality to the storage layer 130. As disclosed above, the cache module 440 may delegate management of cache membership metadata (e.g., cache tags 444) to the storage module 130. The cache module 440 may query the storage module 130 to determine whether particular LIDs have been admitted into the cache using an "exists" query. As used herein, an "exists" query refers to a query configured to determine whether a particular LID is bound to data stored on the storage medium 140. Accordingly, a LID that exists corresponds to data admitted into the cache. A LID that does not exist does not correspond to data on the storage medium 140 (e.g., is not currently in the cache). Further embodiments of systems and methods for an exists query (and/or other coordination embodiments) are disclosed in U.S. patent application Ser. No. 14/045,605, entitled, "Systems and Methods for Persistent Address Space Management," filed on Oct. 3, 2013 for David Flynn et al., and U.S. patent application Ser. No. 14/075,951, entitled, "Systems and Methods for Log Coordination," filed on Nov. 8, 2013 for Nisha Talagala et al., each of which is hereby incorporated by reference in its entirety. Delegating functionality to the storage module 130 may comprise providing coordination information to the storage layer 130 (e.g., coordination messages 490). The coordination information may be configured to instruct the storage module 130 to implement garbage-collector eviction of cached data by, inter alia, removing and/or erasing data cached on the storage medium 140 in storage recovery operations, as disclosed herein.

The cache coordination module 467 may be further configured to provide information pertaining to cache management operations to the storage layer 130. The coordination information provided by the cache module 440 may include, but is not limited to: deallocation information pertaining to cache eviction operations; cache mode information, such as whether the cache module 440 is configured to operate a write-through mode, a write-back mode, and/or the like; LID status information, such as whether data has been written back to the backing store 460 (e.g., whether the data is dirty and/or whether the data can be evicted); and/or the like.

Figure 6:
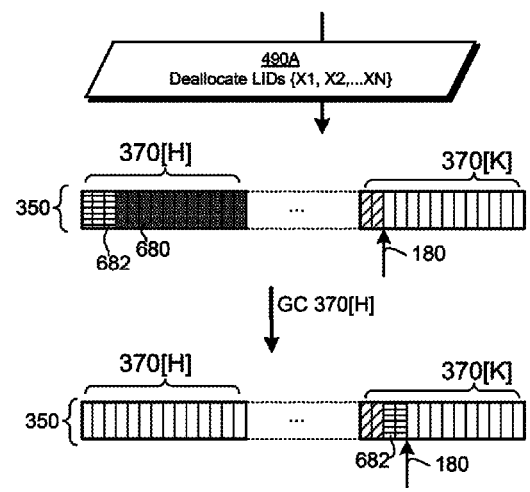
FIG. 6 depicts embodiments of coordination operations between a storage and cache module.

The cache module 440 may be configured to identify data that does not need to be retained on the storage medium 140 by use of, inter alia, coordination information, which may be communicated by use of coordination message 490. Referring to FIG. 6, the cache module 440 may be configured to evict data pertaining to LIDs X1-XN from the cache (by use of the eviction module 447, disclosed in further detail below). In response, the cache coordination module 467 may provide a coordination message 490A configured to identify the LIDs that have been evicted and, as such, no longer need to be retained on the storage medium 140. The coordination message 490A may comprise a deallocation hint, a TRIM message, a persistent TRIM message, and/or the like. In response to the coordination message 490A, the storage module 130 may invalidate the identified LIDs by, inter alia, removing the corresponding entries from the forward map 150 and/or marking the storage location(s) bound to the LIDs X1-XN as invalid in a reverse index 158, as disclosed herein.

The storage module 130 may use the coordination message 490A to operate more efficiently. As illustrated in FIG. 6, data 680 corresponding to LIDs X1-XN may be stored within a log segment 370[H]. In response to the coordination message 490A, the storage module 130 may deallocate the LIDs X1-XN. As disclosed herein, deallocating the LIDs X1-XN may comprise removing the LIDs X1-XN from the forward index, invalidating the corresponding storage location(s) (invalidating the storage locations comprising the data 680 in a reverse index 158). Deallocating the LIDs X1-XN may further comprise writing a persistent note to the storage medium 140 (e.g., a persistent TRIM note) configured to ensure that the deallocation is persistent and crash safe. The garbage collector 136 may reclaim the log segment 370[H], which may comprise relocating valid data 682 in the segment 370[H] at the current append point within the storage log 350 (in segment 370[K]). Based on the log coordination message 490A, the garbage collector 136 does not need to relocate the invalidated data 680, which may be removed from the storage medium 140 when the log segment 370[H] is erased. The garbage collector 136 may, therefore, avoid FLWA resulting from unnecessarily rewriting the evicted data 680.

The storage module 130 and/or cache module 440 may be configured to coordinate on other cache management operations, such as cache admission and/or cache eviction. In some embodiments, the admission policy 446 and/or eviction policy 448 of the cache module 440 may incorporate coordination message 490 from the storage module 130. The coordination message 490 may indicate the remaining physical storage capacity in the storage medium 140 (and/or remaining capacity allocated for use by the cache module 440), may indicate a write capacity of the storage module 130 (e.g., availability of initialized log segments in a write queue 339), reserve capacity, and/or the like. The cache module 440 may adjust the admission policy 446 and/or eviction policy 448 in response to the coordination message 490. In some embodiments, the cache module 440 may be configured to increase the thresholds for cache admission in response to coordination message 490 indicating a lack of write capacity, which may reduce the write load on the storage module 130. The cache module 440 may be further configured to increase the eviction rate of the eviction policy 448 in order to free up space for the garbage collector 136. In another embodiment, the cache module 440 may lower cache admission thresholds in response to coordination message 490 indicating high write capacity availability (and/or may decrease the eviction rate of the eviction policy 448). In some embodiments, the coordination message 490 may reallocate the physical capacity available to the cache module 440 due to a change in the reserve capacity of the storage module 130. Further embodiments of systems and methods for coordination are disclosed in U.S. Provisional Patent Application No. 61/893,024 entitled, "Systems and Methods for Adaptive Reserve Storage," filed on Oct. 18, 2013 for Michael F. Brown et al., which is hereby incorporated by reference in its entirety.

Figure 7:
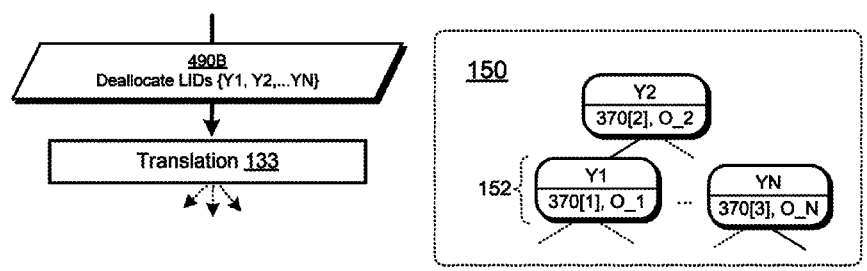
FIG. 7 depicts embodiments of coordination operations pertaining to garbage collection operations.
Figure 7:
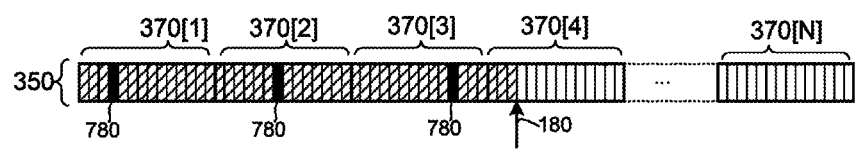

The storage module 130 and/or cache module 440 may be further configured to reduce FLWA by coordinating eviction operations. As disclosed above, the eviction module 447 may implement eviction policy 448 based on cache metadata 441 accessible to the cache module 440. The eviction module 447 may not be aware of the storage location(s) of the evicted data on the storage medium 140 (and/or within the storage log 350). Data may be selected for eviction without regard to the configuration and/or placement of the data on the storage medium 140 (the log segments 370 in which the data are stored). As a result, data evicted from the cache may be distributed throughout the segments 370 of the log, resulting in increased FLWA during garbage collection operations. Therefore, although the cache-based eviction policy may be efficient from a cache performance standpoint (e.g., retain higher-value data in the cache), the policy may be less efficient with respect to media endurance and/or wear. FIG. 7 depicts one embodiment of FLWA created by a cache-based eviction policy 448. In the FIG. 7 embodiment, the eviction policy 448 may be configured to select data for eviction based on a least recently accessed metric (LRU and/or LRW). The LIDs selected for eviction may comprise LIDs Y1-YN. The LIDs Y1-YN may correspond to a discontiguous and/or disjoint set of LIDs in the logical address space 132, cache VSU 432, and/or backing store address space 462.

In response to the eviction, the cache coordination module 467 may issue coordination message(s) 490B configured to deallocate the LIDs Y1-YN within the storage layer 130. Due to the any-to-any translation layer implemented by the storage module 130 (by the translation module 133 and/or forward map 150), the cache module 440 may not be aware of the layout of evicted data 780 within the storage log 350. In the FIG. 7 embodiment, the data 780 corresponding to the evicted LIDs Y1-YN is distributed throughout a plurality of log segments 370[1]-370[3] of the storage log 350. Entries 152 of the forward map 150 bind Y1 to a storage unit at offset O_1 within segment 370[1], bind Y2 to a storage unit at offset O_2 within segment 370[2], and bind YN to a storage unit at offset O_N within segment 370[3]. The entries 152 corresponding to LIDs Y1-Y2 may be removed from the forward map 150 in response to the coordination message 490B, as disclosed herein.

Distributing invalid data 780 throughout the storage log 350 may significantly increase FLWA. As illustrated in FIG. 7, the log segments 370[1]-370[3] each comprise a relatively small amount of invalid data. In order to reclaim the segments 370[1]-370[3], the garbage collector 136 may be required to rewrite a significant amount of valid data 782 within the respective segments 370[1]-370[3] by, inter alia, appending the valid data 782 at the append point 180 in the storage log 350, resulting in significant FLWA.

In some embodiments, the cache module 440 is configured to delegate cache eviction operations to the storage layer 130. The storage layer 130 may evict data from the cache during storage recovery operations. Although storage-level eviction may reduce cache performance (by potentially evicting "hot" data), storage-level eviction may significantly reduce FLWA. In storage-based eviction, the garbage collector 136 may be configured to select log segments 370 for recovery based on one or more selection criteria, including, but not limited to: greedy segment selection (invalidity metric), oldest (tail drop or age metric), cost benefit (invalidity-age metric), and/or the like. In greedy segment selection, the garbage collector 136 is configured to select segments 370 for recovery based on an invalidity metric that corresponds to the amount and/or proportion of invalid data within the segments 370. The invalidity metric of the greedy segment selection approach may be configured to select segment 370 that free up the most amount of space on the storage medium 140, and/or result in the smallest amount of data relocation FLWA. The greedy segment selection approach, however, may create wear-leveling issues (e.g., some segments may be used more frequently, which may cause portions of the storage medium 140 to wear prematurely). In the oldest (tail drop) approach, the garbage collector 136 is configured to select segment 370 for recovery based on an age metric. In the oldest (tail drop) approach, the garbage collector selects segments 370 based on the relative order 352 of the segments 370 in the storage log 350. Referring to FIG. 3A, the age metric may comprise selecting the oldest segments 370 in reverse log sequence 352 (e.g., from segment 370[2] to 370[N], in FIG. 3A). The oldest (tail drop) approach may provide wear-leveling benefits, but may not maximize FLWA reductions (since segments 370 are selected based on an age metric rather than an invalidity metric). In the cost-benefit approach, the garage collector 136 is configured to select segments 370 based on a combined invalidity-age metric. The invalidity-age metric may comprise a weighted combination of the invalidity metric and age metrics disclosed above. The invalidity-age metric may be adapted to prefer invalidity over age (or vice versa) based on preferences, testing and experience, and/or the like.

Figure 8A:
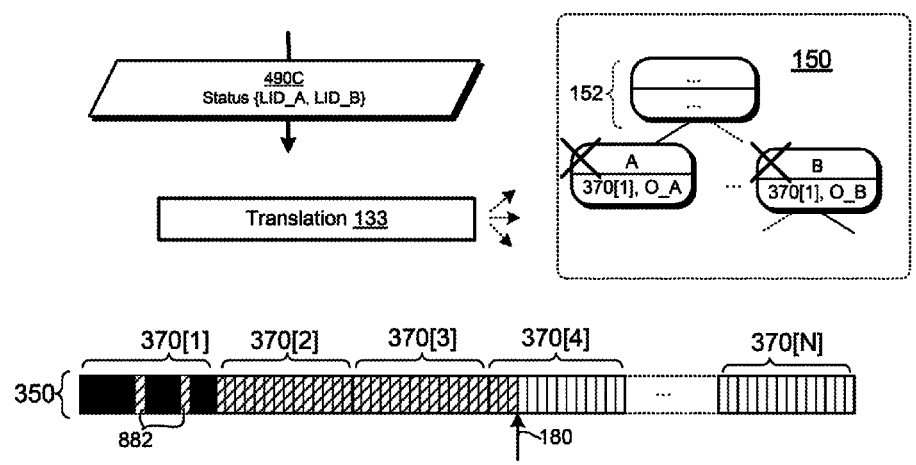
FIG. 8A depicts one embodiment of a garbage collection eviction operation.

FIG. 8A depicts one embodiment of an eviction operation implemented within the storage layer 130. In the FIG. 8A embodiment, the garbage collector 136 may select segment 370[1] for recovery using one or more of the selection criteria disclosed herein. The selected segment 370[1] may comprise a relatively small amount of valid data 882. The garbage collector 136 may be configured to reclaim the entire log segment 370[1] without relocating the valid data 882, effectively eliminating FLWA for the recovery operation. Reclaiming the log segment 370[1] may comprise erasing the log segment 370[1] as disclosed herein. Reclaiming the log segment 370[1] may further comprise deallocating the valid data 882 by, inter alia, removing entries 152 corresponding to the valid data 882 from the forward map 150. In the FIG. 8A embodiment, the valid data 882 corresponds to entries 152 associated with LIDs A and B, respectively. Subsequent requests for data of LIDs A and/or B may result in a cache miss. In response, the cache module 440 may readmit LID A and/or B into the cache in accordance with the cache admission policy 446 (by rewriting the data 882 to the storage log 350 as disclosed herein).

Figure 8B:
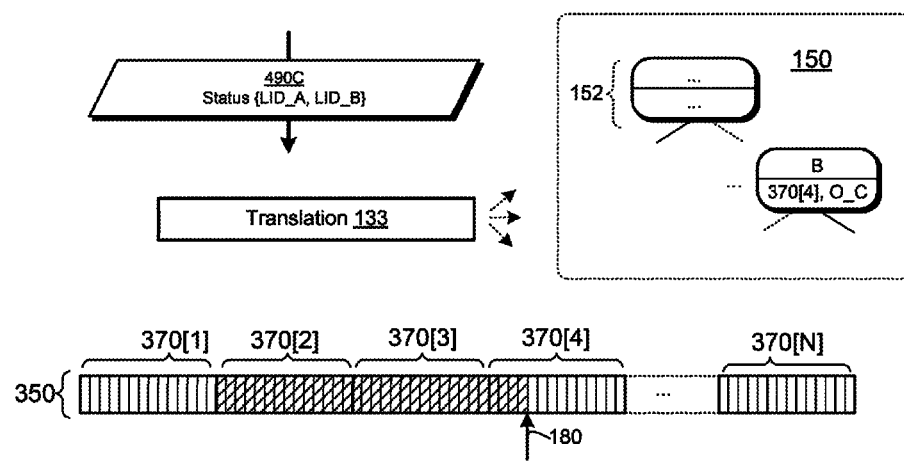
FIG. 8B depicts another embodiment of a garbage collection eviction operation.

In some cache modes, such as a write-back cache mode, the storage medium 140 may comprise data that cannot be evicted (e.g., dirty data). Accordingly, in some embodiments, the garbage collector 136 may be configured to determine whether the valid data 882 can be evicted. The garbage collector 136 may determine whether the valid data 882 can be evicted by use of cache metadata (e.g., a discardability indicator). Alternatively, or in addition, the garbage collector 130 may query the cache module 440 for the status of the LIDs (LIDs A and/or B) by use of the coordination module 137. The coordination module 137 may acquire coordination message 490C pertaining to the status of LIDs A and/or B, which may indicate whether LIDs A and/or B can be evicted. If one or more of the LIDs A and/or B cannot be evicted, the garbage collector 136 may be configured to relocate the corresponding data, as disclosed herein. In the FIG. 8B embodiment, the coordination message 490C indicates that LID B cannot be evicted. In response, the garbage collector 136 is configured to relocate the data of LID B at the append point 180, and updates the forward map 150 with the new storage location of the data (offset O_C within log segment 370[4]). The entry 152 corresponding to the evicted LID A is removed from the forward map 150. FIG. 8B further illustrates that segment 370[1] has been reinitialized, and is ready for use by the log storage module 135.

In some embodiments, the cache module 440 may not be notified of cache evictions implemented by the garbage collector 136. The cache module 440 may determine that a LID was evicted in response to a cache miss pertaining to the LID. Alternatively, or in addition, the cache module 440 may acquire information pertaining to cache existence from the storage module 130. The coordination module 137 may be configured to respond to queries from the cache module 440 (and/or other clients 106) regarding the existence of particular LIDs. The coordination module 137 may indicate that a LID "exists" on the storage medium 140 (is currently admitted in the cache) in response to identifying an entry corresponding to the LID in the forward map 150. If no entry for the LID exists in the forward map 150, the coordination module 137 may return an indication that the LID does not exist on the storage medium 140 (e.g., is not currently admitted in the cache). In the FIG. 8B embodiment, an exists query pertaining to LID A will return an indication that LID A does not exist in the cache, and a query pertaining to LID B will return an indication that LID B currently exists in the cache. The storage module 130 may be configured to provide existence and/or status information for particular LIDs by use of coordination messages 490, as disclosed herein. Alternatively, or in addition, the storage module 130 may provide LID status information through the storage interface 131.

Figure 9:
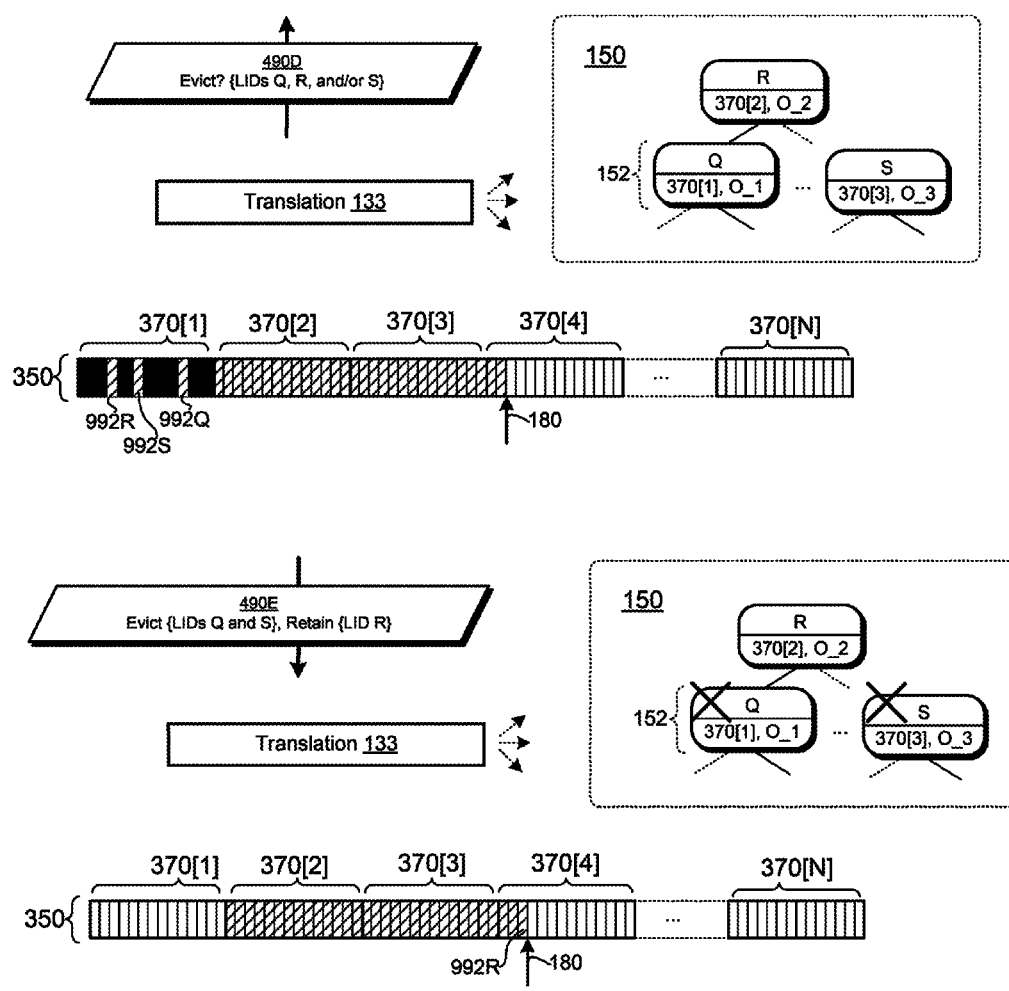
FIG. 9 depicts one embodiment of a garbage-collector eviction coordination operation.

In some embodiments, the garbage collector 136 may be configured to implement GC-coordinated eviction. In GC-coordinated eviction, the garbage collector 136 a) selects a log segment 370 for recovery, b) identifies valid data within the selected segment 370, and c) coordinates with the cache module 440 to evict valid data from the selected segment 370. FIG. 9 depicts one embodiment of GC-coordinated eviction operations. In the FIG. 9 embodiment, the garbage collector 136 selects segment 370[1] for recovery and determines that the segment 370[1] comprises valid data 992Q, 992R, and 992S corresponding to entries 152 in the forward map (entries associated with LIDs Q, R, and S, respectively). In response, the coordination module 137 may issue a query to the cache module 440 to determine whether to evict one or more of the LIDs Q, R, and/or S. The query may comprise a coordination message 490E, as disclosed herein. The cache module 440 may determine whether a) the LIDs can be evicted (e.g., have been written to the backing store 460) and/or b) the LIDs should be evicted per the eviction policy 448. The eviction decisions may be based on admission and/or eviction thresholds, as described above. The cache module 440 prevent high-value, "hot" LIDs from being evicted (based on access metrics of the LIDs). The cache module 440 may allow lower-value, "cold" LIDs to be evicted. In some embodiments, the thresholds may be modified to reduce FLWA (e.g., made more stringent). Alternatively, the thresholds may be relaxed in order to improve performance (and/or reduce CLWA resulting from readmission of the data into the cache). The cache module 440 may communicate eviction decisions regarding the LIDs Q, R, and/or S by use of a coordination message 490E. In the FIG. 9 embodiment, the coordination message 490E indicates that LIDs Q and S can be evicted, and that LID R should be retained. In response, the garbage collector 136 may relocate the data 992R of LID R and allow the data 992Q and 992S to be erased. The garbage collector 136 may be further configured to remove entries 152 corresponding to LIDs Q and S from the forward map 150, as disclosed herein.

Referring to FIG. 4, and as disclosed above, the cache module 440 may be configured to reduce CLWA by use of an admission policy 446 configured to reduce unnecessary writes to the storage module 130. The cache module 440 may be further configured to reduce FLWA by, inter alia, delegating eviction to the storage module 130. Configuring the admission module 445 and/or eviction module 447 to reduce write amplification may impact cache performance metrics, such as hit rate and/or the like. In some embodiments, the cache module 440 comprises a write amplification policy module 468 adapted to configure the admission module 445 and/or eviction module 446 in accordance with coordination information pertaining to the storage module 130. The write amplification policy module 468 may configure the cache layer 440 to reduce write amplification and/or optimize cache performance, depending on configuration, settings, and/or coordination information pertaining to the storage module 130. In some embodiments, the write amplification policy module 468 is configured to configure the cache module 440 to reduce write amplification in response to determining that the cache storage 430 is subject to write amplification. As used herein, storage devices that are subject to write amplification may include, but are not limited to: storage devices comprising asymmetric storage media, storage devices comprising write-once storage media, storage devices configured to write data out-of-place, log storage devices, wear-limited storage devices, and/or the like. The write amplification policy module 468 may be configured to reduce write amplification in the cache storage 430 by one or more of: a) restricting cache admission (e.g., adapting the admission policy 446 to reduce CLWA, as disclosed herein), b) delegating cache eviction to the storage module 130, and/or the like.

In some embodiments, the write amplification policy module 468 may configure the admission module 445 to reduce write amplification in the storage layer 130, even if reducing write amplification causes reductions in the cache hit rate and/or other cache performance criteria. As disclosed above, the admission policy 446 may comprise an access metric that is satisfied after monitoring a pre-determined number of accesses to a LID, which, until the data is admitted into the cache, result in cache misses. In some embodiments, the admission module 445 comprises a plurality of admission policies (admission policy 446 and admission policy 456). The admission policy 446 may be configured to reduce write amplification in the storage module 130 (may be a write amplification reduction (WAR) admission policy 446), as disclosed herein. The admission module 445 may further comprise a more permissive admission policy 456 configured to prioritize cache performance over write amplification reduction. Although FIG. 4 depicts two separate admission policies 446 and 456 the disclosure is not limited in this regard and could include any number of admission policies and/or a single, configurable admission policy.

The write amplification policy module 468 may configure the admission module 445 to implement the WAR admission policy 446 or the more permissive admission policy 456 based on coordination information pertaining to the storage module 130. As disclosed above, the coordination information may be communicated through coordination messages 490, configuration settings, and/or the like. In one embodiment, coordination information regarding the storage module 130 may indicate that the storage medium 140 is not subject to wear limitations and, in response, the write amplification policy 468 may configure the admission module 445 to implement the permissive admission policy 456. In another embodiment, the coordination information may indicate that the storage module 130 comprises an asymmetric, write-once storage medium 140 that is subject to wear conditions (e.g., has a limited program/erase lifespan). In response, the write amplification policy 468 may configure the admission module to implement the WAR admission policy 446 that is configured to reduce CLWA by, inter alia, restricting cache admission, as disclosed herein.

As disclosed above, the write amplification policy module 468 may be configured to modify and/or select an admission policy 446 and/or 456 in response to coordination information pertaining to the storage module 130. The coordination information may indicate, for example, that the storage module 130 wear-limited and/or subject to write amplification. (e.g., the storage medium 140 may be rated to endure a pre-determined number of program/erase cycles). The coordination module 137 may be configured to indicate whether the storage medium 140 is wear limited and/or indicate a current wear level of the storage medium 140 by use of, inter alia, coordination messages 490. In response to coordination information indicating that the storage medium 140 is wear limited and/or is nearing the end of its lifespan, the write amplification policy module 468 may configure the admission module 445 to restrict cache admission to reduce CLWA, which may comprise transitioning from a permissive cache admission policy 456 to the WAR admission policy 446. The storage module 130 may be further configured to provide coordination information pertaining to the wear rate on the storage medium 140, such as a write load and/or write rate (e.g., cache writes and/or garbage collection writes compared to original cache writes as illustrated in Table 1 above). The write amplification policy module 468 may configure the admission module 445 to implement the more restrictive WAR admission policy 446 in response to coordination information indicating a high wear rate on the storage module 130 (and/or use the more permissive admission policy 456 in response to coordination information indicating low wear rate).

The write amplification policy module 468 may be further configured to select an eviction policy 448 based on coordination information pertaining to the storage module 130. The write amplification policy module 468 may be configured to modify the eviction policy 448 in response to determining that the storage medium 140 is wear limited and/or subject to write amplification. As disclosed herein, the eviction module 447 may be configured to delegate eviction to the storage module 130, which may reduce FLWA. The write amplification policy module 468 may configure the eviction module 447 to delegate eviction to the storage module 130 in response to coordination information indicating that the storage module 130 is wean limited and/or comprises an asymmetric, write-once storage medium 140. Alternatively, the eviction module 447 may be configured to implement cache-level eviction in response to coordination information that indicates that the storage medium 140 is not subject to wear conditions. The write amplification policy module 468 may be further configured to modify and/or adjust the eviction policy 448 in response to coordination information pertaining to the storage module 130. As disclosed above, the write amplification policy module 468 may determine that the storage medium 140 is experiencing high wear rates and/or is nearing the end of its lifespan. In response, the write amplification policy module 468 may configure the eviction module 447 to delegate eviction to the storage module 130 to reduce FLWA, as disclosed herein.

Figure 10:
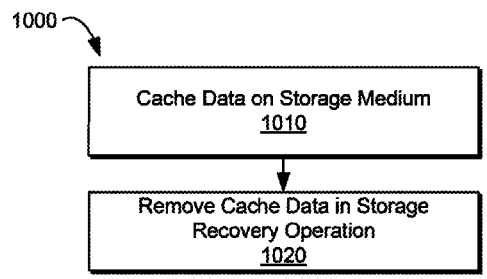
FIG. 10 is a flow diagram of one embodiment of a method for managing a cache that is subject to write amplification.

FIG. 10 is a flow diagram of one embodiment of a method 1000 for managing a cache that is subject to write amplification. In some embodiments, portions of the method 1000, as well as the other methods herein, may be embodied as computer-readable instructions stored on a computer-readable storage medium. The instructions may be configured for execution by a processor of a computing device to perform one or more steps and/or operations of the disclosed methods. Alternatively, or in addition, portions of the methods disclosed herein may be implemented by use of hardware components, such as processing resources 101, volatile memory resources 102, non-volatile storage resources 103, communication interface(s) 105, and/or the like.

The method 1000 may be configured to reduce FLWA and/or CLWA, as disclosed herein. Step 1010 may comprise caching data of a backing store 460 on a storage medium 140 by use of, inter alia, a storage module 130. Step 1010 may comprise allocating LIDs for use by the cache module 440. The LIDs may be allocated within the logical address space 132 of the storage module 130 and/or in a separate namespace, such as the cache VSU 432. Step 1010 may further comprise receiving I/O requests directed to the backing store 460. The I/O requests may be received by monitoring an I/O stack 104 of the computing system 100. Alternatively, the I/O requests may be received directly at the cache module 440 and/or storage module 130.

Step 1010 may further comprise selectively admitting data into cache storage 430 based on an admission policy 446. The admission policy 446 may comprise one or more admission criteria corresponding to: data access metrics, data sequentiality metrics, a combination of access and/or sequentiality metrics, and/or the like. Admitting data into the cache may comprise storing the data on the storage medium 140 by, inter alia, appending the data within respective segments 370 of a storage log 350 and/or associating the appended data with a LID in the forward map 150, as disclosed herein.

In some embodiments, the admission policy 446 of step 1010 is configured to reduce CLWA. The admission policy 446 may be configured to reduce unnecessary writes to the storage medium 140. The admission policy 446 may, therefore, be configured to defer admission of a LID until access metrics of the LID reach a threshold. The admission policy 446 may be further configured to reduce CLWA by preventing admission of data corresponding to sequential data accesses, as disclosed herein.

Step 1020 may comprise removing data from the cache in a storage recovery operation performed by the storage module 130. Step 1020 may comprise selecting a storage log segment 370 for recovery based on one or more selection criteria, as disclosed herein. Step 1020 may further comprise removing valid cache data stored on the selected log segment 370 by, a) removing entries 152 corresponding to the cache data from the forward map 150 and/or b) erasing the cache data from the selected log segment 370.

Step 1020 may further comprise determining whether the valid cache data stored on the selected log segment 370 can be removed by use of, inter alia, log coordination information. Cache data that is dirty and/or has not been written-back to the backing store 460 may be retained on the storage medium 140 (e.g., relocated to another log storage unit 371). Data that has been written through to the backing store 460 (e.g., destaged to the backing store 460) may be removed from the storage medium 140, as disclosed herein.

Step 1020 may further comprise determining whether the valid cache data stored on the log segment 370 should be removed (e.g., evicted) in the recovery operation. The garbage collector 136 may identify the LIDs to be removed in a coordination message 490. In response, the cache module 440 may determine whether the data can be evicted from the cache (based on whether the data is dirty and/or has been destated) and/or whether the data should be evicted per the admission policy 446 and/or eviction policy 448 of the cache module 440. The cache module 440 may identify LIDs suitable for eviction (and/or that should be retained) in a response coordination message 490.

In some embodiments, step 1020 further comprises providing coordination information regarding the cache status of particular LIDs. The cache status information may indicate whether the particular LIDs are currently admitted in the cache. The cache status information may be based on whether the particular LIDs exist in the forward map 150. LIDs that exist in the forward map (e.g., are bound to valid data stored on the storage medium 140) are considered to "exist" in the cache, and LIDs that do not correspond to a mapping entry 152 in the forward map 150 are considered to not exist. The storage module 130 may provide LID status information in response to requests received through the interface 131 and/or in coordination messages 490, as disclosed herein.

Figure 11:
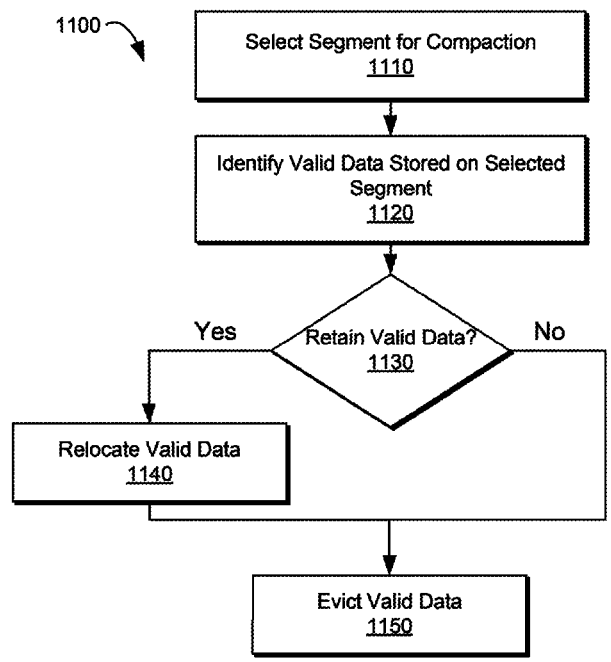
FIG. 11 is a flow diagram of one embodiment of a method for coordinating cache eviction.

FIG. 11 is a flow diagram of another embodiment of a method 1100 managing cache eviction. Step 1110 may comprise selecting a segment of a storage medium 140 for a compaction operation. As disclosed above, a compaction operation may comprise an operation to reinitialize storage resources of the storage medium 140, such as a log segment 370 and/or the like. The segment may be selected using any of the selection criteria disclosed herein.

Step 1120 may comprise identifying valid data stored on the selected segment. The valid data may be identified by use of storage metadata 134 including, but not limited to: the forward index 150, a reverse index 158, and/or the like.

Step 1130 may comprise determining whether to retain the identified valid data. Step 1130 may comprise issuing a query to a cache layer 440 (in a coordination message 490). The query may comprise the LIDs associated with the identified data. The cache layer 440 may determine whether data of the LIDs should be retained in the cache based on one or more factors, including, but not limited to: whether the data has been destaged to the backing store 460, an admission policy 446, an eviction policy 448, access characteristics pertaining to the LIDs, sequentiality characteristics of the LIDs, and/or the like. Step 1130 may further comprise receiving a message identifying LIDs to retain and/or evict from the identified segment. The message may comprise a coordination message 490, as disclosed herein.

If step 1130 indicates that data of any of the LIDs are to be retained, the flow may continue to step 1140; otherwise, the flow may continue at step 1150. Step 1140 may comprise relocating data of the LIDs that are to be retained. Step 1140 may include appending data of the LIDs to the storage log 350 (at a current append point 180). Step 1150 may comprise reinitializing the selected segment, which may comprise erasing the selected segment, as disclosed herein.

Figure 12:
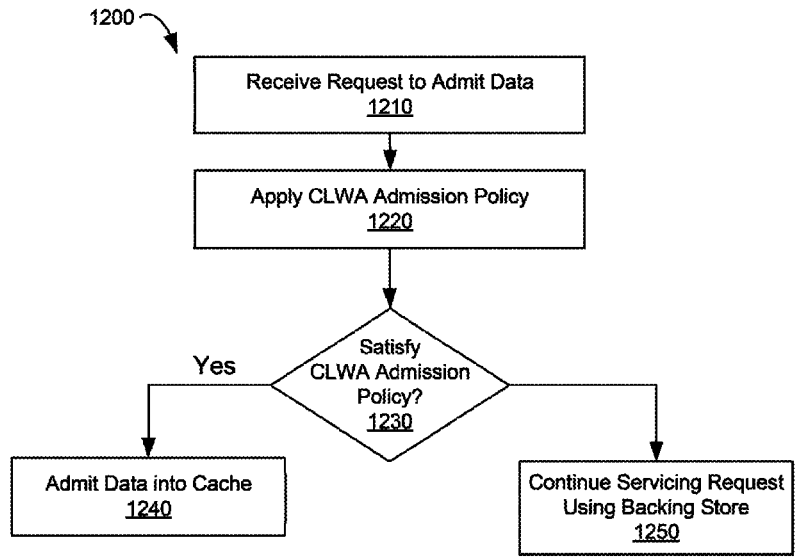
FIG. 12 is a flow diagram of one embodiment of a method for managing cache admission for a cache that is subject to write amplification.

FIG. 12 is a flow diagram of one embodiment of a method 1200 for managing cache admission for a cache that is subject to write amplification. Step 1210 may comprise receiving a request to admit data into the cache (e.g., store data on the storage medium 140). The request of step 1210 may correspond to a cache miss, such as a request to read data of the backing store 460 that is not currently available in cache storage 430. The request of step 1210 may be intercepted within an I/O stack 104 of the computing system 100. Alternatively, the request of step 1210 may be issued directly to the cache module 440 and/or storage module 130 (e.g., through the storage interface 131 and/or in reference of a LID of the logical address space 132 and/or cache VSU 432).

Step 1220 may comprise applying an admission policy 446 to the request to determine whether data of the request is suitable for cache admission. The admission policy 446 of step 1220 may be configured to reduce CLWA. Accordingly the admission policy 446 of step 1220 may be referred to as a CLWA admission policy. The admission policy 446 may predicate cache admission on one or more metrics including, but not limited to: access metrics, sequentiality metrics, combined access and sequentiality metrics, and/or the like. Step 1220 may, therefore, comprise determining one or more of an access metric and/or sequentiality metric corresponding to the request, as disclosed herein.

Step 1230 may comprise determining whether the request complies with the CLWA admission policy. Step 1230 may comprise comparing the access and/or sequentiality metrics of step 1220 to one or more admission thresholds. The admission thresholds may include, but are not limited to: a pre-determined access metric threshold, an adaptive access metric threshold, a pre-determined non-sequentiality threshold, an adaptive non-sequentiality threshold, an inter-related access and/or sequentiality threshold (e.g., as depicted in FIGS. 5A-5C), and/or the like. If data of the request satisfies the CLWA admission policy, the flow may continue at step 1240; otherwise, the flow continues at step 1250.

Step 1240 may comprise admitting data of the request received at step 1210 into the cache. In response to a read request, step 1240 may comprise accessing the requested data from the backing store 460 and writing the data to the storage medium 140 (by use of the storage module 130). In response to a write request, step 1240 may comprise writing data of the request to the storage medium 140. Step 1240 may further comprise writing the data through to the backing store 460 and/or marking the data as dirty (in a write-back cache mode).

Step 1250 may comprise denying admission to the cache. Accordingly, step 1250 may comprise servicing the request using the backing store 460 (and/or I/O stack of the computing system 100). Step 1250 may comprise maintaining access and/or sequentiality metadata pertaining to the request for use in subsequent determinations for cache admission. As disclosed above, the CLWA admission policy of step 1220 may be configured to prevent unnecessary writes to the cache. Accordingly, data may not be admitted into the cache until a sufficient access history pertaining to the LID is developed (e.g., in the access metadata 442 and/or sequentiality metadata 443, disclosed above). Step 1250 may comprise maintaining the access metadata 442 and/or sequentiality metadata 443, which may be used to subsequently admit the data into the cache.

Figure 13:
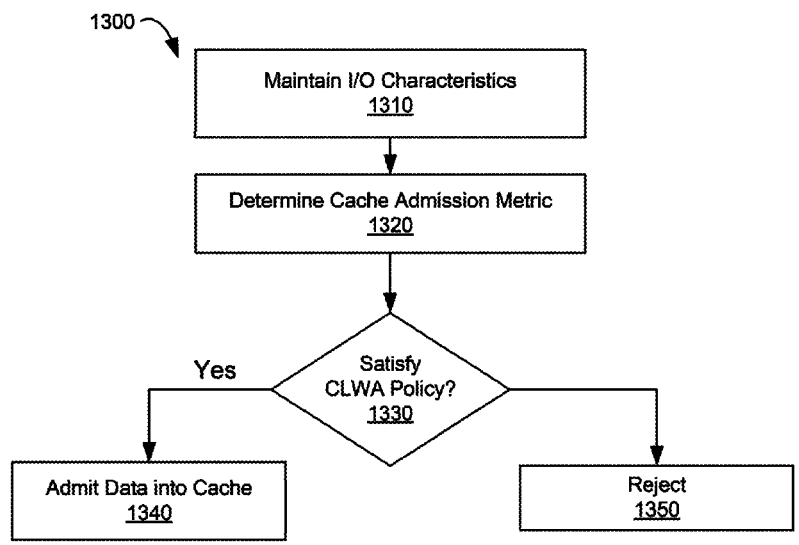
FIG. 13 is a flow diagram of another embodiment of a method for managing cache admission for a cache that is subject to write amplification.

FIG. 13 is a flow diagram of another embodiment of a method 1300 for managing a cache that is subject to write amplification. Step 1310 may comprise maintaining and/or developing I/O characteristics pertaining to identifiers corresponding to a backing store 460. The I/O characteristics may be maintained in cache admission metadata, which may include, but is not limited to: access metadata 442, sequentiality metadata 443, and/or the like, as disclosed herein. Step 1320 may comprise determining a cache admission metric for an identifier by use of the I/O characteristics developed in step 1310. The cache admission metric may correspond to one or more of: an access metric (e.g., touch count), a sequentiality metric, a combination of access and sequentiality metrics, and/or the like.

Step 1330 may comprise determining whether the cache admission metric of step 1320 satisfies a CLWA policy. The CLWA policy may correspond to one or more of an admission policy 446 and/or eviction policy 448, as disclosed above. The CLWA policy may be configured to reduce write amplification in the storage layer due to operations in the cache layer (e.g., writing low-value data to the cache storage 430). The CLWA policy may correspond to an access metric threshold, a non-sequentiality threshold, an adaptive threshold based on access and sequentiality metrics, and/or the like, as disclosed herein. If the cache admission metric satisfies the CLWA policy of step 1330, the flow continues to step 1340; otherwise, the flow continues at step 1350. Step 1340 may comprise admitting data corresponding to the identifier into the cache, as disclosed herein. Step 1350 may comprise rejecting the identifier, which may comprise servicing the I/O requests pertaining to the identifier by use of the backing store 460.

Figure 14A:
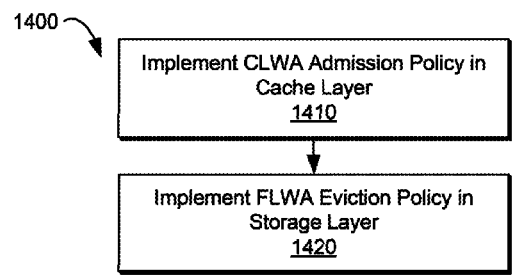
FIG. 14A is a flow diagram of another embodiment of a method for managing a cache that is subject to write amplification.

FIG. 14A is a flow diagram of another embodiment of a method 1400 for managing a cache that is subject to write amplification. Step 1410 may comprise implementing an admission policy 446 configured to reduce CLWA. The admission policy 446 may correspond to access characteristics and/or sequentiality characteristics pertaining to identifiers of the backing store 460. The admission policy 446 may predicate cache admission on one or more access metric thresholds, non-sequentiality thresholds, and/or interrelated access/sequentiality thresholds, as disclosed herein. The thresholds of the admission policy 446 may be adapted in accordance with coordination information from the storage layer (storage module 130), which may include, but is not limited to: availability of cache storage capacity, availability of cache write capacity, and/or the like. The admission policy 446 may be configured to reduce CWLA by, inter alia, preventing low-value data from being written to the storage medium 140. Accordingly, the admission policy 446 may be configured to admit data into the cache after establishing that the data is suitable for cache admission (e.g., based on access metadata 442 and/or sequence metadata 443). The access metadata 442 may correspond to accesses to the data over one or more time periods (windows). The cache admission policy 446 of step 1410 may require that the data be accessed a threshold number of times during a threshold number of time windows. Accordingly, the cache admission policy 446 may not admit data after a first cache miss, but may admit data in response to identifying an access pattern corresponding to the data (e.g., a pre-determined number of accesses to the data over one or more predetermined time periods). The cache admission policy 446 may be further configured to avoid poisoning the cache with sequential data by use of a non-sequentiality threshold, as disclosed herein. In some embodiments, the cache admission policy 446 is configured to implement a combined access/sequentiality admission policy and/or threshold, as disclosed in conjunction with FIGS. 5A-5C.

Step 1420 may comprise implementing an eviction policy configured to reduce FLWA. The eviction policy may be implemented within the storage layer (e.g., by the garbage collector 136), as disclosed herein. Step 1420 may comprise evicting data from the cache in response to reinitializing storage divisions of the storage medium 140 and/or recovering storage segments 370 of the storage log 350. Step 1420 may be configured in accordance with the operational mode of the cache layer. In a write-through cache mode, step 1420 may comprise evicting data from the storage medium 140 without informing and/or querying the cache layer. In other cache modes, such as a write back cache mode, step 1420 may comprise determining whether the cache data can be evicted (e.g., whether the data has been destaged to the backing store 460). Data that cannot be evicted may be relocated within the storage log 350, as disclosed herein. In some embodiments step 1420 comprises a GC-driven eviction policy in which the garbage collector 136 (or other module) identifies valid cache data in a segment that is being recovered and queries the cache layer to identify valid cache data to evict. The cache layer may select data for eviction based on a cache admission policy 446 and/or eviction policy 448, as disclosed herein.

Figure 14B:
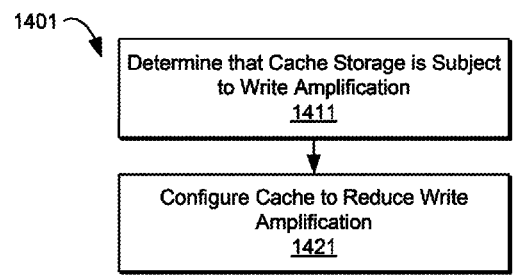
FIG. 14B is a flow diagram of another embodiment of a method for managing a cache that is subject to write amplification.

FIG. 14B is a flow diagram of another embodiment of a method 1401 for managing a cache that is subject to write amplification. Step 1411 may comprise determining that the cache storage 430 of a cache layer (cache module 440) is subject to write amplification. As disclosed above, storage devices that are subject to write amplification include, but are not limited to: storage devices comprising asymmetric storage media, storage devices comprising write-once storage media, storage devices configured to write data out-of-place, log storage devices, wear-limited storage devices, and/or the like. Step 1411 may comprise determining that the cache storage 430 comprises a solid-state storage device and/or Flash storage device. Step 1411 may further comprise determining that the cache storage 430 comprises an asymmetric, write-once medium and/or is configured to store data out-of-place (e.g., in a storage log 350). Step 1401 may comprise accessing and/or receiving coordination information pertaining to the cache storage 430 by use of one or more coordination messages 490, as disclosed herein.

Step 1421 may comprise configuring the cache layer to reduce wear on the storage medium. Step 1421 may be performed in response to determining that the cache storage 430 is subject to write amplification in step 1411. Step 1421 may comprise the write amplification policy module 468 configuring the admission module 445 to reduce CLWA and/or configuring the eviction module 447 to reduce FLWA. Step 1421 may comprise restricting cache admission by one or more of: modifying admission thresholds of the admission module 445, restricting admission of low-value data, implementing a more restrictive admission policy, such as the WAR admission policy 446, and/or the like. Step 1421 may comprise implementing and/or modifying one or more of an access metric threshold (touch count), non-sequentiality threshold, combined access metric/non-sequentiality threshold, and/or the like. Step 1421 may further comprise configuring the eviction module 447 to delegate eviction operations to the storage layer (storage module 130). Delegating eviction operations may comprise allowing a garbage collector 136 of the storage module 130 to evict data from the cache during storage recovery operations. Step 1421 may further comprise providing coordination information to identify cache data that cannot be evicted (e.g., data that has not been destaged to the backing store 460) and/or to identify data that should be retained in the cache based on, inter alia, access metrics of the data.

Figure 14C:
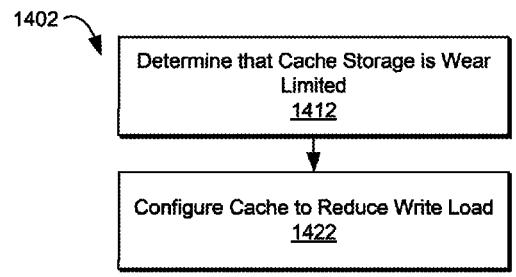
FIG. 14C is a flow diagram of another embodiment of a method for managing a cache that is subject to write amplification.

FIG. 14C is a flow diagram of another embodiment of a method 1402 for managing a cache that is subject to write amplification. Step 1412 may comprise determining that the storage layer of a cache controller is wear limited, as disclosed herein. The determination of step 1412 may be made by use of coordination information pertaining to the storage layer (e.g., coordination messages 490 pertaining to the storage module 130). Step 1422 may comprise configuring the cache controller to reduce the write load on the storage layer by, inter alia, restricting admission into the cache and/or delegating eviction to the storage layer, as disclosed herein.

Figure 15:
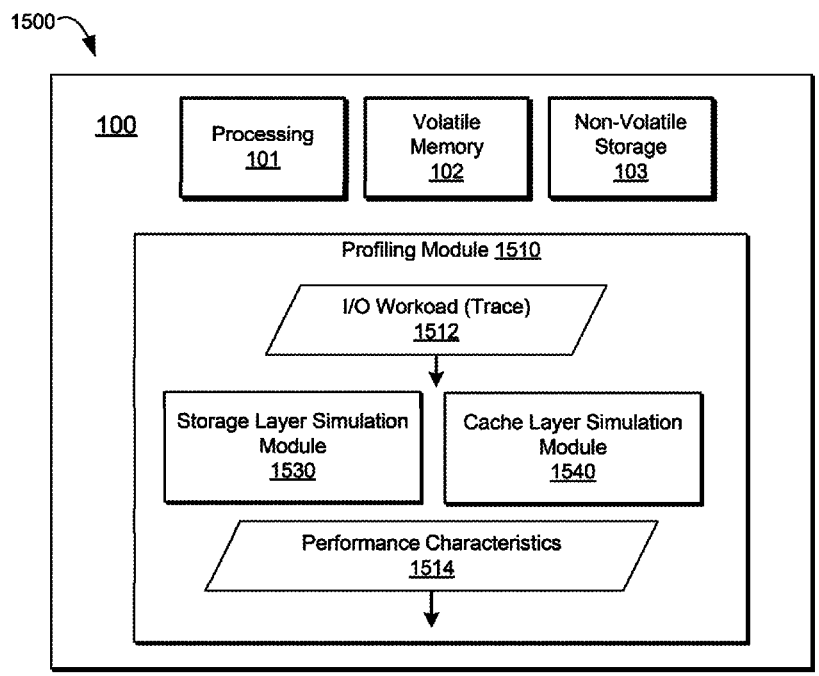
FIG. 15 is a block diagram of one embodiment of a system for cache profiling.

FIG. 15 is a block diagram of a system 1500 for reducing CLWA and/or FLWA. The system 1500 may comprise a computing system 100 that includes processing resources 101, volatile memory resources 102, non-volatile storage resources 103, and so on, as disclosed herein. The system 1500 may include a profiling module 1510 configured model and/or simulate operation of a cache controller (e.g., cache module 440) and/or storage layer (e.g., storage module 130), as disclosed herein. The profiling module 1510 may include a storage layer simulation module (SLSM) 1530 configured to simulate operation of the storage layer 130. The SLSM 1530 may be configured to model the operation of the log module 135, garbage collector 136, storage controller 139, and/or other components of the storage layer 130. The SLSM 1530 may be further configured to simulate operation of the storage medium 140. The storage medium 140 may correspond to a solid-state storage medium having particular asymmetric, write-once characteristics.

The profiling module 1510 may further comprise a cache layer simulation module (CLSM) 1540 configured to simulate operation of a cache controller (e.g., the cache module 440). The CLSM 1540 may be configured to simulate operation of the cache metadata module 441, cache admission module 445 (and admission policy 446), cache eviction module 447 (and/or eviction policy 447), and cache coordination module 467 as disclosed herein.

The profiling module 1510 may be configured to determine profiling information corresponding to different configurations of the storage module 130 and/or cache module 440 by simulating a sequence of I/O requests directed to a backing store 460. The I/O requests may correspond an I/O workload (trace) 1512 corresponding to a particular application, benchmark, and/or the like, such as the TCE-E trace of Table 1. The profiling module 1510 may be configured to simulate cache performance under different I/O workloads 1512 (e.g., traces).

The profiling module 1510 may be further configured to monitor performance characteristics 1514 of the SLSM 1530 and/or CLSM 1540. The performance characteristics 1514 may include, but are not limited to: cache hit rate, CLWA, FLWA, cache capacity, cache write load, cache write capacity, garbage collector activity, and/or the like. Cache performance characteristics 1514 may be obtained under different I/O workloads 1512 and/or cache configurations, such as different admission policies 446, eviction policies 448, garbage collection eviction configurations, different coordination settings (e.g., GC-driven eviction), and/or the like. The cache performance characteristics 1514 may be used to select configuration settings that reduce CLWA and/or FLWA (increase cache endurance), while providing acceptable cache hit rate performance.

Figure 16:
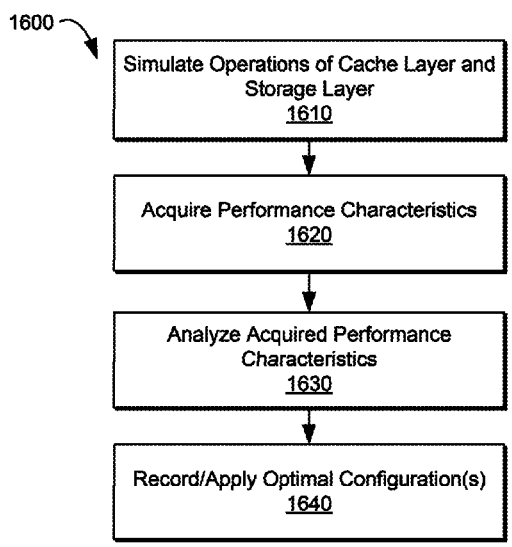
FIG. 16 is a flow diagram of one embodiment of a method for cache profiling.

FIG. 16 illustrates cache performance characteristics under different configuration profiles and/or traces. As shown in FIG. 16, a cache admission policy 446 comprising access metrics (touch count) and sequentiality rejection combined with garbage collector eviction achieves significant reductions to write amplification with good hit rate performance.

FIG. 16 is a flow diagram of one embodiment of a method 1600 for determining a cache configuration. Step 1610 may comprise simulating operations of a cache layer (cache module 440) and/or storage layer (storage module 130) under one or more I/O workloads. Step 1610 may comprise simulating the cache layer and/or storage layer using the profiling module 1510, as disclosed above. Step 1610 may further comprise simulating the cache layer and/or storage layer under one or more different configurations and/or settings. The configurations may correspond to cache size (e.g., the amount of cache storage 430 available to the cache layer), cache admission policy 446, cache eviction policy 448, garbage collector configuration (e.g., greedy segment selection, age-based selection, or the like), garbage collector eviction configuration, coordination settings, and/or the like.

Step 1620 may comprise acquiring performance characteristics pertaining to the cache layer and/or storage layer under the one or more I/O workloads and/or configurations. The performance characteristics may include, but are not limited to: cache hit rate, CLWA, FLWA, cache capacity, cache write load, cache write capacity, garbage collector activity, and/or the like.

Step 1630 may comprise analyzing the performance characteristics of step 1620 in order to, inter alia, identify an optimal configuration for the cache and/or storage layer. Step 1630 may comprise comparing the performance characteristics acquired at step 1620. In some embodiments, step 1630 comprises identifying an optimal configuration for the cache and/or storage layer according to an optimization criterion, such as a performance criterion (maximize hit rate), an endurance criterion (minimize write amplification), and/or the like. The optimal configuration may correspond to a particular I/O workload and/or trace and/or may be optimized across a plurality of different workloads.

Step 1640 may comprise applying and/or recording the optimal configuration of step 1630. Step 1640 may comprise storing information pertaining to the optimal configuration(s) identified in step 1630 on a computer-readable storage medium and/or human-machine interface (e.g., display). Alternatively, or in addition, Step 1640 may comprise configuring the cache layer (cache module 440) and/or storage layer (storage module 130) in accordance with the optimal configuration and/or settings identified in step 1630. In some embodiments, step 1640 comprises applying one or more different configurations to the cache and/or storage layers in response to different I/O workloads. Step 1640 may comprise reconfiguring the cache module 440 and/or storage module 130 based on an I/O workload to be handled by the computing system 100.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternative ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer-program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or another programmable data processing apparatus to function in a particular manner, such that the instructions stored in the machine-readable memory produce an article of manufacture, including implementing means that implement the function specified. The computer program instructions may also be loaded onto a computer or another programmable data processing apparatus to cause a series of operational steps to be performed on the computer or another programmable apparatus to produce a computer-implemented process, such that the instructions that execute on the computer or another programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

We claim:

1. An apparatus, comprising:
a cache layer that caches data associated with a backing store in a cache corresponding to a non-volatile solid-state storage device and maintains cache metrics for respective logical identifiers of the backing store in response to monitoring storage requests directed to the respective logical identifiers of the backing store, the cache metrics including cache metrics for cached logical identifiers and non-cached logical identifiers, the cached logical identifiers comprising logical identifiers of the backing store that are admitted into the cache, the non-cached logical identifiers comprising logical identifiers of the backing store that are not admitted into the cache,
wherein the cache layer services storage requests directed to cached logical identifiers by use of the cache, and wherein servicing a storage request directed to a particular logical identifier of the backing store, the particular logical identifier comprising a non-cached logical identifier, comprises:

determining whether to admit the particular logical identifier into the cache by comparing a cache metric for the particular address to an admission threshold, the admission threshold to control admission of non-cached logical identifier of the backing store into the cache, admitting the particular logical identifier into the cache in response to the cache metric satisfying the admission threshold, such that the particular logical identifier comprises a cached logical identifier of the backing store to be serviced by use of the cache, and rejecting admission of the particular logical identifier in response to the cache metric failing to satisfy the admission threshold, such that the particular logical identifier remains a non-cached logical identifier to be serviced by use of the backing store; and a cache coordinator that modifies the admission threshold in response to a coordination message pertaining to the non-volatile solid-state storage device by one of: increasing the admission threshold and decreasing the admission threshold, wherein the cache layer uses the modified admission threshold to control admission of non-cached logical identifiers of the backing store in response to the coordination message.

2. The apparatus of claim 1, wherein data admitted into the cache are stored within storage divisions of a log maintained on the non-volatile solid-state storage device, the apparatus further comprising:
a garbage collector configured to recover storage divisions of the log maintained on the non-volatile solid-state storage device, wherein the garbage collector is configured to recover a selected storage division of the log by,
identifying valid cache data stored on the selected storage division of the log, wherein the identified valid cache data is associated with the backing store and is referenced by the cache layer,
accessing coordination information maintained by the cache layer to select first valid cache data, of the identified valid cache data, to retain on the non-volatile solid-state storage device, and to select second valid cache data, of the identified valid cache data, to remove from the non-volatile solid-state storage device during recovery of the selected storage division of the log,
writing the first valid cache data to another storage division of the log, and
erasing the selected storage division of the log, such that the second valid cache data is removed from the non-volatile solid-state storage device.

3. The apparatus of claim 2, wherein the garbage collector is configured to issue a query to the cache layer to determine whether to evict data of the identified valid cache data from the non-volatile solid-state storage device.

4. The apparatus of claim 1, wherein the coordination message indicates one or more of a wear rate of the non-volatile solid-state storage device and a wear level of the non-volatile solid-state storage device, and
wherein the cache coordinator modifies the admission threshold to restrict admission of non-cached logical identifiers into the cache based on one or more of the wear rate of the non-volatile solid-state storage device and the wear level of the non-volatile solid-state storage device.

5. The apparatus of claim 1, wherein the cache metrics comprise access counts for respective logical identifiers of the backing store, the access counts indicating a number of storage requests directed to the respective addresses during particular time windows, wherein the cache coordinator modifies the admission threshold to increase an access count threshold, and wherein the cache layer determines whether to admit a non-cached address into the cache based on whether access counts determined for the non-cached address satisfy the access count threshold.

6. The apparatus of claim 1, wherein the cache metrics determined for the respective addresses of the backing store comprise one or more of access metrics and non-sequentiality metrics, and wherein the admission threshold for the cache comprises one or more of an access metric threshold, a non-sequentiality threshold, and an adaptive threshold, the adaptive threshold corresponding to access and non-sequentiality metrics.

7. The apparatus of claim 1, wherein the cache coordinator modifies the admission threshold for the cache in accordance with a write amplification reduction policy, wherein the write amplification reduction policy is configured to reduce a rate at which non-cached addresses of the backing store are admitted into the cache.

8. The apparatus of claim 1, wherein the cache coordinator modifies the admission threshold for the cache in response to one or more of: the coordination message indicating that the non-volatile solid-state storage device is subject to write amplification, a wear level of the non-volatile solid-state storage device indicated by the coordination message, a wear rate of the non-volatile solid-state storage device indicated by the coordination message, and availability of write capacity indicated by the coordination message, the write capacity corresponding to availability of initialized storage divisions of the non-volatile solid-state storage device.

9. The apparatus of claim 1, wherein the cache coordinator decreases the admission threshold, wherein the decrease to the admission threshold is configured to increase a rate at which non-cached addresses are admitted into the cache.

10. The apparatus of claim 1, wherein the cache metrics determined for the non-cached addresses of the backing store comprise access metrics and sequentiality metrics, the access metrics corresponding to a number of storage requests identified as being directed to the respective non-cached addresses during a particular time window, and the sequentiality metrics indicating a proximity of the respective non-cached addresses to addresses of other storage requests monitored during the particular time window, and wherein modifying the admission threshold comprises modifying one or more of: an access metric threshold, a sequentiality metric threshold, and a combined access and sequentiality metric threshold to one or more of an access metric and a sequentiality metric.

11. A method, comprising:
maintaining input/output (I/O) request characteristics of identifiers corresponding to an address space of a backing store;
determining cache metrics for identifiers of the address space of the backing store by use of the determined I/O characteristics, the determined cache metrics including cache metrics for cached identifiers and non-cached identifiers, the cached identifiers comprising identifiers of the address space that are admitted into a cache corresponding to a solid-state storage medium, the non-cached identifiers comprising identifiers of the address space that are not admitted into the cache;

servicing I/O requests directed to identifiers of the address space of the backing store, wherein servicing an I/O request directed to an identifier of the address space comprises:

servicing the I/O request by use of the cache in response to the identifier comprising a cached identifier, admitting the identifier into the cache in response to a cache metric determined for the identifier satisfying a cache admission threshold such that I/O requests directed to the identifier are serviced by use of the cache, the cache admission threshold configured to control the admission of data into the cache, and retaining the identifier as a non-cached identifier in response to the cache metric determined for the identifier failing to satisfy the cache admission threshold such that I/O requests directed to the identifier are serviced by use of the backing store; and adjusting the cache admission threshold based on coordination information pertaining to the solid-state storage medium, wherein adjusting the cache admission threshold comprises one of increasing the cache admission threshold and decreasing the cache admission threshold.

12. The method of claim 11, wherein the coordination information indicates one or more of a wear rate of the solid-state storage medium and a wear level of the solid-state storage medium, and wherein adjusting the cache admission threshold comprises one of:

increasing the cache admission threshold to reduce a cache admission rate to the coordination Information indicating one or more of a high wear rate and a high wear level, and decreasing the cache admission threshold to increase the cache admission rate in response to the coordination information indicating one or more of a low wear rate for the solid-state storage medium and a low wear level for the solid-state storage medium.

13. The method of claim 11, wherein the coordination information indicates an amount of available write capacity, the amount of available write capacity corresponding to availability of initialized storage divisions of the solid-state storage medium, and wherein adjusting the cache admission threshold comprises one of:

increasing the cache admission threshold in response to the indicated amount of available write capacity satisfying a write capacity threshold, and decreasing the cache admission threshold in response to the indicated amount of available write capacity failing to satisfy the write capacity threshold.

14. The method of claim 11, further comprising receiving the coordination information from a storage controller, the storage controller configured to manage the solid-state storage medium.

15. The method of claim 11, wherein the coordination information indicates a wear level of the solid-state storage medium, and wherein adjusting the cache admission threshold comprises one of:

adjusting the cache admission threshold to restrict admission of data into the cache responsive to the indicated wear level failing to satisfy a wear level threshold, and adjusting the cache admission threshold to increase admission of data into the cache responsive to the indicated wear level satisfying the wear level threshold.

16. The method of claim 11, further comprising:

determining an eviction policy for the cache based on the coordination information pertaining to the solid-state storage medium; and evicting data from the cache in accordance with the determined eviction policy.

17. The method of claim 11, further comprising identifying data that can be removed from the cache during a storage recovery operation on a log segment on the solid-state storage medium.

18. A non-transitory computer-program product comprising program code configured for execution by a computing system, wherein the program code is configured to cause the computing system to perform operations, comprising:

monitoring I/O requests that pertain to logical addresses of a backing store;

maintaining cache metrics for respective logical addresses of the backing store in response to the monitoring the cache metrics comprising cache metrics for cached logical addresses and non-cached logical addresses, the cached logical addresses comprising logical addresses of the backing store that are admitted into a cache corresponding to a non-volatile storage device, the non-cached logical addresses comprising logical addresses of the backing store that are not admitted into the cache;

servicing an I/O request that pertains to a logical address of the backing store, wherein servicing the I/O request comprises:

determining whether the logical address comprises a cached logical address of the backing store that is admitted into the cache;

servicing the I/O request by use of the non-volatile storage device in response to the logical address comprising a cached logical address; and in response to the logical address comprising a non-cached logical address:

comparing a cache metric for the logical address to a cache admission criterion, the cache admission controlling admission of non-cached logical addresses into the cache, admitting the logical address into the cache in response to the cache metric satisfying the cache admission criterion, such that the logical address comprises a cached logical address to be serviced by use of the non-volatile storage device, and preventing the logical address from being admitted into the cache in response to the cache metric failing to satisfy the cache admission criterion, such that the logical address remains a non-cached logical address to be serviced by use of the backing store; and modifying the admission criterion used to control admission of non-cached logical addresses of the backing store into the cache based on coordination data corresponding to the non-volatile storage medium.

19. The computer-program product of claim 18, wherein maintaining the cache metrics comprises determining access metrics for the logical addresses of the backing store, the access metrics of the respective logical addresses indicating a number of accesses to the respective logical addresses during one or more time periods, wherein the admission criterion comprises an access metric threshold, wherein determining whether to admit the logical address into the cache comprises comparing the access metric determined for the logical address to the access metric threshold, such that the logical address is admitted into the cache in response to the access metric being greater than or equal to the access metric threshold, and is prevented from being admitted into the cache in response to the access metric being less than the access metric threshold, and wherein modifying the admission criterion comprises one or more of increasing the access metric threshold and decreasing the access metric threshold.

20. The computer-program product of claim 18, wherein the coordination data indicates one or more of: whether the non-volatile storage medium is subject to write amplification, whether the non-volatile storage medium is wear-limited, a wear rate of the non-volatile storage medium, a wear level of the non-volatile storage medium, and an available write capacity on the non-volatile storage medium.

21. The computer-program product of claim 18, wherein the logical identifier is admitted into the cache in response to determining that the cache metric of the logical identifier satisfies an admission threshold of the admission criterion, and wherein modifying the admission criterion comprises increasing the admission threshold in response to the coordination data indicating one or more of: that the non-volatile storage medium is subject to write amplification and that the non-volatile storage medium is wear-limited.

22. The computer-program product of claim 18, the operations further comprising:

evicting data from the cache on the non-volatile storage medium in response to determining that an eviction metric associated with the data satisfies an eviction threshold for the cache; and modifying the eviction threshold for the cache in response to the coordination information, wherein modifying the eviction threshold comprises one of increasing the eviction threshold and decreasing the eviction threshold.

* * * * *